(12) United States Patent
Lim et al.

(10) Patent No.: US 10,148,311 B2
(45) Date of Patent: Dec. 4, 2018

(54) STUDIES ABOUT MSD LEVEL IN AGGREGATING A PLURALITY OF DOWNLINK CARRIERS AND TWO UPLINK CARRIERS

(71) Applicant: LG ELECTRONICS INC., Seoul (KR)

(72) Inventors: Suhwan Lim, Seoul (KR); Jaehyuk Jang, Seoul (KR); Dongik Lee, Seoul (KR); Sangwook Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/710,757

(22) Filed: Sep. 20, 2017

(65) Prior Publication Data

US 2018/0091186 A1    Mar. 29, 2018

Related U.S. Application Data

(60) Provisional application No. 62/400,062, filed on Sep. 26, 2016, provisional application No. 62/440,408, filed on Dec. 30, 2016, provisional application No. 62/416,103, filed on Nov. 1, 2016.

(51) Int. Cl.
*H04B 1/525* (2015.01)
*H04L 5/14* (2006.01)
*H04L 27/26* (2006.01)
*H04L 27/00* (2006.01)
*H04B 1/00* (2006.01)

(Continued)

(52) U.S. Cl.
CPC ............ *H04B 1/525* (2013.01); *H04B 1/005* (2013.01); *H04L 5/1461* (2013.01); *H04L 27/0006* (2013.01); *H04L 27/2646* (2013.01); *H04L 5/001* (2013.01); *H04L 5/0037* (2013.01); *H04L 5/0066* (2013.01); *H04W 72/0453* (2013.01)

(58) Field of Classification Search
CPC .... H04B 1/525; H04L 5/1461; H04L 27/0006
See application file for complete search history.

(56) References Cited

U.S. PATENT DOCUMENTS 9,699,770 B2 * 7/2017 Oh .................... H04W 72/0413
2011/0249656 A1 * 10/2011 Cai ........................ H04L 1/0028
370/336

(Continued)

*Primary Examiner* — Gregory Sefcheck
*Assistant Examiner* — Jael Ulysse
(74) *Attorney, Agent, or Firm* — Lee Hong Degerman Kang Waimey

(57) ABSTRACT

There is provided a method for transmitting/receiving a signal in carrier aggregation. The method may comprise: transmitting an uplink signal by using two uplink carriers when three downlink carriers and two uplink carriers are configured to be aggregated. The three downlink carriers include three operating bands among evolved universal terrestrial radio access (E-UTRA) operating bands 1, 2, 3, 5, 12, 30 and 40 and the two uplink carrier includes two operating bands thereamong. The method may comprise: receiving a downlink signal through all of three downlink carriers. Here, a predetermined maximum sensitivity degradation (MSD) is applied to receiving reference sensitivity of the downlink signal, thereby successfully receiving the signal.

10 Claims, 11 Drawing Sheets

(51) Int. Cl.
    *H04L 5/00*         (2006.01)
    *H04W 72/04*        (2009.01)

(56)            References Cited

U.S. PATENT DOCUMENTS

| | | | |
|---|---|---|---|
| 2012/0207115 A1* | 8/2012 | Oh | H04L 5/0092 370/329 |
| 2012/0213095 A1* | 8/2012 | Krishnamurthy | H04L 5/001 370/252 |
| 2012/0322455 A1* | 12/2012 | Oh | H04W 72/048 455/450 |
| 2012/0327797 A1* | 12/2012 | Siomina | H04W 36/30 370/252 |
| 2013/0194987 A1* | 8/2013 | Immonen | H04W 52/367 370/311 |
| 2014/0092824 A1* | 4/2014 | He | H04W 52/0258 370/329 |
| 2015/0141068 A1* | 5/2015 | Immonen | H04L 5/001 455/522 |
| 2015/0215947 A1* | 7/2015 | Kaukovuori | H04W 72/082 370/329 |
| 2016/0302209 A1* | 10/2016 | Behravan | H04L 5/001 |
| 2017/0019146 A1* | 1/2017 | Jin | H04B 1/0475 |
| 2017/0019239 A1* | 1/2017 | Jin | H04L 1/004 |
| 2017/0019241 A1* | 1/2017 | Jin | H04L 5/1461 |
| 2017/0019242 A1* | 1/2017 | Jin | H04L 5/1461 |

* cited by examiner

STUDIES ABOUT MSD LEVEL IN AGGREGATING A PLURALITY OF DOWNLINK CARRIERS AND TWO UPLINK CARRIERS

CROSS-REFERENCE TO RELATED APPLICATIONS

Pursuant to 35 U.S.C. § 119(e), this application claims the benefit of U.S. Provisional Patent Application No. 62/400,062, filed on Sep. 26, 2016, 62/440,408, filed on Dec. 30, 2016, and 62/416,103, filed on Nov. 1, 2016, the contents of which are all hereby incorporated by reference herein in their entirety.

FIELD OF THE INVENTION

The present invention relates to mobile communication.

RELATED ART

3rd generation partnership project (3GPP) long term evolution (LTE) evolved from a universal mobile telecommunications system (UMTS) is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) evolved from the 3GPP LTE.

In LTE/LTE-A, a physical channel of LTE may be classified into a downlink channel, i.e., a PDSCH (Physical Downlink Shared Channel) and a PDCCH (Physical Downlink Control Channel), and an uplink channel, i.e., a PUSCH (Physical Uplink Shared Channel) and a PUCCH (Physical Uplink Control Channel).

A frequency which can be used for LTE/LTE-A, that is, a carrier is defined in 3GPP by considering radio wave situations of various countries.

Meanwhile, when a terminal configured with a carrier aggregation of two downlink (DL) carriers transmits an uplink signal, a harmonic is generated, thereby influencing a downlink band of the terminal itself.

SUMMARY OF THE INVENTION

Accordingly, an object of the present invention is to solve the above-mentioned problems.

To achieve the foregoing purposes, the disclosure of the present invention proposes a method for transmitting/receiving a signal in carrier aggregation. The method may comprise: transmitting an uplink signal by using two uplink carriers when three downlink carriers and two uplink carriers are configured to be aggregated. The three downlink carriers include three operating bands among evolved universal terrestrial radio access (E-UTRA) operating bands 1, 2, 3, 5, 12, 30 and 40 and the two uplink carrier includes two operating bands thereamong. The method may comprise: receiving a downlink signal through all of three downlink carriers. Here, a predetermined maximum sensitivity degradation (MSD) is applied to receiving reference sensitivity of the downlink signal, thereby successfully receiving the signal.

When the three downlink carriers include operating bands 1, 3 and 40 and when two uplink carriers include operating band 1 and 3, the MSD value may be 8.0 dB for the downlink carrier of the operating band 40.

When the three downlink carriers include operating band 1, 5 and 40 and when two uplink carriers include operating band 1 and 5, the MSD value may be 9.0 dB for the downlink carrier of the operating band 40.

When the three downlink carriers include operating band 2, 12 and 30 and when two uplink carriers include operating band 2 and 12, the MSD value may be 12.0 dB for the downlink carrier of the operating band 30.

To achieve the foregoing purposes, the disclosure of the present invention proposes a wireless device for transmitting/receiving a signal in carrier aggregation. The wireless device may comprise: a transmitter configured to transmit an uplink signal by using two uplink carriers when three downlink carriers and two uplink carriers are configured to be aggregated. The three downlink carriers include three operating bands among evolved universal terrestrial radio access (E-UTRA) operating bands 1, 2, 3, 5, 12, 30 and 40 and the two uplink carrier includes two operating bands thereamong. The wireless device may comprise: a receiver configured to receive a downlink signal through all of three downlink carriers. Here, a predetermined maximum sensitivity degradation (MSD) is applied to receiving reference sensitivity of the downlink signal, thereby successfully receiving the signal.

According to the disclosure of the present invention, the problem of the conventional technology described above may be solved.

DESCRIPTION OF EXEMPLARY EMBODIMENTS

Figure 1:
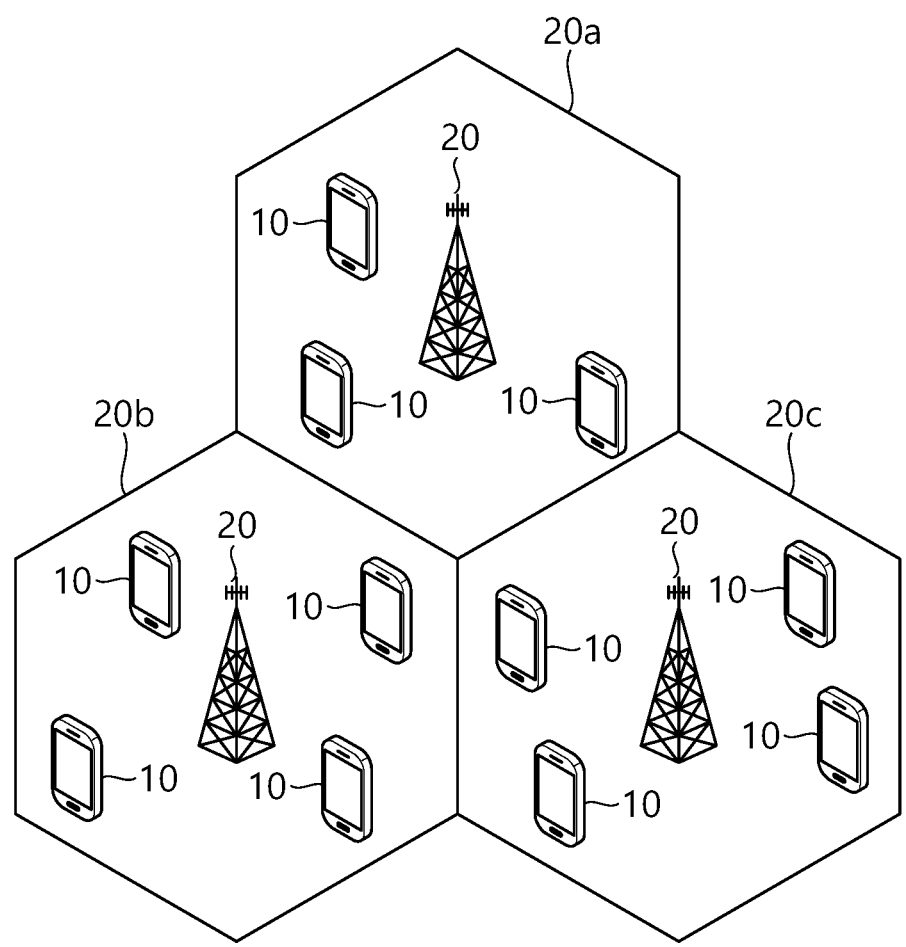
FIG. 1 is a wireless communication system.

Hereinafter, based on 3rd Generation Partnership Project (3GPP) long term evolution (LTE) or 3GPP LTE-advanced (LTE-A), the present invention will be applied. This is just an example, and the present invention may be applied to various wireless communication systems. Hereinafter, LTE includes LTE and/or LTE-A.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present invention includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present invention, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), or access point.

As used herein, 'user equipment (UE)' may be stationary or mobile, and may be denoted by other terms such as device, wireless device, terminal, MS (mobile station), UT (user terminal), SS (subscriber station), MT (mobile terminal) and etc.

FIG. 1 Illustrates a Wireless Communication System.

As seen with reference to FIG. 1, the wireless communication system includes at least one base station (BS) 20. Each base station 20 provides a communication service to specific geographical areas (generally, referred to as cells) 20*a*, 20*b*, and 20*c*. The cell can be further divided into a plurality of areas (sectors).

The UE generally belongs to one cell and the cell to which the UE belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the UE1 10 and an uplink means communication from the UE 10 to the base station 20. In the downlink, a transmitter may be a part of the base station 20 and a receiver may be a part of the UE 10. In the uplink, the transmitter may be a part of the UE 10 and the receiver may be a part of the base station 20.

Meanwhile, the wireless communication system may be generally divided into a frequency division duplex (FDD) type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency area. Accordingly, in the TDD based wireless communication system, the downlink channel response may be acquired from the uplink channel response. In the TDD type, since an entire frequency band is time-divided in the uplink transmission and the downlink transmission, the downlink transmission by the base station and the uplink transmission by the terminal may not be performed simultaneously. In the TDD system in which the uplink transmission and the downlink transmission are divided by the unit of a sub-frame, the uplink transmission and the downlink transmission are performed in different sub-frames.

Hereinafter, the LTE system will be described in detail.

Figure 2:
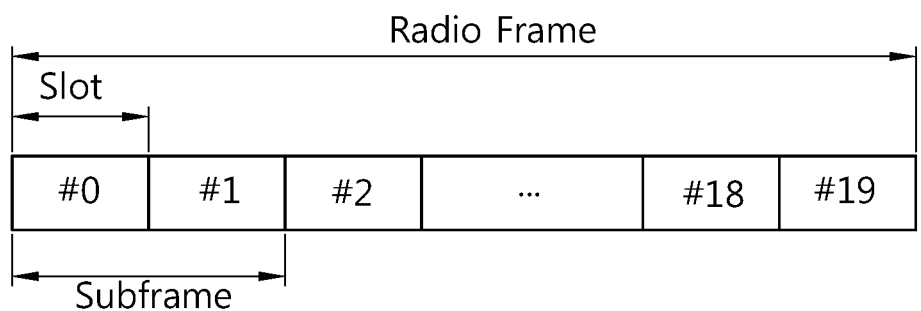
FIG. 2 illustrates a structure of a radio frame according to FDD in 3GPP LTE.

FIG. 2 Shows a Downlink Radio Frame Structure According to FDD of 3rd Generation Partnership Project (3GPP) Long Term Evolution (LTE).

The radio frame includes 10 sub-frames indexed 0 to 9. One sub-frame includes two consecutive slots. Accordingly, the radio frame includes 20 slots. The time taken for one sub-frame to be transmitted is denoted TTI (transmission time interval). For example, the length of one sub-frame may be 1 ms, and the length of one slot may be 0.5 ms.

The structure of the radio frame is for exemplary purposes only, and thus the number of sub-frames included in the radio frame or the number of slots included in the sub-frame may change variously.

Meanwhile, one slot may include a plurality of orthogonal frequency division multiplexing (OFDM) symbols. The number of OFDM symbols included in one slot may vary depending on a cyclic prefix (CP). One slot includes 7 OFDM symbols in case of a normal CP, and one slot includes 6 OFDM symbols in case of an extended CP. Herein, since the 3GPP LTE uses orthogonal frequency division multiple access (OFDMA) in a downlink (DL), the OFDM symbol is only for expressing one symbol period in a time domain, and there is no limitation in a multiple access scheme or terminologies. For example, the OFDM symbol may also be referred to as another terminology such as a single carrier frequency division multiple access (SC-FDMA) symbol, a symbol period, etc.

Figure 3:
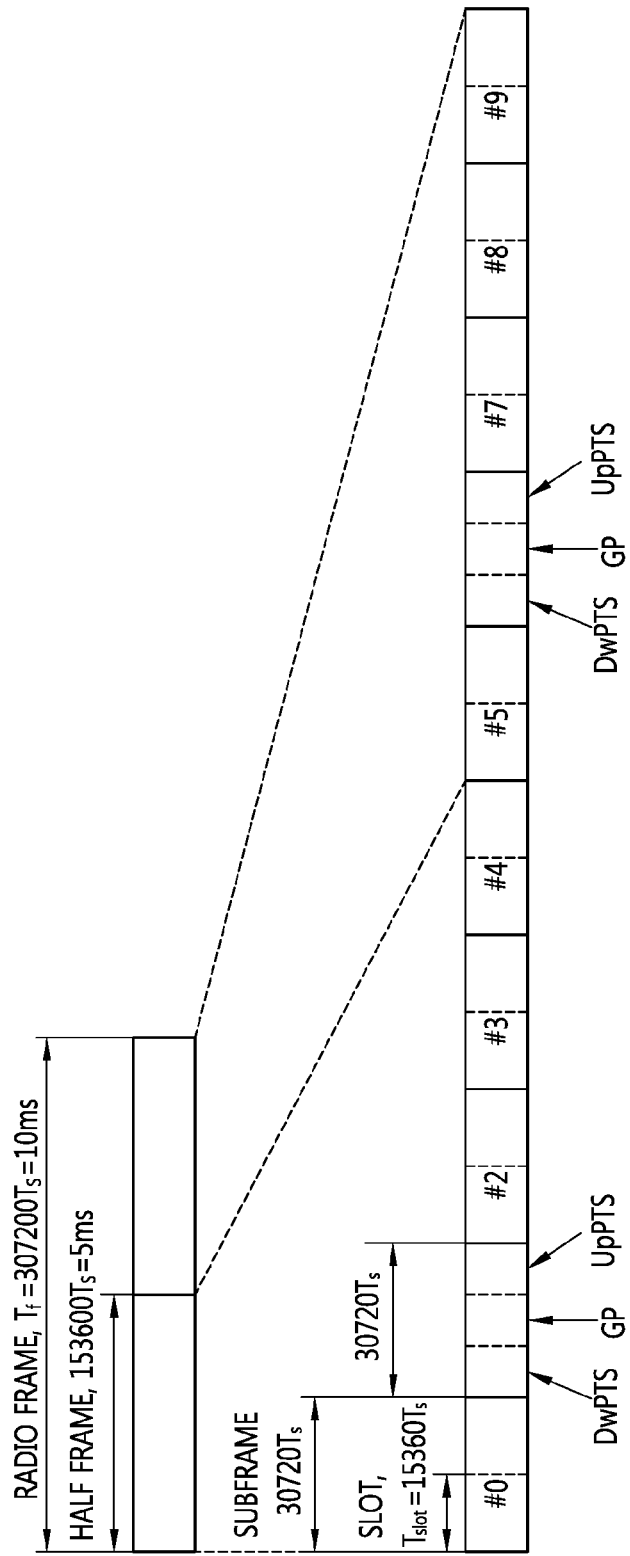
FIG. 3 illustrates a structure of a downlink radio frame according to TDD in the 3GPP LTE.

FIG. 3 Illustrates the Architecture of a Downlink Radio Frame According to TDD in 3GPP LTE.

Sub-frames having index #1 and index #6 are denoted special sub-frames, and include a DwPTS (Downlink Pilot Time Slot: DwPTS), a GP (Guard Period) and an UpPTS (Uplink Pilot Time Slot). The DwPTS is used for initial cell search, synchronization, or channel estimation in a terminal. The UpPTS is used for channel estimation in the base station and for establishing uplink transmission sync of the terminal. The GP is a period for removing interference that arises on uplink due to a multi-path delay of a downlink signal between uplink and downlink.

In TDD, a DL (downlink) sub-frame and a UL (Uplink) co-exist in one radio frame. Table 1 shows an example of configuration of a radio frame.

TABLE 1

| UL-DL configuration | Switch-point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms  | D | S | U | U | U | D | S | U | U | U |
| 1 | 5 ms  | D | S | U | U | D | D | S | U | U | D |
| 2 | 5 ms  | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms  | D | S | U | U | U | D | S | U | U | D |

'D' denotes a DL sub-frame, 'U' a UL sub-frame, and 'S' a special sub-frame. When receiving a UL-DL configuration from the base station, the terminal may be aware of whether a sub-frame is a DL sub-frame or a UL sub-frame according to the configuration of the radio frame.

TABLE 2

| Special subframe configuration | Normal CP in downlink | | | Extended CP in downlink | | |
|---|---|---|---|---|---|---|
| | | UpPTS | | | UpPTS | |
| | DwPTS | Normal CP in uplink | Extended CP in uplink | DwPTS | Normal CP in uplink | Extended CP in uplink |
| 0 | 6592 * Ts  | 2192 * Ts | 2560 * Ts | 7680 * Ts  | 2192 * Ts | 2560 * Ts |
| 1 | 19760 * Ts |           |           | 20480 * Ts |           |           |
| 2 | 21952 * Ts |           |           | 23040 * Ts |           |           |
| 3 | 24144 * Ts |           |           | 25600 * Ts |           |           |
| 4 | 26336 * Ts |           |           | 7680 * Ts  | 4384 * Ts | 5120 * ts |
| 5 | 6592 * Ts  | 4384 * Ts | 5120 * ts | 20480 * Ts |           |           |
| 6 | 19760 * Ts |           |           | 23040 * Ts |           |           |
| 7 | 21952 * Ts |           |           | —          |           |           |
| 8 | 24144 * Ts |           |           | —          |           |           |

Figure 4:
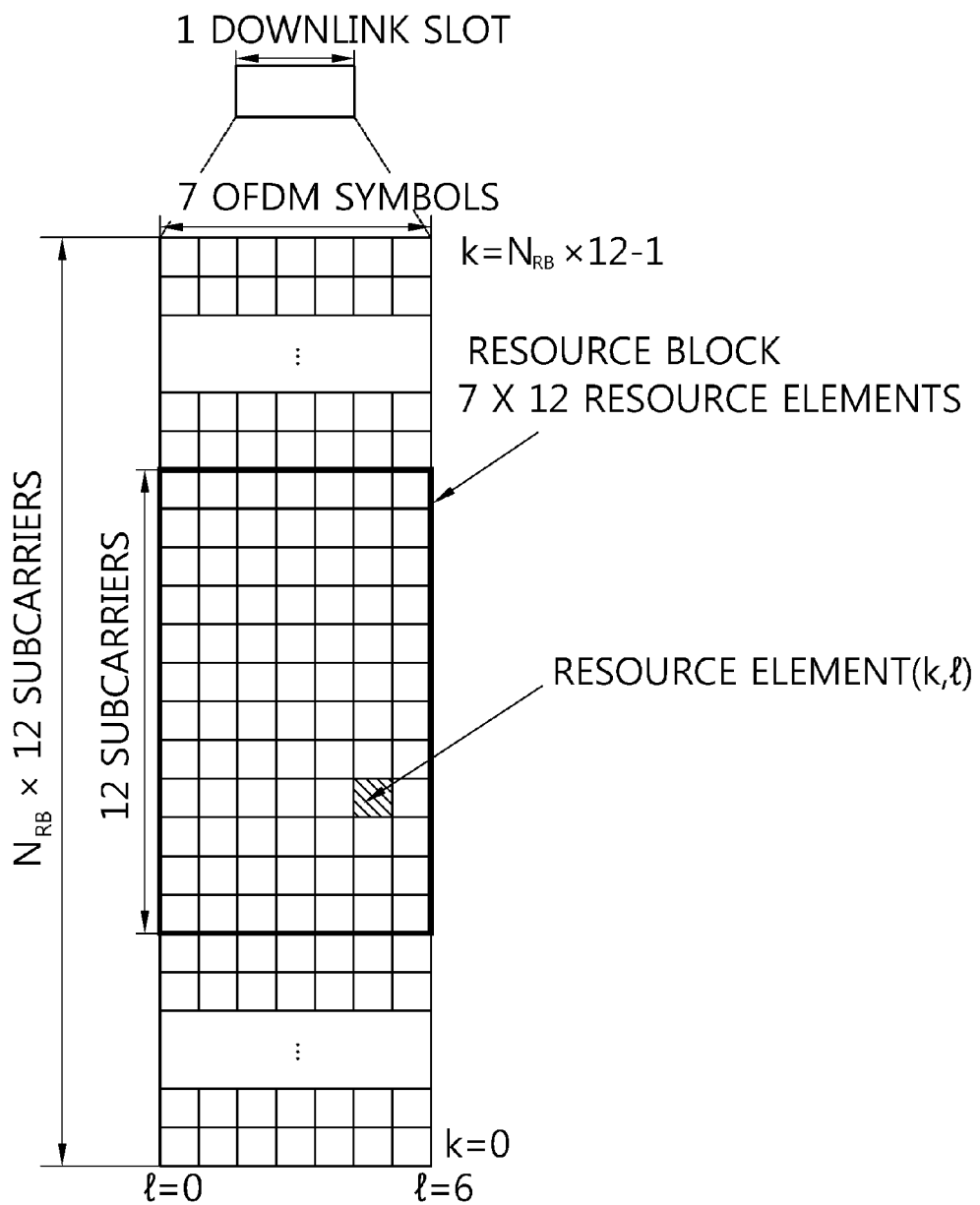
FIG. 4 is an exemplary diagram illustrating a resource grid for one uplink or downlink slot in the 3GPP LTE.

FIG. 4 Illustrates an Example Resource Grid for One Uplink or Downlink Slot in 3GPP LTE.

Referring to FIG. 4, the uplink slot includes a plurality of OFDM (orthogonal frequency division multiplexing) symbols in the time domain and NRB resource blocks (RBs) in the frequency domain. For example, in the LTE system, the number of resource blocks (RBs), i.e., NRB, may be one from 6 to 110.

The resource block is a unit of resource allocation and includes a plurality of sub-carriers in the frequency domain. For example, if one slot includes seven OFDM symbols in the time domain and the resource block includes 12 sub-carriers in the frequency domain, one resource block may include 7×12 resource elements (REs).

Meanwhile, the number of sub-carriers in one OFDM symbol may be one of 128, 256, 512, 1024, 1536, and 2048.

In 3GPP LTE, the resource grid for one uplink slot shown in FIG. 4 may also apply to the resource grid for the downlink slot.

Figure 5:
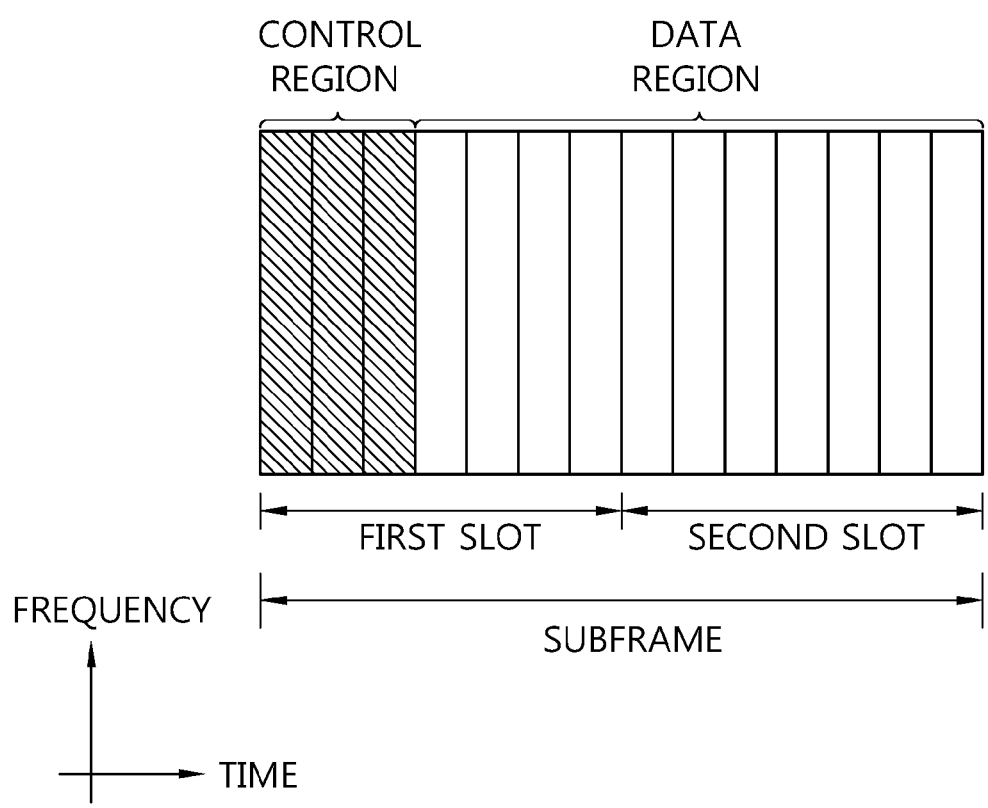
FIG. 5 illustrates a structure of a downlink subframe.

FIG. 5 Illustrates the Architecture of a Downlink Sub-Frame.

In FIG. 5, assuming the normal CP, one slot includes seven OFDM symbols, by way of example.

The DL (downlink) sub-frame is split into a control region and a data region in the time domain. The control region includes up to first three OFDM symbols in the first slot of the sub-frame. However, the number of OFDM symbols included in the control region may be changed. A PDCCH (physical downlink control channel) and other control channels are assigned to the control region, and a PDSCH is assigned to the data region.

The physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

Figure 6:
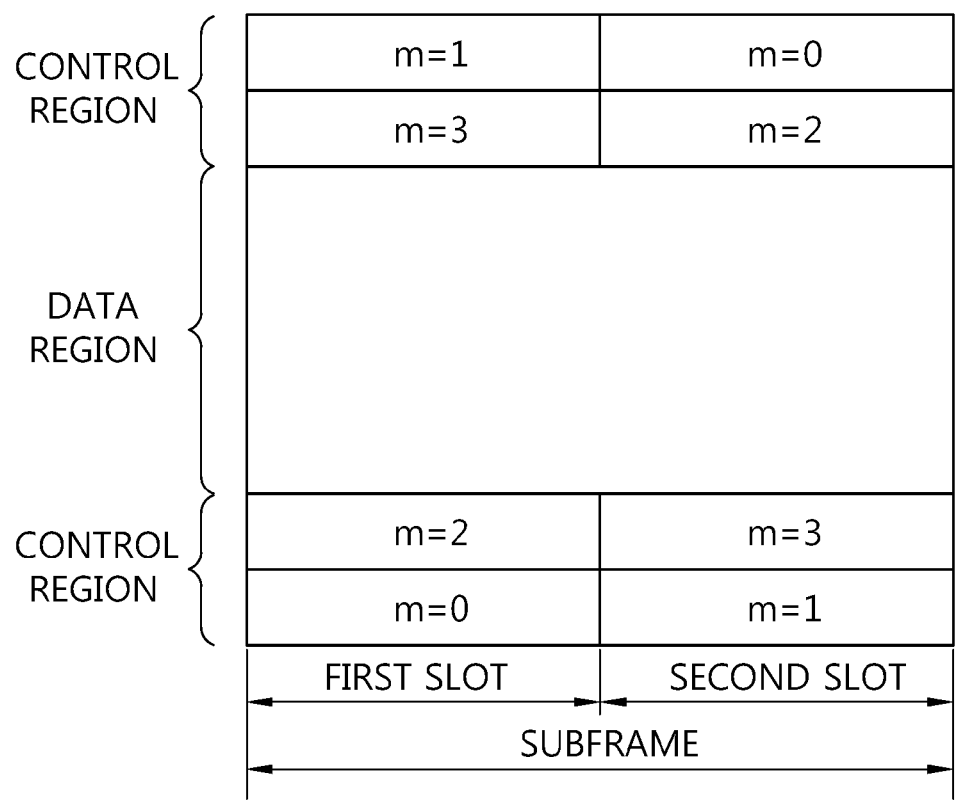
FIG. 6 illustrates the architecture of an uplink subframe in 3GPP LTE.
Figure 6:
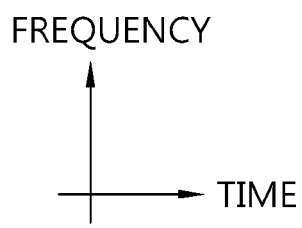

FIG. 6 Illustrates the Architecture of an Uplink Sub-Frame in 3GPP LTE.

Referring to FIG. 6, the uplink sub-frame may be separated into a control region and a data region in the frequency domain. The control region is assigned a PUCCH (physical uplink control channel) for transmission of uplink control information. The data region is assigned a PUSCH (physical uplink shared channel) for transmission of data (in some cases, control information may also be transmitted).

The PUCCH for one terminal is assigned in resource block (RB) pair in the sub-frame. The resource blocks in the resource block pair take up different sub-carriers in each of the first and second slots. The frequency occupied by the resource blocks in the resource block pair assigned to the PUCCH is varied with respect to a slot boundary. This is referred to as the RB pair assigned to the PUCCH having been frequency-hopped at the slot boundary.

The terminal may obtain a frequency diversity gain by transmitting uplink control information through different sub-carriers over time. m is a location index that indicates a logical frequency domain location of a resource block pair assigned to the PUCCH in the sub-frame.

The uplink control information transmitted on the PUCCH includes an HARQ (hybrid automatic repeat request), an ACK (acknowledgement)/NACK (non-acknowledgement), a CQI (channel quality indicator) indicating a downlink channel state, and an SR (scheduling request) that is an uplink radio resource allocation request.

The PUSCH is mapped with a UL-SCH that is a transport channel. The uplink data transmitted on the PUSCH may be a transport block that is a data block for the UL-SCH transmitted for the TTI. The transport block may be user information. Or, the uplink data may be multiplexed data. The multiplexed data may be data obtained by multiplexing the transport block for the UL-SCH and control information. For example, the control information multiplexed with the data may include a CQI, a PMI (precoding matrix indicator), an HARQ, and an RI (rank indicator). Or, the uplink data may consist only of control information.

<Carrier Aggregation (CA)>

Hereinafter, a carrier aggregation system will be described.

The carrier aggregation (CA) system means aggregating multiple component carriers (CCs). By the carrier aggregation, the existing meaning of the cell is changed. According to the carrier aggregation, the cell may mean a combination of a downlink component carrier and an uplink component carrier or a single downlink component carrier.

Further, in the carrier aggregation, the cell may be divided into a primary cell, secondary cell, and a serving cell. The primary cell means a cell that operates at a primary frequency and means a cell in which the UE performs an initial connection establishment procedure or a connection reestablishment procedure with the base station or a cell indicated by the primary cell during a handover procedure. The secondary cell means a cell that operates at a secondary frequency and once an RRC connection is established, the secondary cell is configured and is used to provide an additional radio resource.

The carrier aggregation system may be divided into a continuous carrier aggregation system in which aggregated carriers are contiguous and a non-contiguous carrier aggregation system in which the aggregated carriers are separated from each other. Hereinafter, when the contiguous and non-contiguous carrier systems are just called the carrier aggregation system, it should be construed that the carrier aggregation system includes both a case in which the component carriers are contiguous and a case in which the component carriers are non-contiguous. The number of component carriers aggregated between the downlink and the uplink may be differently set. A case in which the number of downlink CCs and the number of uplink CCs are the same as each other is referred to as symmetric aggregation and a case in which the number of downlink CCs and the number of uplink CCs are different from each other is referred to as asymmetric aggregation.

Meanwhile, the carrier aggregation (CA) technologies, as described above, may be generally separated into an inter-band CA technology and an intra-band CA technology. The inter-band CA is a method that aggregates and uses CCs that are present in different bands from each other, and the intra-band CA is a method that aggregates and uses CCs in the same frequency band. Further, CA technologies are more specifically split into intra-band contiguous CA, intra-band non-contiguous CA, and inter-band non-contiguous CA.

Figure 7A:
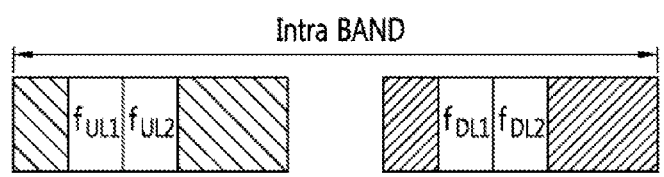
FIG. 7A illustrates intra-band contiguous CA.
Figure 7B:
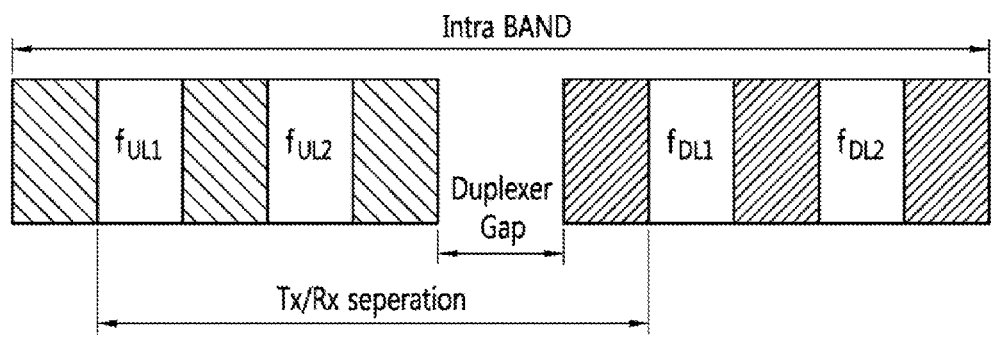
FIG. 7B illustrates intra-band non-contiguous CA.

FIG. 7A Illustrates Intra-Band Contiguous CA, and FIG. 7B Illustrates Intra-Band Non-Contiguous CA.

LTE-advanced adds various schemes including uplink MIMO and carrier aggregation in order to realize high-speed wireless transmission. The CA that is being discussed in LTE-advanced may be split into the intra-band contiguous CA shown in FIG. 7A and the intra-band non-contiguous CA shown in FIG. 7B.

Figure 8A:
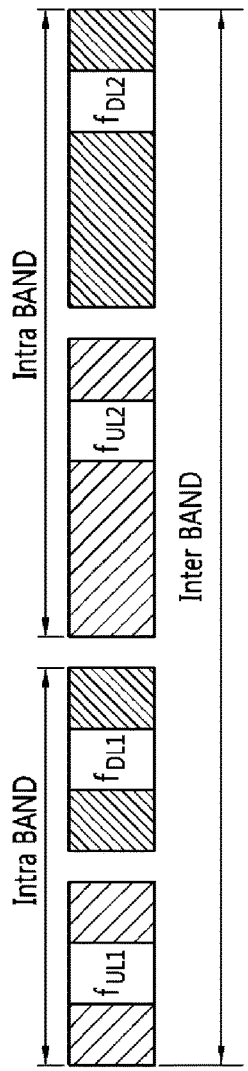
FIG. 8A illustrates a combination of a lower band and a higher band for inter-band CA.
Figure 8B:
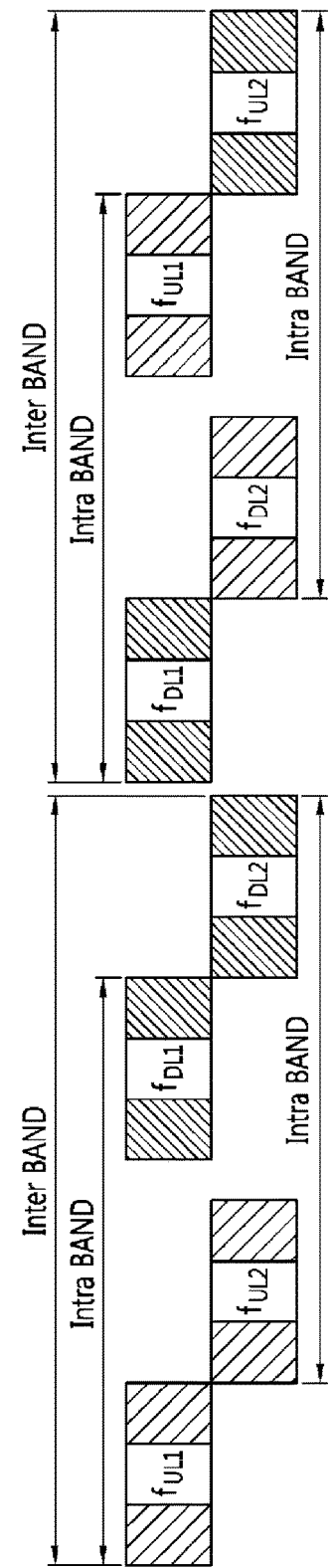
FIG. 8B illustrates a combination of similar frequency bands for inter-band CA.

FIG. 8A Illustrates a Combination of a Lower Band and a Higher Band for Inter-Band CA, and FIG. 8B Illustrates a Combination of Similar Frequency Bands for Inter-Band CA.

In other words, the inter-band carrier aggregation may be separated into inter-band CA between carriers of a low band and a high band having different RF characteristics of inter-band CA as shown in FIG. 8A and inter-band CA of similar frequencies that may use a common RF terminal per component carrier due to similar RF (radio frequency) characteristics as shown in FIG. 8B.

TABLE 3

| Operating Band | Uplink (UL) operating band $F_{UL\_low}$-$F_{UL\_high}$ | Downlink (DL) operating band $F_{DL\_low}$-$F_{DL\_high}$ | Duplex Mode |
|---|---|---|---|
| 1 | 1920 MHz-1980 MHz | 2110 MHz-2170 MHz | FDD |
| 2 | 1850 MHz-1910 MHz | 1930 MHz-1990 MHz | FDD |
| 3 | 1710 MHz-1785 MHz | 1805 MHz-1880 MHz | FDD |
| 4 | 1710 MHz-1755 MHz | 2110 MHz-2155 MHz | FDD |
| 5 | 824 MHz-849 MHz | 869 MHz-894 MHz | FDD |
| 6 | 830 MHz-840 MHz | 875 MHz-885 MHz | FDD |
| 7 | 2500 MHz-2570 MHz | 2620 MHz-2690 MHz | FDD |
| 8 | 880 MHz-915 MHz | 925 MHz-960 MHz | FDD |
| 9 | 1749.9 MHz-1784.9 MHz | 1844.9 MHz-1879.9 MHz | FDD |
| 10 | 1710 MHz-1770 MHz | 2110 MHz-2170 MHz | FDD |
| 11 | 1427.9 MHz-1447.9 MHz | 1475.9 MHz-1495.9 MHz | FDD |
| 12 | 699 MHz-716 MHz | 729 MHz-746 MHz | FDD |
| 13 | 777 MHz-787 MHz | 746 MHz-756 MHz | FDD |
| 14 | 788 MHz-798 MHz | 758 MHz-768 MHz | FDD |
| 15 | Reserved | Reserved | FDD |
| 16 | Reserved | Reserved | FDD |
| 17 | 704 MHz-716 MHz | 734 MHz-746 MHz | FDD |
| 18 | 815 MHz-830 MHz | 860 MHz-875 MHz | FDD |
| 19 | 830 MHz-845 MHz | 875 MHz-890 MHz | FDD |
| 20 | 832 MHz-862 MHz | 791 MHz-821 MHz | FDD |
| 21 | 1447.9 MHz-1462.9 MHz | 1495.9 MHz-1510.9 MHz | FDD |
| 22 | 3410 MHz-3490 MHz | 3510 MHz-3590 MHz | FDD |
| 23 | 2000 MHz-2020 MHz | 2180 MHz-2200 MHz | FDD |

TABLE 3-continued

| Operating Band | Uplink (UL) operating band $F_{UL\_low}$-$F_{UL\_high}$ | Downlink (DL) operating band $F_{DL\_low}$-$F_{DL\_high}$ | Duplex Mode |
|---|---|---|---|
| 24 | 1626.5 MHz-1660.5 MHz | 1525 MHz-1559 MHz | FDD |
| 25 | 1850 MHz-1915 MHz | 1930 MHz-1995 MHz | FDD |
| 26 | 814 MHz-849 MHz | 859 MHz-894 MHz | FDD |
| 27 | 807 MHz-824 MHz | 852 MHz-869 MHz | FDD |
| 28 | 703 MHz-748 MHz | 758 MHz-803 MHz | FDD |
| 29 | N/A | 717 MHz-728 MHz | FDD |
| 30 | 2305 MHz-2315 MHz | 2350 MHz-2360 MHz | FDD |
| 31 | 452.5 MHz-457.5 MHz | 462.5 MHz-467.5 MHz | FDD |
| 32 | N/A | 1452 MHz-1496 MHz | FDD |
| 33 | 1900 MHz-1920 MHz | 1900 MHz-1920 MHz | TDD |
| 34 | 2010 MHz-2025 MHz | 2010 MHz-2025 MHz | TDD |
| 35 | 1850 MHz-1910 MHz | 1850 MHz-1910 MHz | TDD |
| 36 | 1930 MHz-1990 MHz | 1930 MHz-1990 MHz | TDD |
| 37 | 1910 MHz-1930 MHz | 1910 MHz-1930 MHz | TDD |
| 38 | 2570 MHz-2620 MHz | 2570 MHz-2620 MHz | TDD |
| 39 | 1880 MHz-1920 MHz | 1880 MHz-1920 MHz | TDD |
| 40 | 2300 MHz-2400 MHz | 2300 MHz-2400 MHz | TDD |
| 41 | 2496 MHz 2690 MHz | 2496 MHz 2690 MHz | TDD |
| 42 | 3400 MHz-3600 MHz | 3400 MHz-3600 MHz | TDD |
| 43 | 3600 MHz-3800 MHz | 3600 MHz-3800 MHz | TDD |
| 44 | 703 MHz-803 MHz | 703 MHz-803 MHz | TDD |
| 45 | 1447 MHz-1467 MHz | 1447 MHz-1467 MHz | TDD |
| 46 | 5150 MHz-5925 MHz | 5150 MHz-5925 MHz | TDD8, 9 |
| 47 | 5855 MHz-5925 MHz | 5855 MHz-5925 MHz | TDD |
| 48 | 3550 MHz-3700 MHz | 3550 MHz-3700 MHz | TDD |
| 64 | | Reserved | |
| 65 | 1920 MHz-2010 MHz | 2110 MHz-2200 MHz | FDD |
| 66 | 1710 MHz-1780 MHz | 2110 MHz-2200 MHz | FDD4 |
| 67 | N/A | 738 MHz-758 MHz | FDD2 |
| 68 | 698 MHz-728 MHz | 753 MHz-783 MHz | FDD |
| 69 | N/A | 2570 MHz-2620 MHz | FDD |
| 70 | 1695 MHz-1710 MHz | 1995 MHz-2020 MHz | FDD10 |

In this case, $F_{UL\_low}$ means the lowest frequency of an UL operating band. Furthermore, $F_{UL\_high}$ means the highest frequency of an UL operating band. Furthermore, $F_{DL\_low}$ means the lowest frequency of a DL operating band. Furthermore, $F_{DL\_high}$ means the highest frequency of a DL operating band.

Figure 9:
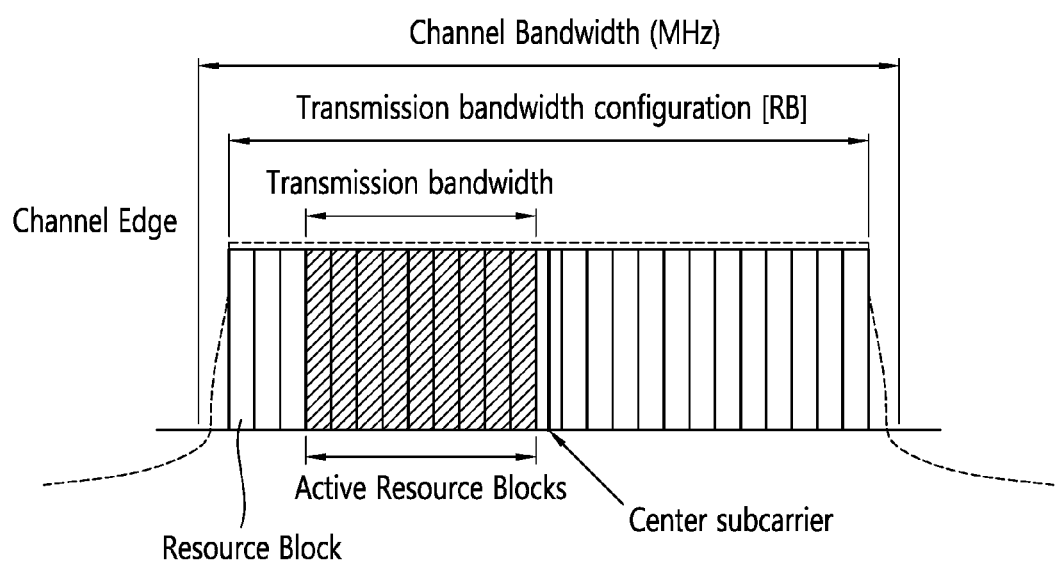
FIG. 9 shows a relation between a channel band MHz and a resource block (RB).

FIG. 9 Shows a Relation Between a Channel Band MHz and a Resource Block (RB).

As may be seen with reference to FIG. 9, a transmission bandwidth smaller than a channel bandwidth BWChannel is set. The setting of the transmission bandwidth is performed by a plurality of resource blocks (RBs). Furthermore, the outskirt of a channel is the highest and lowest frequencies separated by the channel bandwidth.

Meanwhile, as described above, a 3GPP LTE system supports channel bandwidths of 1.4 MHz, 3 MHz, 5 MHz, 10 MHz, 15 MHz and 20 MHz. A relation between such a channel bandwidth and a resource block is listed in the following table.

TABLE 4

| | Channel bandwidth $BW_{Channel}$ [MHz] | | | | |
|---|---|---|---|---|---|
| | 1.4 | 3 | 5 | 10 | 15 | 20 |
| Transmission bandwidth configuration $N_{RB}$ | 6 | 15 | 25 | 50 | 75 | 100 |

Meanwhile, intra-band contiguous CA bandwidth classes and their corresponding guard bands are as shown in the following table.

TABLE 5

| CA Bandwidth Class | Aggregated Transmission Bandwidth Configuration | Maximum number of CCs | Nominal Guard Band $BW_{GB}$ |
|---|---|---|---|
| A | $N_{RB,\ agg} \leq 100$ | 1 | a1 $BW_{Channel(1)}$ -0.5Δf1 (NOTE2) |
| B | $N_{RB,\ agg} \leq 100$ | 2 | 0.05 max($BW_{Channel(1)}$, $BW_{Channel(2)}$) - 0.5Δf1 |
| C | $100 < N_{RB,\ agg} \leq 200$ | 2 | 0.05 max($BW_{Channel(1)}$, $BW_{Channel(2)}$) - 0.5Δf1 |
| D | $200 < N_{RB,\ agg} \leq [300]$ | FFS | 0.05 max($BW_{Channel(1)}$, $BW_{Channel(2)}$) - 0.5Δf1 |
| E | $[300] < N_{RB,\ agg} \leq [400]$ | FFS | FFS |
| F | $[400] < N_{RB,\ agg} \leq [500]$ | FFS | FFS |

NOTE1:
$BW_{Channel(i)}$, $i$ = 1, 2, 3 is the channel bandwidth of the E-UTRA component carriers defined in TS36.101 table 5.6-1, Δf1 represents subcarrier spacing of Δf when downlink, and Δf1 = 0 in downlink.
(NOTE2):
In case that the channel frequency bandwidth is 1.4 MHz, a1 = 0.16/1.4, and in the remainder frequency band, a1 = 0.05.

In the above table, the brackets [ ] represent that the value therebetween is not completely determined and may be varied. FFS stands for 'For Further Study.' $N_{RB\_agg}$ is the number of RBs aggregated in an aggregation channel band.

Meanwhile, up to now, for a case where a maximum of two downlink carriers are aggregated, maximum sensitivity degradation (MSD) and the like have been researched. However, a situation in which three of more downlink carriers and two uplink carriers are aggregated has not researched up to now. Therefore, hereinafter, the situation will be proposed.

<Aggregation of a Plurality of Downlink Carriers and Two Uplink Carriers>

Hereinafter, when the terminal aggregates a plurality of downlink carriers and aggregates two uplink carriers are aggregated and when the terminal transmits the uplink signal using a carrier aggregation of two uplink carriers, it is analyzed whether interference leaks to the downlink band of the terminal and thereafter, a solution for the leakage is presented.

Figure 10:
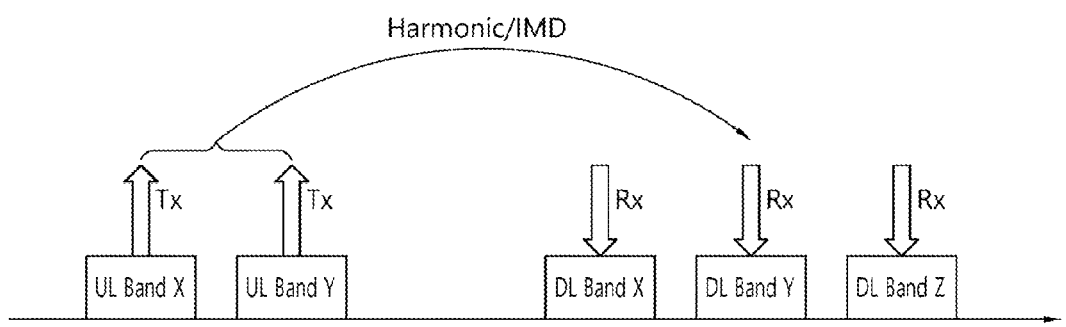
FIG. 10 illustrates a situation where a harmonic component and intermodulation distortion (IMD) are introduced into downlink band when uplink signal is transmitted using a carrier aggregation of two uplink carriers.

FIG. 10 Illustrates a Situation where a Harmonic Component and Intermodulation Distortion (IMD) are Introduced into Downlink Band when Uplink Signal is Transmitted Using a Carrier Aggregation of Two Uplink Carriers.

As shown in FIG. 10, presented is a scheme for preventing receiving sensitivity from being decreased as the generated harmonics component and intermodulation distortion (IMD) component flow into the downlink band of the terminal when the terminal transmits the uplink signal through two uplink carriers. Moreover, since a receiving sensitivity level in the downlink band of the terminal may not be completely prevented from being decreased with cross isolation and coupling loss by the PCB even though the terminal appropriately solves the decrease in receiving sensitivity, a scheme for alleviating requirements which the terminal satisfies in the related art is presented.

<Disclosure of the Present Specification>

For the 3DL/2UL CA band combinations, the present specification provides an analysis about the impact to the 3rd own receiving band by the harmonics and IMD products from the dual uplink transmission. For 4DL/2UL CA and 5DL/2UL CA band combinations, the present specification provides an analysis about the impact to the 3rd and 4th or 3rd, 4th and 5th own receiving bands by the harmonics and IMD products from the dual uplink transmission.

I. 3DLs/2ULs Inter-Band Carrier Aggregation

I-1. LTE Advanced Carrier Aggregation: Band 3 and Band 3 and Band 8 with 2 ULs

TABLE 6

| E-UTRA CA Configuration | Uplink CA configurations | E-UTRA Bands | 1.4 MHz | 3 MHz | 5 MHz | 10 MHz | 15 MHz | 20 MHz | Maximum aggregated bandwidth [MHz] | Bandwidth combination set |
|---|---|---|---|---|---|---|---|---|---|---|
| CA_3A-3A-8A | CA_3A-8A | CA_3A-3A |  |  |  |  |  |  | 50 | 0 |
|  |  | 8 |  |  | Yes | Yes |  |  |  |  |
|  |  | CA_3A-3A |  |  |  |  |  |  | 40 | 1 |
|  |  | 8 |  |  | Yes | Yes |  |  |  |  |

Below table shows E-UTRA CA_3A-3A configurations and bandwidth combination sets for intra-band CA.

TABLE 7

| | | E-UTRA CA configuration/Bandwidth combination set | | | | | |
|---|---|---|---|---|---|---|---|
| | | Component carriers in order of increasing carrier frequency | | | | | |
| E-UTRA CA configuration | Uplink CA configurations | Channel bandwidths for carrier [MHz] | Channel bandwidths for carrier [MHz] | Channel bandwidths for carrier [MHz] | Channel bandwidths for carrier [MHz] | Maximum aggregated bandwidth [MHz] | Bandwidth combination set |
| CA_3A-3A | — | 5, 10, 15, 20 | 5, 10, 15, 20 | | | 40 | 0 |
| | | 5, 10 | 5, 10, 15, 20 | | | 30 | 1 |

I-2. LTE Advanced Carrier Aggregation: Band 1 and Band 5 and Band 46 with 2 ULs

TABLE 8

| E-UTRA CA Configuration | Uplink CA configurations | E-UTRA Bands | 1.4 MHz | 3 MHz | 5 MHz | 10 MHz | 15 MHz | 20 MHz | Maximum aggregated bandwidth [MHz] | Bandwidth combination set |
|---|---|---|---|---|---|---|---|---|---|---|
| CA_1A-5A-46A | CA_1A-5A | 1 |  |  | Yes | Yes | Yes | Yes | 50 | 0 |
|  |  | 5 |  |  | Yes | Yes |  |  |  |  |
|  |  | 46 |  |  |  |  |  | Yes |  |  |

I-2-1. Co-Existence Studies for LTE-A UL CA_1A-5A and DL CA_1A-5A-46A

For 2UL/3DL own receiver desensitization study up to $8^{th}$ order harmonics and $2^{nd}$, $3^{rd}$, $4^{th}$ and $5^{th}$ order intermodulation products were calculated and presented in below tables.

Below table shows a harmonic analysis.

TABLE 9

| UE UL carriers | fx_low | fx_high | fy_low | fy_high |
|---|---|---|---|---|
| UL frequency (MHz) | 824 | 849 | 1920 | 1980 |
| 2nd harmonics frequency limits | 2*fx_low | 2*fx_high | 2* fy_low | 2* fy_high |
| 2nd harmonics frequency limits (MHz) | 1648 | 1698 | 3840 | 3960 |
| 3rd harmonics frequency limits | 3*fx_low | 3*fx_high | 3* fy_low | 3* fy_high |
| 3rd harmonics frequency limits (MHz) | 2472 | 2547 | 5760 | 5940 |
| 4th harmonics frequency limits | 4*fx_low | 4*fx_high | 4* fy_low | 4* fy_high |
| 4th harmonics frequency limits (MHz) | 3296 | 3396 | 7680 | 7920 |
| 5th harmonics frequency limits | 5*fx_low | 5*fx_high | 5* fy_low | 5* fy_high |
| 5th harmonics frequency limits (MHz) | 4120 | 4245 | 9600 | 9900 |
| 6th harmonics frequency limits | 6*fx_low | 6*fx_high | 6* fy_low | 6* fy_high |
| 6th harmonics frequency limits (MHz) | 4944 | 5094 | 11520 | 11880 |
| 7th harmonics frequency limits | 7*fx_low | 7*fx_high | 7* fy_low | 7* fy_high |
| 7th harmonics frequency limits (MHz) | 5768 | 5943 | 13440 | 13860 |
| 8th harmonics frequency limits | 8*fx_low | 8*fx_high | 8* fy_low | 8* fy_high |
| 8th harmonics frequency limits (MHz) | 6592 | 6792 | 15360 | 15840 |

Below table shows IMD analysis

TABLE 10

| UE UL carriers | fx_low | fx_high | fy_low | fy_high |
|---|---|---|---|---|
| UL frequency (MHz) | 824 | 849 | 1920 | 1980 |
| 2nd harmonics frequency limits | 2*fx_low | 2*fx_high | 2* fy_low | 2* fy_high |
| 2nd harmonics frequency limits (MHz) | 1648 | 1698 | 3840 | 3960 |
| 3rd harmonics frequency limits | 3*fx_low | 3*fx_high | 3* fy_low | 3* fy_high |
| 3rd harmonics frequency limits (MHz) | 2472 | 2547 | 5760 | 5940 |
| Two tone 2nd order IMD products | \|fy_low − fx_high\| | \|fy_high − fx_low\| | \|fy_low + fx_low\| | \|fy_high + fx_high\| |
| IMD frequency limits (MHz) | 1071 | 1156 | 2744 | 2829 |
| Two-tone 3rd order IMD products | \|2*fx_low − fy_high\| | \|2*fx_high − fy_low\| | \|2*fy_low − fx_high\| | \|2*fy_high − fx_low\| |
| IMD frequency limits (MHz) | 332 | 222 | 2991 | 3136 |
| Two-tone 3rd order IMD products | \|2*fx_low + fy_low\| | \|2*fx_high + fy_high\| | \|2*fy_low + fx_low\| | \|2*fy_high + fx_high\| |
| IMD frequency limits (MHz) | 3568 | 3678 | 4664 | 4809 |
| Two-tone 4th order IMD products | \|3*fx_low − fy_high\| | \|3*fx_high − fy_low\| | \|3*fy_low − fx_high\| | \|3*fy_high − fx_low\| |
| IMD frequency limits (MHz) | 492 | 627 | 4911 | 5116 |
| Two-tone 4th order IMD products | \|3*fx_low + fy_low\| | \|3*fx_high + fy_high\| | \|3*fy_low + fx_low\| | \|3*fy_high + fx_high\| |
| IMD frequency limits (MHz) | 4392 | 4527 | 6584 | 6789 |
| Two-tone 4th order IMD products | \|2*fx_low − 2*fy_high\| | \|2*fx_high − 2*fy_low\| | \|2*fx_low + 2*fy_low\| | \|2*fx_high + 2*fy_high\| |
| IMD frequency limits (MHz) | 2312 | 2142 | 5488 | 5658 |
| Two-tone 5th order IMD products | \|fx_low − 4*fy_high\| | \|fx_high − 4*fy_low\| | \|fy_low − 4*fx_high\| | \|fy_high − 4*fx_low\| |
| IMD frequency limits (MHz) | 7096 | 6831 | 1476 | 1316 |

TABLE 10-continued

| UE UL carriers | fx_low | fx_high | fy_low | fy_high |
|---|---|---|---|---|
| Two-tone 5th order IMD products IMD frequency limits (MHz) | \|fx_low + 4*fy_low\| 8504 | \|fx_high + 4*fy_high\| 8769 | \|fy_low + 4*fx_low\| 5216 | \|fy_high + 4*fx_high\| 5376 |
| Two-tone 5th order IMD products IMD frequency limits (MHz) | \|2*fx_low − 3*fy_high\| 4292 | \|2*fx_high − 3*fy_low\| 4062 | \|2*fy_low − 3*fx_high\| 1293 | \|2*fy_high − 3*fx_low\| 1488 |
| Two-tone 5th order IMD products IMD frequency limits (MHz) | \|2*fx_low + 3*fy_low\| 7408 | \|2*fx_high + 3*fy_high\| 7638 | \|2*fy_low + 3*fx_low\| 6312 | \|2*fy_high + 3*fx_high\| 6507 |

From the harmonics analysis table, the $3^{rd}$ harmonics by Band 1 fall into the Band 46 own RX ranges. And also the 7th harmonics by Band 5 fall into the Band 46 own RX frequency ranges. But the harmonics problems of each interference band has covered in 2DL/1UL CA_1A-46A in rel-13 and 5A-46A in rel-14 with additional guard band to ganruntee 0 dBi MSD.

The $4^{th}$ IMD fall into the own Rx frequency of Band 1. But this impact has covered in 2DL/2UL CA_1A-5A.

The $4^{th}$ & $5^{th}$ IMDs by Band 1 and Band 5 fall into the own Rx frequency of Band 46. It will be analysed to solve the self-interference problem.

I-2-2. MSD

When uplink CA configurations CA_1A-5A is paired with downlink CA configuration CA_1A-5A-46A there is interference components from 2 uplink operation which would interfere the downlink of the Band 46.

I-3. LTE Advanced Carrier Aggregation: Band 1 and Band 7 and Band 46 with 2 ULs

TABLE 11

| E-UTRA CA Configuration | Uplink CA configurations | E-UTRA Bands | 1.4 MHz | 3 MHz | 5 MHz | 10 MHz | 15 MHz | 20 MHz | Maximum aggregated bandwidth [MHz] | Bandwidth combination set |
|---|---|---|---|---|---|---|---|---|---|---|
| CA_1A-7A-46A | CA_1A-7A | 1 |  |  | Yes | Yes | Yes | Yes | 60 | 0 |
|  |  | 7 |  |  |  | Yes | Yes | Yes |  |  |
|  |  | 46 |  |  |  |  |  | Yes |  |  |

I-3-1. Co-Existence Studies for LTE-A UL CA_1A-7A and DL CA_1A-7A-46A

For 2UL/3DL own receiver desensitization study up to $8^{th}$ order harmonics and $2^{nd}$, $3^{rd}$, $4^{th}$ and $5^{th}$ order intermodulation products were calculated and presented in below tables.

Below table shows a harmonic analysis

TABLE 12

| UE UL carriers | fx_low | fx_high | fy_low | fy_high |
|---|---|---|---|---|
| UL frequency (MHz) | 1920 | 1980 | 2500 | 2570 |
| 2nd harmonics frequency limits | 2*fx_low | 2*fx_high | 2* fy_low | 2* fy_high |
| 2nd harmonics frequency limits (MHz) | 3840 | 3960 | 5000 | 5140 |
| 3rd harmonics frequency limits | 3*fx_low | 3*fx_high | 3* fy_low | 3* fy_high |
| 3rd harmonics frequency limits (MHz) | 5760 | 5940 | 7500 | 7710 |
| 4th harmonics frequency limits | 4*fx_low | 4*fx_high | 4* fy_low | 4* fy_high |
| 4th harmonics frequency limits (MHz) | 7680 | 7920 | 10000 | 10280 |
| 5th harmonics frequency limits | 5*fx_low | 5*fx_high | 5* fy_low | 5* fy_high |
| 5th harmonics frequency limits (MHz) | 9600 | 9900 | 12500 | 12850 |
| 6th harmonics frequency limits | 6*fx_low | 6*fx_high | 6* fy_low | 6* fy_high |
| 6th harmonics frequency limits (MHz) | 11520 | 11880 | 15000 | 15420 |
| 7th harmonics frequency limits | 7*fx_low | 7*fx_high | 7* fy_low | 7* fy_high |
| 7th harmonics frequency limits (MHz) | 13440 | 13860 | 17500 | 17990 |
| 8th harmonics frequency limits | 8*fx_low | 8*fx_high | 8* fy_low | 8* fy_high |
| 8th harmonics frequency limits (MHz) | 15360 | 15840 | 20000 | 20560 |

Below table shows an IMD analysis

TABLE 13

| UE UL carriers | fx_low | fx_high | fy_low | fy_high |
|---|---|---|---|---|
| UL frequency (MHz) | 1920 | 1980 | 2500 | 2570 |
| Two tone 2nd order IMD products | \|fy_low − fx_high\| | \|fy_high − fx_low\| | \|fy_low + fx_low\| | \|fy_high + fx_high\| |
| IMD frequency limits (MHz) | 520 | 650 | 4420 | 4550 |
| Two-tone 3rd order IMD products | \|2*fx_low − fy_high\| | \|2*fx_high − fy_low\| | \|2*fy_low − fx_high\| | \|2*fy_high − fx_low\| |
| IMD frequency limits (MHz) | 1270 | 1460 | 3020 | 3220 |
| Two-tone 3rd order IMD products | \|2*fx_low + fy_low\| | \|2*fx_high + fy_high\| | \|2*fy_low + fx_low\| | \|2*fy_high + fx_high\| |
| IMD frequency limits (MHz) | 6340 | 6530 | 6920 | 7120 |
| Two-tone 4th order IMD products | \|3*fx_low − fy_high\| | \|3*fx_high − fy_low\| | \|3*fy_low − fx_high\| | \|3*fy_high − fx_low\| |
| IMD frequency limits (MHz) | 3190 | 3440 | 5520 | 5790 |
| Two-tone 4th order IMD products | \|3*fx_low + fy_low\| | \|3*fx_high + fy_high\| | \|3*fy_low + fx_low\| | \|3*fy_high + fx_high\| |
| IMD frequency limits (MHz) | 8260 | 8510 | 9420 | 9690 |
| Two-tone 4th order IMD products | \|2*fx_low − 2*fy_high\| | \|2*fx_high − 2*fy_low\| | \|2*fx_low + 2*fy_low\| | \|2*fx_high + 2*fy_high\| |
| IMD frequency limits (MHz) | 1300 | 1040 | 8840 | 9100 |
| Two-tone 5th order IMD products | \|fx_low − 4*fy_high\| | \|fx_high − 4*fy_low\| | \|fy_low − 4*fx_high\| | \|fy_high − 4*fx_low\| |
| IMD frequency limits (MHz) | 8360 | 8020 | 5420 | 5110 |
| Two-tone 5th order IMD products | \|fx_low + 4*fy_low\| | \|fx_high + 4*fy_high\| | \|fy_low + 4*fx_low\| | \|fy_high + 4*fx_high\| |
| IMD frequency limits (MHz) | 11920 | 12260 | 10180 | 10490 |
| Two-tone 5th order IMD products | \|2*fx_low − 3*fy_high\| | \|2*fx_high − 3*fy_low\| | \|2*fy_low − 3*fx_high\| | \|2*fy_high − 3*fx_low\| |
| IMD frequency limits (MHz) | 3870 | 3540 | 940 | 620 |
| Two-tone 5th order IMD products | \|2*fx_low + 3*fy_low\| | \|2*fx_high + 3*fy_high\| | \|2*fy_low + 3*fx_low\| | \|2*fy_high + 3*fx_high\| |
| IMD frequency limits (MHz) | 11340 | 11670 | 10760 | 11080 |

From the harmonics analysis table, the $3^{rd}$ harmonics by Band 1 fall into the Band 46 own RX ranges. But the harmonics problem by Band 1 transmission has covered in 2DL/1UL CA_1A-46A in rel-13 with additional guard band to ganruntee 0 dBi MSD.

The $4^{th}$ & $5^{th}$ IMDs by Band 1 and Band 7 fall into the own Rx frequency of Band 46. It will be analysed to solve the self-interference problem.

I-3-2. MSD

When uplink CA configurations CA_1A-7A is paired with downlink CA configuration CA_1A-7A-46A there is interference components from 2 uplink operation which would interfere the downlink of the Band 46.

I-4. LTE Advanced Carrier Aggregation: Band 5 and Band 7 and Band 46 with 2 ULs

TABLE 14

| E-UTRA CA Configuration | Uplink CA configurations | E-UTRA Bands | 1.4 MHz | 3 MHz | 5 MHz | 10 MHz | 15 MHz | 20 MHz | Maximum aggregated bandwidth [MHz] | Bandwidth combination set |
|---|---|---|---|---|---|---|---|---|---|---|
| CA_5A-7A-46A | CA_5A-7A | 5 | | | Yes | Yes | | | 50 | 0 |
| | | 7 | | | | Yes | Yes | Yes | | |
| | | 46 | | | | | | Yes | | |

I-4-1. Co-Existence Studies for LTE-A UL CA_5A-7A and DL CA_5A-7A-46A

For 2UL/3DL own receiver desensitization study up to $8^{th}$ order harmonics and $2^{nd}$, $3^{rd}$, $4^{th}$ and $5^{th}$ order intermodulation products were calculated and presented in below tables.

Below table shows a harmonic analysis.

TABLE 15

| UE UL carriers | fx_low | fx_high | fy_low | fy_high |
|---|---|---|---|---|
| UL frequency (MHz) | 824 | 849 | 2500 | 2570 |
| 2nd harmonics frequency limits | 2*fx_low | 2*fx_high | 2* fy_low | 2* fy_high |
| 2nd harmonics frequency limits (MHz) | 1648 | 1698 | 5000 | 5140 |
| 3rd harmonics frequency limits | 3*fx_low | 3*fx_high | 3* fy_low | 3* fy_high |
| 3rd harmonics frequency limits (MHz) | 2472 | 2547 | 7500 | 7710 |
| 4th harmonics frequency limits | 4*fx_low | 4*fx_high | 4* fy_low | 4* fy_high |
| 4th harmonics frequency limits (MHz) | 3296 | 3396 | 10000 | 10280 |
| 5th harmonics frequency limits | 5*fx_low | 5*fx_high | 5* fy_low | 5* fy_high |
| 5th harmonics frequency limits (MHz) | 4120 | 4245 | 12500 | 12850 |
| 6th harmonics frequency limits | 6*fx_low | 6*fx_high | 6* fy_low | 6* fy_high |
| 6th harmonics frequency limits (MHz) | 4944 | 5094 | 15000 | 15420 |
| 7th harmonics frequency limits | 7*fx_low | 7*fx_high | 7* fy_low | 7* fy_high |
| 7th harmonics frequency limits (MHz) | 5768 | 5943 | 17500 | 17990 |
| 8th harmonics frequency limits | 8*fx_low | 8*fx_high | 8* fy_low | 8* fy_high |
| 8th harmonics frequency limits (MHz) | 6592 | 6792 | 20000 | 20560 |

Below table shows an IMD analysis.

TABLE 16

| UE UL carriers | fx_low | fx_high | fy_low | fy_high |
|---|---|---|---|---|
| UL frequency (MHz) | 824 | 849 | 2500 | 2570 |
| 2nd harmonics frequency limits | 2*fx_low | 2*fx_high | 2* fy_low | 2* fy_high |
| 2nd harmonics frequency limits (MHz) | 1648 | 1698 | 5000 | 5140 |
| 3rd harmonics frequency limits | 3*fx_low | 3*fx_high | 3* fy_low | 3* fy_high |
| 3rd harmonics frequency limits (MHz) | 2472 | 2547 | 7500 | 7710 |
| Two tone 2nd order IMD products IMD frequency limits (MHz) | \|fy_low − fx_high\| 1651 | \|fy_high − fx_low\| 1746 | \|fy_low + fx_low\| 3324 | \|fy_high + fx_high\| 3419 |
| Two-tone 3rd order IMD products IMD frequency limits (MHz) | \|2*fx_low − fy_high\| 922 | \|2*fx_high − fy_low\| 802 | \|2*fy_low − fx_high\| 4151 | \|2*fy_high − fx_low\| 4316 |
| Two-tone 3rd order IMD products IMD frequency limits (MHz) | \|2*fx_low + fy_low\| 4148 | \|2*fx_high + fy_high\| 4268 | \|2*fy_low + fx_low\| 5824 | \|2*fy_high + fx_high\| 5989 |
| Two-tone 4th order IMD products IMD frequency limits (MHz) | \|3*fx_low − fy_high\| 98 | \|3*fx_high − fy_low\| 47 | \|3*fy_low − fx_high\| 6651 | \|3*fy_high − fx_low\| 6886 |
| Two-tone 4th order IMD products IMD frequency limits (MHz) | \|3*fx_low + fy_low\| 4972 | \|3*fx_high + fy_high\| 5117 | \|3*fy_low + fx_low\| 8324 | \|3*fy_high + fx_high\| 8559 |
| Two-tone 4th order IMD products IMD frequency limits (MHz) | \|2*fx_low − 2*fy_high\| 3492 | \|2*fx_high − 2*fy_low\| 3302 | \|2*fx_low + 2*fy_low\| 6648 | \|2*fx_high + 2*fy_high\| 6838 |
| Two-tone 5th order IMD products IMD frequency limits (MHz) | \|fx_low − 4*fy_high\| 9456 | \|fx_high − 4*fy_low\| 9151 | \|fy_low − 4*fx_high\| 896 | \|fy_high − 4*fx_low\| 726 |
| Two-tone 5th order IMD products IMD frequency limits (MHz) | \|fx_low + 4*fy_low\| 10824 | \|fx_high + 4*fy_high\| 11129 | \|fy_low + 4*fx_low\| 5796 | \|fy_high + 4*fx_high\| 5966 |

TABLE 16-continued

| UE UL carriers | fx_low | fx_high | fy_low | fy_high |
|---|---|---|---|---|
| Two-tone 5th order IMD products IMD frequency limits (MHz) | \|2*fx_low − 3*fy_high\| 6062 | \|2*fx_high − 3*fy_low\| 5802 | \|2*fy_low − 3*fx_high\| 2453 | \|2*fy_high − 3*fx_low\| 2668 |
| Two-tone 5th order IMD products IMD frequency limits (MHz) | \|2*fx_low + 3*fy_low\| 9148 | \|2*fx_high + 3*fy_high\| 9408 | \|2*fy_low + 3*fx_low\| 7472 | \|2*fy_high + 3*fx_high\| 7687 |

From the harmonics analysis table, the $7^{th}$ harmonics by Band 5 fall into the Band 46 own RX ranges. But the harmonics problem by Band 5 transmission has covered in 2DL/1UL CA_5A-46A in rel-14 with additional guard band to ganruntee 0 dBi MSD.

The $3^{rd}$ & $5^{th}$ IMDs fall into the own own Rx frequency of Band 5. Also the $5^{th}$ IMD fall into the own Rx frequency of Band 7. But these impacts were already covered in 2DL/2UL CA_5A-7A.

The $3^{rd}$ & $5^{th}$ IMDs by Band 5 and Band 7 fall into the own Rx frequency of Band 46. It will be analysed to solve the self-interference problem.

I-4-2. MSD

When uplink CA configurations CA_5A-7A is paired with downlink CA configuration CA_5A-7A-46A there is interference components from 2 uplink operation which would interfere the downlink of the Band 46.

I-5. LTE Advanced Carrier Aggregation: Band 3 and Band 5 and Band 7 with 2 ULs

TABLE 17

| E-UTRA CA Configuration | Uplink CA configurations | E-UTRA Bands | 1.4 MHz | 3 MHz | 5 MHz | 10 MHz | 15 MHz | 20 MHz | Maximum aggregated bandwidth [MHz] | Bandwidth combination set |
|---|---|---|---|---|---|---|---|---|---|---|
| CA_3A-5A-7A | CA_3A-5A or CA_3A-7A or CA_5A-7A | 3 5 7 | | | Yes | Yes Yes Yes | Yes Yes Yes | Yes Yes Yes | 50 | 0 |

I-5-1. Co-Existence Studies for LTE-A UL CA_3A-5A and DL CA_3A-5A-7A

For 2UL/3DL own receiver desensitization study $2^{nd}$ and $3^{rd}$ order harmonics and $2^{nd}$, $3^{rd}$, $4^{th}$ and $5^{th}$ order intermodulation products were calculated and presented in below table.

Below table shows harmonic and IMD analysis.

TABLE 18

| UE UL carriers | fx_low | fx_high | fy_low | fy_high |
|---|---|---|---|---|
| UL frequency (MHz) | 824 | 849 | 1710 | 1785 |
| $2^{nd}$ harmonics frequency limits | 2*fx_low | 2*fx_high | 2* fy_low | 2* fy_high |
| $2^{nd}$ harmonics frequency limits (MHz) | 1648 | 1698 | 3420 | 3570 |
| $3^{rd}$ harmonics frequency limits | 3*fx_low | 3*fx_high | 3* fy_low | 3* fy_high |
| $3^{rd}$ harmonics frequency limits (MHz) | 2472 | 2547 | 5130 | 5355 |
| Two tone $2^{nd}$ order IMD products IMD frequency limits (MHz) | \|fy_low − fx_high\| 861 | \|fy_high − fx_low\| 961 | \|fy_low + fx_low\| 2534 | \|fy_high + fx_high\| 2634 |
| Two-tone $3^{rd}$ order IMD products IMD frequency limits (MHz) | \|2*fx_low − fy_high\| 137 | \|2*fx_high − fy_low\| 12 | \|2*fy_low − fx_high\| 2571 | \|2*fy_high − fx_low\| 2746 |
| Two-tone $3^{rd}$ order IMD products IMD frequency limits (MHz) | \|2*fx_low + fy_low\| 3358 | \|2*fx_high + fy_high\| 3483 | \|2*fy_low + fx_low\| 4244 | \|2*fy_high + fx_high\| 4419 |

TABLE 18-continued

| UE UL carriers | fx_low | fx_high | fy_low | fy_high |
|---|---|---|---|---|
| Two-tone 4$^{th}$ order IMD products IMD frequency limits (MHz) | \|3*fx_low − fy_high\| 687 | \|3*fx_high − fy_low\| 837 | \|3*fy_low − fx_high\| 4281 | \|3*fy_high − fx_low\| 4531 |
| Two-tone 4$^{th}$ order IMD products IMD frequency limits (MHz) | \|3*fx_low + fy_low\| 4182 | \|3*fx_high + fy_high\| 4332 | \|3*fy_low + fx_low\| 5954 | \|3*fy_high + fx_high\| 6204 |
| Two-tone 4$^{th}$ order IMD products IMD frequency limits (MHz) | \|2*fx_low − 2*fy_high\| 1922 | \|2*fx_high − 2*fy_low\| 1722 | \|2*fx_low + 2*fy_low\| 5068 | \|2*fx_high + 2*fy_high\| 5268 |
| Two-tone 5$^{th}$ order IMD products IMD frequency limits (MHz) | \|fx_low − 4*fy_high\| 6316 | \|fx_high − 4*fy_low\| 5991 | \|fy_low − 4*fx_high\| 1686 | \|fy_high − 4*fx_low\| 1511 |
| Two-tone 5$^{th}$ order IMD products IMD frequency limits (MHz) | \|fx_low + 4*fy_low\| 7664 | \|fx_high + 4*fy_high\| 7989 | \|fy_low + 4*fx_low\| 5006 | \|fy_high + 4*fx_high\| 5181 |
| Two-tone 5$^{th}$ order IMD products IMD frequency limits (MHz) | \|2*fx_low − 3*fy_high\| 3707 | \|2*fx_high − 3*fy_low\| 3432 | \|2*fy_low − 3*fx_high\| 873 | \|2*fy_high − 3*fx_low\| 1098 |
| Two-tone 5$^{th}$ order IMD products IMD frequency limits (MHz) | \|2*fx_low + 3*fy_low\| 6778 | \|2*fx_high + 3*fy_high\| 7053 | \|2*fy_low + 3*fx_low\| 5892 | \|2*fy_high + 3*fx_high\| 6117 |

The 2$^{nd}$ & 5$^{th}$ IMDs fall into the own Rx Band 5. Also the 4$^{th}$ IMD fill into the own Rx Band 3. But these impacts already has covered in 2DL/2UL CA_3A-5A.

The 2$^{nd}$ & 3$^{rd}$ IMDs fall into the own Rx frequency of Band 7. It will be analysed to solve the self-interference problem.

I-5-2. Co-Existence Studies for LTE-A UL CA_3A-7A and DL CA_3A-5A-7A

For 2UL/3DL own receiver desensitization study 2$^{nd}$ and 3$^{rd}$ order harmonics and 2$^{nd}$, 3$^{rd}$, 4$^{th}$ and 5$^{th}$ order intermodulation products were calculated and presented in below table.

Below table shows harmonic and IMD analysis

TABLE 19

| UE UL carriers | fx_low | fx_high | fy_low | fy_high |
|---|---|---|---|---|
| UL frequency (MHz) | 1710 | 1785 | 2500 | 2570 |
| 2nd harmonics frequency limits | 2*fx_low | 2*fx_high | 2* fy_low | 2* fy_high |
| 2nd harmonics frequency limits (MHz) | 3420 | 3570 | 5000 | 5140 |
| 3rd harmonics frequency limits | 3*fx_low | 3*fx_high | 3* fy_low | 3* fy_high |
| 3rd harmonics frequency limits (MHz) | 5130 | 5355 | 7500 | 7710 |
| Two tone 2nd order IMD products | \|fy_low − fx_high\| | \|fy_high − fx_low\| | \|fy_low + fx_low\| | \|fy_high + fx_high\| |
| IMD frequency limits (MHz) | 715 | 860 | 4210 | 4355 |
| Two-tone 3rd order IMD products | \|2*fx_low − fy_high\| | \|2*fx_high − fy_low\| | \|2*fy_low − fx_high\| | \|2*fy_high − fx_low\| |
| IMD frequency limits (MHz) | 850 | 1070 | 3215 | 3430 |
| Two-tone 3rd order IMD products | \|2*fx_low + fy_low\| | \|2*fx_high + fy_high\| | \|2*fy_low + fx_low\| | \|2*fy_high + fx_high\| |
| IMD frequency limits (MHz) | 5920 | 6140 | 6710 | 6925 |
| Two-tone 4th order IMD products | \|3*fx_low − fy_high\| | \|3*fx_high − fy_low\| | \|3*fy_low − fx_high\| | \|3*fy_high − fx_low\| |
| IMD frequency limits (MHz) | 2560 | 2855 | 5715 | 6000 |

TABLE 19-continued

| UE UL carriers | fx_low | fx_high | fy_low | fy_high |
|---|---|---|---|---|
| Two-tone 4th order IMD products | \|3*fx_low + fy_low\| | \|3*fx_high + fy_high\| | \|3*fy_low + fx_low\| | \|3*fy_high + fx_high\| |
| IMD frequency limits (MHz) | 7630 | 7925 | 9210 | 9495 |
| Two-tone 4th order IMD products | \|2*fx_low − 2*fy_high\| | \|2*fx_high − 2*fy_low\| | \|2*fx_low + 2*fy_low\| | \|2*fx_high + 2*fy_high\| |
| IMD frequency limits (MHz) | 1720 | 1430 | 8420 | 8710 |
| Two-tone 5th order IMD products | \|fx_low − 4*fy_high\| | \|fx_high − 4*fy_low\| | \|fy_low − 4*fx_high\| | \|fy_high − 4*fx_low\| |
| IMD frequency limits (MHz) | 8570 | 8215 | 4640 | 4270 |
| Two-tone 5th order IMD products | \|fx_low + 4*fy_low\| | \|fx_high + 4*fy_high\| | \|fy_low + 4*fx_low\| | \|fy_high + 4*fx_high\| |
| IMD frequency limits (MHz) | 11710 | 12065 | 9340 | 9710 |
| Two-tone 5th order IMD products | \|2*fx_low − 3*fy_high\| | \|2*fx_high − 3*fy_low\| | \|2*fy_low − 3*fx_high\| | \|2*fy_high − 3*fx_low\| |
| IMD frequency limits (MHz) | 4290 | 3930 | 355 | 10 |
| Two-tone 5th order IMD products | \|2*fx_low + 3*fy_low\| | \|2*fx_high + 3*fy_high\| | \|2*fy_low + 3*fx_low\| | \|2*fy_high + 3*fx_high\| |
| IMD frequency limits (MHz) | 10920 | 11280 | 10130 | 10495 |

The $4^{th}$ IMD fall into the own Rx Band 7. But this impact already has covered in 2DL/2UL CA_3A-7A.

The $3^{rd}$ IMD fall into the own Rx frequency of Band 5. It will be analysed to solve the self-interference problem.

I-5-3. Co-Existence Studies for LTE-A UL CA_5A-7A and DL CA_3A-5A-7A

For 2UL/3DL own receiver desensitization study $2^{nd}$ and $3^{rd}$ order harmonics and $2^{nd}$, $3^{rd}$, $4^{th}$ and $5^{th}$ order inter-modulation products were calculated and presented in below table.

Below table shows harmonic and IMD analysis

TABLE 20

| UE UL carriers | fx_low | fx_high | fy_low | fy_high |
|---|---|---|---|---|
| UL frequency (MHz) | 824 | 849 | 2500 | 2570 |
| 2nd harmonics frequency limits | 2*fx_low | 2*fx_high | 2* fy_low | 2* fy_high |
| 2nd harmonics frequency limits (MHz) | 1648 | 1698 | 5000 | 5140 |
| 3rd harmonics frequency limits | 3*fx_low | 3*fx_high | 3* fy_low | 3* fy_high |
| 3rd harmonics frequency limits (MHz) | 2472 | 2547 | 7500 | 7710 |
| Two tone 2nd order IMD products | \|fy_low − fx_high\| | \|fy_high − fx_low\| | \|fy_low + fx_low\| | \|fy_high + fx_high\| |
| IMD frequency limits (MHz) | 1651 | 1746 | 3324 | 3419 |
| Two-tone 3rd order IMD products | \|2*fx_low − fy_high\| | \|2*fx_high − fy_low\| | \|2*fy_low − fx_high\| | \|2*fy_high − fx_low\| |
| IMD frequency limits (MHz) | 922 | 802 | 4151 | 4316 |

TABLE 20-continued

| UE UL carriers | fx_low | fx_high | fy_low | fy_high |
|---|---|---|---|---|
| Two-tone 3rd order IMD products | \|2*fx_low + fy_low\| | \|2*fx_high + fy_high\| | \|2*fy_low + fx_low\| | \|2*fy_high + fx_high\| |
| IMD frequency limits (MHz) | 4148 | 4268 | 5824 | 5989 |
| Two-tone 4th order IMD products | \|3*fx_low − fy_high\| | \|3*fx_high − fy_low\| | \|3*fy_low − fx_high\| | \|3*fy_high − fx_low\| |
| IMD frequency limits (MHz) | 98 | 47 | 6651 | 6886 |
| Two-tone 4th order IMD products | \|3*fx_low + fy_low\| | \|3*fx_high + fy_high\| | \|3*fy_low + fx_low\| | \|3*fy_high + fx_high\| |
| IMD frequency limits (MHz) | 4972 | 5117 | 8324 | 8559 |
| Two-tone 4th order IMD products | \|2*fx_low − 2*fy_high\| | \|2*fx_high − 2*fy_low\| | \|2*fx_low − 2*fy_low\| | \|2*fx_high + 2*fy_high\| |
| IMD frequency limits (MHz) | 3492 | 3302 | 6648 | 6838 |
| Two-tone 5th order IMD products | \|fx_low − 4*fy_high\| | \|fx_high − 4*fy_low\| | \|fy_low − 4*fx_high\| | \|fy_high − 4*fx_low\| |
| IMD frequency limits (MHz) | 9456 | 9151 | 896 | 726 |
| Two-tone 5th order IMD products | \|fx_low + 4*fy_low\| | \|fx_high + 4*fy_high\| | \|fy_low + 4*fx_low\| | \|fy_high + 4*fx_high\| |
| IMD frequency limits (MHz) | 10824 | 11129 | 5796 | 5966 |
| Two-tone 5th order IMD products | \|2*fx_low − 3*fy_high\| | \|2*fx_high − 3*fy_low\| | \|2*fy_low − 3*fx_high\| | \|2*fy_high − 3*fx_low\| |
| IMD frequency limits (MHz) | 6062 | 5802 | 2453 | 2668 |
| Two-tone 5th order IMD products | \|2*fx_low + 3*fy_low\| | \|2*fx_high + 3*fy_high\| | \|2*fy_low + 3*fx_low\| | \|2*fy_high + 3*fx_high\| |
| IMD frequency limits (MHz) | 9148 | 9408 | 7472 | 7687 |

The 3rd & 5th IMDs fall into own Rx frequency of Band 5. Also the 5th IMD fall into the own Rx frequency of Band 7. But these impacts already has covered in 2DL/2UL CA 5A-7A.

The harmonics/IMD do not impact to the 3rd own Rx frequency of Band 3.

I-5-4. MSD

When uplink CA configurations CA_3A-5A is paired with downlink CA configuration CA_3A-5A-7A there is interference components from 2 uplink operation which would interfere the downlink of the Band 7.

When uplink CA configurations CA_3A-7A is paired with downlink CA configuration CA_3A-5A-7A there is interference components from 2 uplink operation which would interfere the downlink of the Band 5.

When uplink CA configurations CA_5A-7A is paired with downlink CA configuration CA_3A-5A-7A there is no interference components from 2 uplink operation which would interfere the downlink of the Band 3.

I-6. LTE Advanced Carrier Aggregation: Band 1 and Band 3 and Band 21 with 2 ULs

TABLE 21

| E-UTRA CA Configuration | Uplink CA configurations | E-UTRA Bands | 1.4 MHz | 3 MHz | 5 MHz | 10 MHz | 15 MHz | 20 MHz | Maximum aggregated bandwidth [MHz] | Bandwidth combination set |
|---|---|---|---|---|---|---|---|---|---|---|
| CA_1A-3A-21A | CA_1A-3A or CA_1A-21A or CA_3A-21A | 1 | | | Yes | Yes | Yes | Yes | 55 | 0 |
| | | 3 | | | Yes | Yes | Yes | Yes | | |
| | | 21 | | | Yes | Yes | Yes | | | |

I-6-1. Co-Existence Studies for LTE-A UL CA_1A-3A and DL CA_1A-3A-21A

For 2UL/3DL own receiver desensitization study $2^{nd}$ and $3^{rd}$ order harmonics and $2^{nd}$, $3^{rd}$, $4^{th}$ and $5^{th}$ order intermodulation products were calculated and presented in below Table.

Below table shows harmonic and IMD analysis.

TABLE 22

| UE UL carriers | fx_low | fx_high | fy_low | fy_high |
|---|---|---|---|---|
| UL frequency (MHz) | 1764.9 | 1784.9 | 1940 | 1960 |
| 2nd harmonics frequency limits | 2*fx_low | 2*fx_high | 2*fy_low | 2*fy_high |
| 2nd harmonics frequency limits (MHz) | 3529.8 | 3569.8 | 3880 | 3920 |
| 3rd harmonics frequency limits | 3*fx_low | 3*fx_high | 3*fy_low | 3*fy_high |
| 3rd harmonics frequency limits (MHz) | 5294.7 | 5354.7 | 5820 | 5880 |
| Two tone 2nd order IMD products | \|fy_low − fx_high\| | \|fy_high − fx_low\| | \|fy_low + fx_low\| | \|fy_high + fx_high\| |
| IMD frequency limits (MHz) | 155.1 | 195.1 | 3704.9 | 3744.9 |
| Two-tone 3rd order IMD products | \|2*fx_low − fy_high\| | \|2*fx_high − fy_low\| | \|2*fy_low − fx_high\| | \|2*fy_high − fx_low\| |
| IMD frequency limits (MHz) | 1569.8 | 1629.8 | 2095.1 | 2155.1 |
| Two-tone 3rd order IMD products | \|2*fx_low + fy_low\| | \|2*fx_high + fy_high\| | \|2*fy_low + fx_low\| | \|2*fy_high + fx_high\| |
| IMD frequency limits (MHz) | 5469.8 | 5529.8 | 5644.9 | 5704.9 |
| Two-tone 4th order IMD products | \|3*fx_low − fy_high\| | \|3*fx_high − fy_low\| | \|3*fy_low − fx_high\| | \|3*fy_high − fx_low\| |
| IMD frequency limits (MHz) | 3334.7 | 3414.7 | 4035.1 | 4115.1 |
| Two-tone 4th order IMD products | \|3*fx_low + fy_low\| | \|3*fx_high + fy_high\| | \|3*fy_low + fx_low\| | \|3*fy_high + fx_high\| |
| IMD frequency limits (MHz) | 7234.7 | 7314.7 | 7584.9 | 7664.9 |
| Two-tone 4th order IMD products | \|2*fx_low − 2*fy_high\| | \|2*fx_high − 2*fy_low\| | \|2*fx_low + 2*fy_low\| | \|2*fx_high + 2*fy_high\| |
| IMD frequency limits (MHz) | 390.2 | 310.2 | 7409.8 | 7489.8 |
| Two-tone 5th order IMD products | \|fx_low − 4*fy_high\| | \|fx_high − 4*fy_low\| | \|fy_low − 4*fx_high\| | \|fy_high − 4*fx_low\| |
| IMD frequency limits (MHz) | 6075.1 | 5975.1 | 5199.6 | 5099.6 |
| Two-tone 5th order IMD products | \|fx_low + 4*fy_low\| | \|fx_high + 4*fy_high\| | \|fy_low + 4*fx_low\| | \|fy_high + 4*fx_high\| |
| IMD frequency limits (MHz) | 9524.9 | 9624.9 | 8999.6 | 9099.6 |
| Two-tone 5th order IMD products | \|2*fx_low − 3*fy_high\| | \|2*fx_high − 3*fy_low\| | \|2*fy_low − 3*fx_high\| | \|2*fy_high − 3*fx_low\| |
| IMD frequency limits (MHz) | 2350.2 | 2250.2 | 1474.7 | 1374.7 |
| Two-tone 5th order IMD products | \|2*fx_low + 3*fy_low\| | \|2*fx_high + 3*fy_high\| | \|2*fy_low + 3*fx_low\| | \|2*fy_high + 3*fx_high\| |
| IMD frequency limits (MHz) | 9349.8 | 9449.8 | 9174.7 | 9274.7 |

The $3^{rd}$ IMD fall into the own Rx Band 1. But this impact already has covered in 2DL/2UL CA_1A-3A.

The $3^{rd}$ & $5^{th}$ IMDs fall into the own Rx frequency of Band 21. However, RAN4 can consider specific holding frequency bands when study the IMD analysis for the related CA band combinations including Band 21. Then, there is no IMD problems to the $3^{rd}$ own Rx frequency of Band 21.

I-6-2. Co-Existence Studies for LTE-A UL CA_1A-21A and DL CA_1A-3A-21A

For 2UL/3DL own receiver desensitization study $2^{nd}$ and $3^{rd}$ order harmonics and $2^{nd}$, $3^{rd}$, $4^{th}$ and $5^{th}$ order intermodulation products were calculated and presented in below table.

Below table shows harmonic and IMD analysis.

TABLE 23

| UE UL carriers | fx_low | fx_high | fy_low | fy_high |
|---|---|---|---|---|
| UL frequency (MHz) | 1447.9 | 1462.9 | 1940 | 1960 |
| 2nd harmonics frequency limits | 2*fx_low | 2*fx_high | 2* fy_low | 2* fy_high |
| 2nd harmonics frequency limits (MHz) | 2895.8 | 2925.8 | 3880 | 3920 |
| 3rd harmonics frequency limits | 3*fx_low | 3*fx_high | 3* fy_low | 3* fy_high |
| 3rd harmonics frequency limits (MHz) | 4343.7 | 4388.7 | 5820 | 5880 |
| Two tone 2nd order IMD products | \|fy_low − fx_high\| | \|fy_high − fx_low\| | \|fy_low + fx_low\| | \|fy_high + fx_high\| |
| IMD frequency limits (MHz) | 477.1 | 512.1 | 3387.9 | 3422.9 |
| Two-tone 3rd order IMD products | \|2*fx_low − fy_high\| | \|2*fx_high − fy_low\| | \|2*fy_low − fx_high\| | \|2*fy_high − fx_low\| |
| IMD frequency limits (MHz) | 935.8 | 985.8 | 2417.1 | 2472.1 |
| Two-tone 3rd order IMD products | \|2*fx_low + fy_low\| | \|2*fx_high + fy_high\| | \|2*fy_low + fx_low\| | \|2*fy_high + fx_high\| |
| IMD frequency limits (MHz) | 4835.8 | 4885.8 | 5327.9 | 5382.9 |
| Two-tone 4th order IMD products | \|3*fx_low − fy_high\| | \|3*fx_high − fy_low\| | \|3*fy_low − fx_high\| | \|3*fy_high − fx_low\| |
| IMD frequency limits (MHz) | 2383.7 | 2448.7 | 4357.1 | 4432.1 |
| Two-tone 4th order IMD products | \|3*fx_low + fy_low\| | \|3*fx_high + fy_high\| | \|3*fy_low + fx_low\| | \|3*fy_high + fx_high\| |
| IMD frequency limits (MHz) | 6283.7 | 6348.7 | 7267.9 | 7342.9 |
| Two-tone 4th order IMD products | \|2*fx_low − 2*fy_high\| | \|2*fx_high − 2*fy_low\| | \|2*fx_low + 2*fy_low\| | \|2*fx_high + 2*fy_high\| |
| IMD frequency limits (MHz) | 1024.2 | 954.2 | 6775.8 | 6845.8 |
| Two-tone 5th order IMD products | \|fx_low − 4*fy_high\| | \|fx_high − 4*fy_low\| | \|fy_low − 4*fx_high\| | \|fy_high − 4*fx_low\| |
| IMD frequency limits (MHz) | 6392.1 | 6297.1 | 3911.6 | 3831.6 |
| Two-tone 5th order IMD products | \|fx_low + 4*fy_low\| | \|fx_high + 4*fy_high\| | \|fy_low + 4*fx_low\| | \|fy_high + 4*fx_high\| |
| IMD frequency limits (MHz) | 9207.9 | 9302.9 | 7731.6 | 7811.6 |
| Two-tone 5th order IMD products | \|2*fx_low − 3*fy_high\| | \|2*fx_high − 3*fy_low\| | \|2*fy_low − 3*fx_high\| | \|2*fy_high − 3*fx_low\| |
| IMD frequency limits (MHz) | 2984.2 | 2894.2 | 508.7 | 423.7 |
| Two-tone 5th order IMD products | \|2*fx_low + 3*fy_low\| | \|2*fx_high + 3*fy_high\| | \|2*fy_low + 3*fx_low\| | \|2*fy_high + 3*fx_high\| |
| IMD frequency limits (MHz) | 8715.8 | 8805.8 | 8223.7 | 8308.7 |

There was no harmonics/IMDs impact to the 3rd own Rx frequency Band 3.

I-6-3. Co-Existence Studies for LTE-A UL CA_3A-21A and DL CA_1A-3A-21A

For 2UL/3DL own receiver desensitization study $2^{nd}$ and $3^{rd}$ order harmonics and $2^{nd}$, $3^{rd}$, $4^{th}$ and $5^{th}$ order intermodulation products were calculated and presented in below table.

Below table shows harmonic and IMD analysis.

TABLE 24

| UE UL carriers | fx_low | fx_high | fy_low | fy_high |
|---|---|---|---|---|
| UL frequency (MHz) | 1447.9 | 1462.9 | 1764.9 | 1784.9 |
| 2nd harmonics frequency limits | 2*fx_low | 2*fx_high | 2* fy_low | 2* fy_high |
| 2nd harmonics frequency limits (MHz) | 2895.8 | 2925.8 | 3529.8 | 3569.8 |
| 3rd harmonics frequency limits | 3*fx_low | 3*fx_high | 3* fy_low | 3* fy_high |
| 3rd harmonics frequency limits (MHz) | 4343.7 | 4388.7 | 5294.7 | 5354.7 |
| Two tone 2nd order IMD products IMD frequency limits (MHz) | \|fy_low − fx_high\|<br>302 | \|fy_high − fx_low\|<br>337 | \|fy_low + fx_low\|<br>3212.8 | \|fy_high + fx_high\|<br>3247.8 |
| Two-tone 3rd order IMD products IMD frequency limits (MHz) | \|2*fx_low − fy_high\|<br>1110.9 | \|2*fx_high − fy_low\|<br>1160.9 | \|2*fy_low − fx_high\|<br>2066.9 | \|2*fy_high − fx_low\|<br>2121.9 |
| Two-tone 3rd order IMD products IMD frequency limits (MHz) | \|2*fx_low + fy_low\|<br>4660.7 | \|2*fx_high + fy_high\|<br>4710.7 | \|2*fy_low + fx_low\|<br>4977.7 | \|2*fy_high + fx_high\|<br>5032.7 |
| Two-tone 4th order IMD products IMD frequency limits (MHz) | \|3*fx_low − fy_high\|<br>2558.8 | \|3*fx_high − fy_low\|<br>2623.8 | \|3*fy_low − fx_high\|<br>3831.8 | \|3*fy_high − fx_low\|<br>3906.8 |
| Two-tone 4th order IMD products IMD frequency limits (MHz) | \|3*fx_low + fy_low\|<br>6108.6 | \|3*fx_high + fy_high\|<br>6173.6 | \|3*fy_low + fx_low\|<br>6742.6 | \|3*fy_high + fx_high\|<br>6817.6 |
| Two-tone 4th order IMD products IMD frequency limits (MHz) | \|2*fx_low − 2*fy_high\|<br>674 | \|2*fx_high − 2*fy_low\|<br>604 | \|2*fx_low + 2*fy_low\|<br>6425.6 | \|2*fx_high + 2*fy_high\|<br>6495.6 |
| Two-tone 5th order IMD products IMD frequency limits (MHz) | \|fx_low − 4*fy_high\|<br>5691.7 | \|fx_high − 4*fy_low\|<br>5596.7 | \|fy_low − 4*fx_high\|<br>4086.7 | \|fy_high − 4*fx_low\|<br>4006.7 |
| Two-tone 5th order IMD products IMD frequency limits (MHz) | \|fx_low + 4*fy_low\|<br>8507.5 | \|fx_high + 4*fy_high\|<br>8602.5 | \|fy_low + 4*fx_low\|<br>7556.5 | \|fy_high + 4*fx_high\|<br>7636.5 |
| Two-tone 5th order IMD products IMD frequency limits (MHz) | \|2*fx_low − 3*fy_high\|<br>2458.9 | \|2*fx_high − 3*fy_low\|<br>2368.9 | \|2*fy_low − 3*fx_high\|<br>858.9 | \|2*fy_high − 3*fx_low\|<br>773.9 |
| Two-tone 5th order IMD products IMD frequency limits (MHz) | \|2*fx_low + 3*fy_low\|<br>8190.5 | \|2*fx_high + 3*fy_high\|<br>8280.5 | \|2*fy_low + 3*fx_low\|<br>7873.5 | \|2*fy_high + 3*fx_high\|<br>7958.5 |

The $3^{rd}$ IMD fall into the $3^{rd}$ own Rx frequency of Band 1. However, RAN4 can consider specific holding frequency bands when study the IMD analysis for the related CA band combinations including Band 21. Also RAN4 can consider fixed Tx-Rx separation in the operator specific frequency in Band 1. Then, there was no harmonics/IMDs impact to the $3^{rd}$ own Rx frequency of Band 1.

I-6-4. MSD

When uplink CA configurations CA_1A-3A is paired with downlink CA configuration CA_1A-3A-21A there is no interference components from 2 uplink operation which would interfere the downlink of the Band 21.

When uplink CA configurations CA_1A-21A is paired with downlink CA configuration CA_1A-3A-21A there is no interference components from 2 uplink operation which would interfere the downlink of the Band 3.

When uplink CA configurations CA_3A-21A is paired with downlink CA configuration CA_1A-3A-21A there is no interference components from 2 uplink operation which would interfere the downlink of the Band 1.

I-7. LTE Advanced Carrier Aggregation: Band 1 and Band 3 and Band 42 with 2 ULs

TABLE 25

| E-UTRA CA Configuration | Uplink CA configurations | E-UTRA Bands | 1.4 MHz | 3 MHz | 5 MHz | 10 MHz | 15 MHz | 20 MHz | Maximum aggregated bandwidth [MHz] | Bandwidth combination set |
|---|---|---|---|---|---|---|---|---|---|---|
| CA_1A-3A-42A | CA_1A-3A or CA_1A-42A or CA_3A-42A | 1<br>3<br>42 | | | Yes<br>Yes<br>Yes | Yes<br>Yes<br>Yes | Yes<br>Yes<br>Yes | Yes<br>Yes<br>Yes | 60 | 0 |

I-7-1 Co-Existence Studies for LTE-A UL CA_1A-3A and DL CA_1A-3A-42A

For 2UL/3DL own receiver desensitization study $2^{nd}$ and $3^{rd}$ order harmonics and $2^{nd}$, $3^{rd}$, $4^{th}$ and $5^{th}$ order intermodulation products were calculated and presented in below table.

Below table shows harmonic and IMD analysis.

TABLE 26

| UE UL carriers | fx_low | fx_high | fy_low | fy_high |
|---|---|---|---|---|
| UL frequency (MHz) | 1710 | 1785 | 1920 | 1980 |
| 2nd harmonics frequency limits | 2*fx_low | 2*fx_high | 2* fy_low | 2* fy_high |
| 2nd harmonics frequency limits (MHz) | 3420 | 3570 | 3840 | 3960 |
| 3rd harmonics frequency limits | 3*fx_low | 3*fx_high | 3* fy_low | 3* fy_high |
| 3rd harmonics frequency limits (MHz) | 5130 | 5355 | 5760 | 5940 |
| Two tone 2nd order IMD products | \|fy_low − fx_high\| | \|fy_high − fx_low\| | \|fy_low + fx_low\| | \|fy_high + fx_high\| |
| IMD frequency limits (MHz) | 135 | 270 | 3630 | 3765 |
| Two-tone 3rd order IMD products | \|2*fx_low − fy_high\| | \|2*fx_high − fy_low\| | \|2*fy_low − fx_high\| | \|2*fy_high − fx_low\| |
| IMD frequency limits (MHz) | 1440 | 1650 | 2055 | 2250 |
| Two-tone 3rd order IMD products | \|2*fx_low + fy_low\| | \|2*fx_high + fy_high\| | \|2*fy_low + fx_low\| | \|2*fy_high + fx_high\| |
| IMD frequency limits (MHz) | 5340 | 5550 | 5550 | 5745 |
| Two-tone 4th order IMD products | \|3*fx_low − fy_high\| | \|3*fx_high − fy_low\| | \|3*fy_low − fx_high\| | \|3*fy_high − fx_low\| |
| IMD frequency limits (MHz) | 3150 | 3435 | 3975 | 4230 |
| Two-tone 4th order IMD products | \|3*fx_low + fy_low\| | \|3*fx_high + fy_high\| | \|3*fy_low + fx_low\| | \|3*fy_high + fx_high\| |
| IMD frequency limits (MHz) | 7050 | 7335 | 7470 | 7725 |
| Two-tone 4th order IMD products | \|2*fx_low − 2*fy_high\| | \|2*fx_high − 2*fy_low\| | \|2*fx_low + 2*fy_low\| | \|2*fx_high + 2*fy_high\| |
| IMD frequency limits (MHz) | 540 | 270 | 7260 | 7530 |
| Two-tone 5th order IMD products | \|fx_low − 4*fy_high\| | \|fx_high − 4*fy_low\| | \|fy_low − 4*fx_high\| | \|fy_high − 4*fx_low\| |
| IMD frequency limits (MHz) | 6210 | 5895 | 5220 | 4860 |
| Two-tone 5th order IMD products | \|fx_low + 4*fy_low\| | \|fx_high + 4*fy_high\| | \|fy_low + 4*fx_low\| | \|fy_high + 4*fx_high\| |

TABLE 26-continued

| UE UL carriers | fx_low | fx_high | fy_low | fy_high |
|---|---|---|---|---|
| IMD frequency limits (MHz) | 9390 | 9705 | 8760 | 9120 |
| Two-tone 5th order IMD products | \|2*fx_low − 3*fy_high\| | \|2*fx_high − 3*fy_low\| | \|2*fy_low − 3*fx_high\| | \|2*fy_high − 3*fx_low\| |
| IMD frequency limits (MHz) | 2520 | 2190 | 1515 | 1170 |
| Two-tone 5th order IMD products | \|2*fx_low + 3*fy_low\| | \|2*fx_high + 3*fy_high\| | \|2*fy_low + 3*fx_low\| | \|2*fy_high + 3*fx_high\| |
| IMD frequency limits (MHz) | 9180 | 9510 | 8970 | 9315 |

The $2^{nd}$ harmonic by Band 3 and $3^{rd}$ IMD fall into the own Rx Band 1. But this impact already has covered in 2DL/2UL CA_1A-3A.

The $4^{th}$ IMD fall into the $3^{rd}$ own Rx frequency of Band 42. It will be analysed to solve the self-interference problem.

I-7-2. Co-Existence Studies for LTE-A UL CA_1A-42A and DL CA_1A-3A-42A

For 2UL/3DL own receiver desensitization study $2^{nd}$ and $3^{rd}$ order harmonics and $2^{nd}$, $3^{rd}$, $4^{th}$ and $5^{th}$ order intermodulation products were calculated and presented in Table I-7-1.3-1

Below table shows harmonic and IMD analysis.

TABLE 27

| UE UL carriers | fx_low | fx_high | fy_low | fy_high |
|---|---|---|---|---|
| UL frequency (MHz) | 1920 | 1980 | 3400 | 3600 |
| 2nd harmonics frequency limits | 2*fx_low | 2*fx_high | 2*fy_low | 2*fy_high |
| 2nd harmonics frequency limits (MHz) | 3840 | 3960 | 6800 | 7200 |
| 3rd harmonics frequency limits | 3*fx_low | 3*fx_high | 3*fy_low | 3*fy_high |
| 3rd harmonics frequency limits (MHz) | 5760 | 5940 | 10200 | 10800 |
| Two tone 2nd order IMD products | \|fy_low − fx_high\| | \|fy_high − fx_low\| | \|fy_low + fx_low\| | \|fy_high + fx_high\| |
| IMD frequency limits (MHz) | 1420 | 1680 | 5320 | 5580 |
| Two-tone 3rd order IMD products | \|2*fx_low − fy_high\| | \|2*fx_high − fy_low\| | \|2*fy_low − fx_high\| | \|2*fy_high − fx_low\| |
| IMD frequency limits (MHz) | 240 | 560 | 4820 | 5280 |
| Two-tone 3rd order IMD products | \|2*fx_low + fy_low\| | \|2*fx_high + fy_high\| | \|2*fy_low + fx_low\| | \|2*fy_high + fx_high\| |
| IMD frequency limits (MHz) | 7240 | 7560 | 8720 | 9180 |
| Two-tone 4th order IMD products | \|3*fx_low − fy_high\| | \|3*fx_high − fy_low\| | \|3*fy_low − fx_high\| | \|3*fy_high − fx_low\| |
| IMD frequency limits (MHz) | 2160 | 2540 | 8220 | 8880 |
| Two-tone 4th order IMD products | \|3*fx_low + fy_low\| | \|3*fx_high + fy_high\| | \|3*fy_low + fx_low\| | \|3*fy_high + fx_high\| |
| IMD frequency limits (MHz) | 9160 | 9540 | 12120 | 12780 |
| Two-tone 4th order IMD products | \|2*fx_low − 2*fy_high\| | \|2*fx_high − 2*fy_low\| | \|2*fx_low + 2*fy_low\| | \|2*fx_high + 2*fy_high\| |
| IMD frequency limits (MHz) | 3360 | 2840 | 10640 | 11160 |
| Two-tone 5th order IMD products | \|fx_low − 4*fy_high\| | \|fx_high − 4*fy_low\| | \|fy_low − 4*fx_high\| | \|fy_high − 4*fx_low\| |
| IMD frequency limits (MHz) | 12480 | 11620 | 4520 | 4080 |
| Two-tone 5th order IMD products | \|fx_low + 4*fy_low\| | \|fx_high + 4*fy_high\| | \|fy_low + 4*fx_low\| | \|fy_high + 4*fx_high\| |
| IMD frequency limits (MHz) | 15520 | 16380 | 11080 | 11520 |
| Two-tone 5th order IMD products | \|2*fx_low − 3*fy_high\| | \|2*fx_high − 3*fy_low\| | \|2*fy_low − 3*fx_high\| | \|2*fy_high − 3*fx_low\| |
| IMD frequency limits (MHz) | 6960 | 6240 | 860 | 1440 |

TABLE 27-continued

| UE UL carriers | fx_low | fx_high | fy_low | fy_high |
|---|---|---|---|---|
| Two-tone 5th order IMD products | $\|2*fx\_low + 3*fy\_low\|$ | $\|2*fx\_high + 3*fy\_high\|$ | $\|2*fy\_low + 3*fx\_low\|$ | $\|2*fy\_high + 3*fx\_high\|$ |
| IMD frequency limits (MHz) | 14040 | 14760 | 12560 | 13140 |

The $3^{rd}$ IMD fall into the own Rx Band 1. But this impact already has covered in 2DL/2UL CA_1A-42A.

Hence, there was no harmonics/IMDs impact to the $3^{rd}$ own Rx frequency Band 3.

I-7-3. Co-Existence Studies for LTE-A UL CA_3A-42A and DL CA_1A-3A-42A

For 2UL/3DL own receiver desensitization study $2^{nd}$ and $3^{rd}$ order harmonics and $2^{nd}$, $3^{rd}$, $4^{th}$ and $5^{th}$ order intermodulation products were calculated and presented in below table.

Below table shows harmonic and IMD analysis.

TABLE 28

| UE UL carriers | fx_low | fx_high | fy_low | fy_high |
|---|---|---|---|---|
| UL frequency (MHz) | 1710 | 1785 | 3400 | 3600 |
| $2^{nd}$ harmonics frequency limits | $2*fx\_low$ | $2*fx\_high$ | $2*fy\_low$ | $2*fy\_high$ |
| $2^{nd}$ harmonics frequency limits (MHz) | 3420 | 3570 | 6800 | 7200 |
| $3^{rd}$ harmonics frequency limits | $3*fx\_low$ | $3*fx\_high$ | $3*fy\_low$ | $3*fy\_high$ |
| $3^{rd}$ harmonics frequency limits (MHz) | 5130 | 5355 | 10200 | 10800 |
| Two tone $2^{nd}$ order IMD products | $\|fy\_low - fx\_high\|$ | $\|fy\_high - fx\_low\|$ | $\|fy\_low + fx\_low\|$ | $\|fy\_high + fx\_high\|$ |
| IMD frequency limits (MHz) | 1615 | 1890 | 5110 | 5385 |
| Two-tone $3^{rd}$ order IMD products | $\|2*fx\_low - fy\_high\|$ | $\|2*fx\_high - fy\_low\|$ | $\|2*fy\_low - fx\_high\|$ | $\|2*fy\_high - fx\_low\|$ |
| IMD frequency limits (MHz) | 180 | 170 | 5015 | 5490 |
| Two-tone $3^{rd}$ order IMD products | $\|2*fx\_low + fy\_low\|$ | $\|2*fx\_high + fy\_high\|$ | $\|2*fy\_low + fx\_low\|$ | $\|2*fy\_high + fx\_high\|$ |
| IMD frequency limits (MHz) | 6820 | 7170 | 8510 | 8985 |
| Two-tone $4^{th}$ order IMD products | $\|3*fx\_low - fy\_high\|$ | $\|3*fx\_high - fy\_low\|$ | $\|3*fy\_low - fx\_high\|$ | $\|3*fy\_high - fx\_low\|$ |
| IMD frequency limits (MHz) | 1530 | 1955 | 8415 | 9090 |
| Two-tone $4^{th}$ order IMD products | $\|3*fx\_low + fy\_low\|$ | $\|3*fx\_high + fy\_high\|$ | $\|3*fy\_low + fx\_low\|$ | $\|3*fy\_high + fx\_high\|$ |
| IMD frequency limits (MHz) | 8530 | 8955 | 11910 | 12585 |
| Two-tone $4^{th}$ order IMD products | $\|2*fx\_low - 2*fy\_high\|$ | $\|2*fx\_high - 2*fy\_low\|$ | $\|2*fx\_low + 2*fy\_low\|$ | $\|2*fx\_high + 2*fy\_high\|$ |
| IMD frequency limits (MHz) | 3780 | 3230 | 10220 | 10770 |
| Two-tone $5^{th}$ order IMD products | $\|fx\_low - 4*fy\_high\|$ | $\|fx\_high - 4*fy\_low\|$ | $\|fy\_low - 4*fx\_high\|$ | $\|fy\_high - 4*fx\_low\|$ |
| IMD frequency limits (MHz) | 12690 | 11815 | 3740 | 3240 |
| Two-tone $5^{th}$ order IMD products | $\|fx\_low + 4*fy\_low\|$ | $\|fx\_high + 4*fy\_high\|$ | $\|fy\_low + 4*fx\_low\|$ | $\|fy\_high + 4*fx\_high\|$ |
| IMD frequency limits (MHz) | 15310 | 16185 | 10240 | 10740 |

TABLE 28-continued

| UE UL carriers | fx_low | fx_high | fy_low | fy_high |
|---|---|---|---|---|
| Two-tone 5$^{th}$ order IMD products | \|2*fx_low − 3*fy_high\| | \|2*fx_high − 3*fy_low\| | \|2*fy_low − 3*fx_high\| | \|2*fy_high − 3*fx_low\| |
| IMD frequency limits (MHz) | 7380 | 6630 | 1445 | 2070 |
| Two-tone 5$^{th}$ order IMD products | \|2*fx_low + 3*fy_low\| | \|2*fx_high + 3*fy_high\| | \|2*fy_low + 3*fx_low\| | \|2*fy_high + 3*fx_high\| |
| IMD frequency limits (MHz) | 13620 | 14370 | 11930 | 12555 |

The 2$^{nd}$, 4$^{th}$ & 5$^{th}$ IMDs fall into the own Rx frequency of Band 3. Also the 2$^{nd}$ harmonics from Band 3, 4$^{th}$ & 5$^{th}$ IMDs fall into the own Rx frequency of Band 42. But these impact already has covered in 2DL/2UL CA_3A-42A.

Hence, there was no harmonics/IMDs impact to the 3$^{rd}$ own Rx frequency of Band 1.

I-7-4. MSD

When uplink CA configurations CA_1A-3A is paired with downlink CA configuration CA_1A-3A-42A there is interference components from 2 uplink operation which would interfere the downlink of the Band 42.

When uplink CA configurations CA_1A-42A is paired with downlink CA configuration CA_1A-3A-42A there is no interference components from 2 uplink operation which would interfere the downlink of the Band 3.

When uplink CA configurations CA_3A-42A is paired with downlink CA configuration CA_1A-3A-42A there is no interference components from 2 uplink operation which would interfere the downlink of the Band 1.

I-8. LTE Advanced Carrier Aggregation: Band 1 and Band 19 and Band 42 with 2 ULs

TABLE 29

| E-UTRA CA Configuration | Uplink CA configurations | E-UTRA Bands | 1.4 MHz | 3 MHz | 5 MHz | 10 MHz | 15 MHz | 20 MHz | Maximum aggregated bandwidth [MHz] | Bandwidth combination set |
|---|---|---|---|---|---|---|---|---|---|---|
| CA_1A-19A-42A | CA_1A-19A or CA_1A-42A or CA_19A-42A | 1 19 42 | | | Yes Yes Yes | Yes Yes Yes | Yes Yes Yes | Yes Yes | 55 | 0 |

I-8-1. Co-Existence Studies for LTE-A UL CA_1A-19A and DL CA_1A-19A-42A

For 2UL/3DL own receiver desensitization study 2nd and 3rd order harmonics and 2nd, 3rd, 4th and 5th order intermodulation products were calculated and presented in below table.

Below table shows harmonic and IMD analysis.

TABLE 30

| UE UL carriers | fx_low | fx_high | fy_low | fy_high |
|---|---|---|---|---|
| UL frequency (MHz) | 830 | 845 | 1940 | 1960 |
| 2nd harmonics frequency limits | 2*fx_low | 2*fx_high | 2* fy_low | 2* fy_high |
| 2nd harmonics frequency limits (MHz) | 1660 | 1690 | 3880 | 3920 |
| 3rd harmonics frequency limits | 3*fx_low | 3*fx_high | 3* fy_low | 3* fy_high |
| 3rd harmonics frequency limits (MHz) | 2490 | 2535 | 5820 | 5880 |
| Two tone 2nd order IMD products | \|fy_low − fx_high\| | \|fy_high − fx_low\| | \|fy_low + fx_low\| | \|fy_high + fx_high\| |
| IMD frequency limits (MHz) | 1095 | 1130 | 2770 | 2805 |
| Two-tone 3rd order IMD products | \|2*fx_low − fy_high\| | \|2*fx_high − fy_low\| | \|2*fy_low − fx_high\| | \|2*fy_high − fx_low\| |
| IMD frequency limits (MHz) | 300 | 250 | 3035 | 3090 |

TABLE 30-continued

| UE UL carriers | fx_low | fx_high | fy_low | fy_high |
|---|---|---|---|---|
| Two-tone 3rd order IMD products IMD frequency limits (MHz) | \|2*fx_low + fy_low\| 3600 | \|2*fx_high + fy_high\| 3650 | \|2*fy_low + fx_low\| 4710 | \|2*fy_high + fx_high\| 4765 |
| Two-tone 4th order IMD products IMD frequency limits (MHz) | \|3*fx_low − fy_high\| 530 | \|3*fx_high − fy_low\| 595 | \|3*fy_low − fx_high\| 4975 | \|3*fy_high − fx_low\| 5050 |
| Two-tone 4th order IMD products IMD frequency limits (MHz) | \|3*fx_low + fy_low\| 4430 | \|3*fx_high + fy_high\| 4495 | \|3*fy_low + fx_low\| 6650 | \|3*fy_high + fx_high\| 6725 |
| Two-tone 4th order IMD products IMD frequency limits (MHz) | \|2*fx_low − 2*fy_high\| 2260 | \|2*fx_high − 2*fy_low\| 2190 | \|2*fx_low + 2*fy_low\| 5540 | \|2*fx_high + 2*fy_high\| 5610 |
| Two-tone 5th order IMD products IMD frequency limits (MHz) | \|fx_low − 4*fy_high\| 7010 | \|fx_high − 4*fy_low\| 6915 | \|fy_low − 4*fx_high\| 1440 | \|fy_high − 4*fx_low\| 1360 |
| Two-tone 5th order IMD products IMD frequency limits (MHz) | \|fx_low + 4*fy_low\| 8590 | \|fx_high + 4*fy_high\| 8685 | \|fy_low + 4*fx_low\| 5260 | \|fy_high + 4*fx_high\| 5340 |
| Two-tone 5th order IMD products IMD frequency limits (MHz) | \|2*fx_low − 3*fy_high\| 4220 | \|2*fx_high − 3*fy_low\| 4130 | \|2*fy_low − 3*fx_high\| 1345 | \|2*fy_high − 3*fx_low\| 1430 |
| Two-tone 5th order IMD products IMD frequency limits (MHz) | \|2*fx_low + 3*fy_low\| 7480 | \|2*fx_high + 3*fy_high\| 7570 | \|2*fy_low + 3*fx_low\| 6370 | \|2*fy_high + 3*fx_high\| 6455 |

The 4th IMD fall into the own Rx Band 1. But this impact already has covered in 2DL/2UL CA 1A-19A.

The 3rd IMD fall into the 3rd own Rx frequency of Band 42. However, RAN4 can consider specific holding frequency bands when study the IMD analysis for the related CA band combinations including Band 19. Then, there is no IMD problems to the 3rd own Rx frequency of Band 42.

I-8-2. Co-Existence Studies for LTE-A UL CA_1A-42A and DL CA_1A-19A-42A

For 2UL/3DL own receiver desensitization study $2^{nd}$ and $3^{rd}$ order harmonics and $2^{nd}$, $3^{rd}$, $4^{th}$ and $5^{th}$ order inter-modulation products were calculated and presented in below table.

Below table shows harmonic and IMD analysis.

TABLE 31

| UE UL carriers | fx_low | fx_high | fy_low | fy_high |
|---|---|---|---|---|
| UL frequency (MHz) | 1940 | 1960 | 3480 | 3520 |
| 2nd harmonics frequency limits | 2*fx_low | 2*fx_high | 2* fy_low | 2* fy_high |
| 2nd harmonics frequency limits (MHz) | 3880 | 3920 | 6960 | 7040 |
| 3rd harmonics frequency limits | 3*fx_low | 3*fx_high | 3* fy_low | 3* fy_high |
| 3rd harmonics frequency limits (MHz) | 5820 | 5880 | 10440 | 10560 |
| Two tone 2nd order IMD products IMD frequency limits (MHz) | \|fy_low − fx_high\| 1520 | \|fy_high − fx_low\| 1580 | \|fy_low + fx_low\| 5420 | \|fy_high + fx_high\| 5480 |
| Two-tone 3rd order IMD products IMD frequency limits (MHz) | \|2*fx_low − fy_high\| 360 | \|2*fx_high − fy_low\| 440 | \|2*fy_low − fx_high\| 5000 | \|2*fy_high − fx_low\| 5100 |
| Two-tone 3rd order IMD products IMD frequency limits (MHz) | \|2*fx_low + fy_low\| 7360 | \|2*fx_high + fy_high\| 7440 | \|2*fy_low + fx_low\| 8900 | \|2*fy_high + fx_high\| 9000 |
| Two-tone 4th order IMD products IMD frequency limits (MHz) | \|3*fx_low − fy_high\| 2300 | \|3*fx_high − fy_low\| 2400 | \|3*fy_low − fx_high\| 8480 | \|3*fy_high − fx_low\| 8620 |

TABLE 31-continued

| UE UL carriers | fx_low | fx_high | fy_low | fy_high |
|---|---|---|---|---|
| Two-tone 4th order IMD products IMD frequency limits (MHz) | \|3*fx_low + fy_low\| 9300 | \|3*fx_high + fy_high\| 9400 | \|3*fy_low + fx_low\| 12380 | \|3*fy_high + fx_high\| 12520 |
| Two-tone 4th order IMD products IMD frequency limits (MHz) | \|2*fx_low − 2*fy_high\| 3160 | \|2*fx_high − 2*fy_low\| 3040 | \|2*fx_low + 2*fy_low\| 10840 | \|2*fx_high + 2*fy_high\| 10960 |
| Two-tone 5th order IMD products IMD frequency limits (MHz) | \|fx_low − 4*fy_high\| 12140 | \|fx_high − 4*fy_low\| 11960 | \|fy_low − 4*fx_high\| 4360 | \|fy_high − 4*fx_low\| 4240 |
| Two-tone 5th order IMD products IMD frequency limits (MHz) | \|fx_low + 4*fy_low\| 15860 | \|fx_high + 4*fy_high\| 16040 | \|fy_low + 4*fx_low\| 11240 | \|fy_high + 4*fx_high\| 11360 |
| Two-tone 5th order IMD products IMD frequency limits (MHz) | \|2*fx_low − 3*fy_high\| 6680 | \|2*fx_high − 3*fy_low\| 6520 | \|2*fy_low − 3*fx_high\| 1080 | \|2*fy_high − 3*fx_low\| 1220 |
| Two-tone 5th order IMD products IMD frequency limits (MHz) | \|2*fx_low + 3*fy_low\| 14320 | \|2*fx_high + 3*fy_high\| 14480 | \|2*fy_low + 3*fx_low\| 12780 | \|2*fy_high + 3*fx_high\| 12920 |

The 4th IMD fall into the own Rx Band 1. But this impact already has covered in 2DL/2UL CA_1A-42A.

The 5th IMD fall into the 3rd own Rx frequency of Band 19. However, RAN4 can consider specific holding frequency bands when study the IMD analysis for the related CA band combinations including Band 19. Then, there is no IMD problems to the 3rd own Rx frequency of Band 19.

I-8-3. Co-Existence Studies for LTE-A UL CA_19A-42A and DL CA_1A-19A-42A

For 2UL/3DL own receiver desensitization study $2^{nd}$ and $3^{rd}$ order harmonics and $2^{nd}$, $3^{rd}$, $4^{th}$ and $5^{th}$ order inter-modulation products were calculated and presented in below table.

Below table shows harmonic and IMD analysis.

TABLE 32

| UE UL carriers | fx_low | fx_high | fy_low | fy_high |
|---|---|---|---|---|
| UL frequency (MHz) | 830 | 845 | 3480 | 3520 |
| 2nd harmonics frequency limits | 2*fx_low | 2*fx_high | 2* fy_low | 2* fy_high |
| 2nd harmonics frequency limits (MHz) | 1660 | 1690 | 6960 | 7040 |
| 3rd harmonics frequency limits | 3*fx_low | 3*fx_high | 3* fy_low | 3* fy_high |
| 3rd harmonics frequency limits (MHz) | 2490 | 2535 | 10440 | 10560 |
| Two tone 2nd order IMD products IMD frequency limits (MHz) | \|fy_low − fx_high\| 2635 | \|fy_high − fx_low\| 2690 | \|fy_low + fx_low\| 4310 | \|fy_high + fx_high\| 4365 |
| Two-tone 3rd order IMD products IMD frequency limits (MHz) | \|2*fx_low − fy_high\| 1860 | \|2*fx_high − fy_low\| 1790 | \|2*fy_low − fx_high\| 6115 | \|2*fy_high − fx_low\| 6210 |
| Two-tone 3rd order IMD products IMD frequency limits (MHz) | \|2*fx_low + fy_low\| 5140 | \|2*fx_high + fy_high\| 5210 | \|2*fy_low + fx_low\| 7790 | \|2*fy_high + fx_high\| 7885 |
| Two-tone 4th order IMD products IMD frequency limits (MHz) | \|3*fx_low − fy_high\| 1030 | \|3*fx_high − fy_low\| 945 | \|3*fy_low − fx_high\| 9595 | \|3*fy_high − fx_low\| 9730 |
| Two-tone 4th order IMD products IMD frequency limits (MHz) | \|3*fx_low + fy_low\| 5970 | \|3*fx_high + fy_high\| 6055 | \|3*fy_low + fx_low\| 11270 | \|3*fy_high + fx_high\| 11405 |
| Two-tone 4th order IMD products IMD frequency limits (MHz) | \|2*fx_low − 2*fy_high\| 5380 | \|2*fx_high − 2*fy_low\| 5270 | \|2*fx_low + 2*fy_low\| 8620 | \|2*fx_high + 2*fy_high\| 8730 |

TABLE 32-continued

| UE UL carriers | fx_low | fx_high | fy_low | fy_high |
|---|---|---|---|---|
| Two-tone 5th order IMD products IMD frequency limits (MHz) | \|fx_low − 4*fy_high\| 13250 | \|fx_high − 4*fy_low\| 13075 | \|fy_low − 4*fx_high\| 100 | \|fy_high − 4*fx_low\| 200 |
| Two-tone 5th order IMD products IMD frequency limits (MHz) | \|fx_low + 4*fy_low\| 14750 | \|fx_high + 4*fy_high\| 14925 | \|fy_low + 4*fx_low\| 6800 | \|fy_high + 4*fx_high\| 6900 |
| Two-tone 5th order IMD products IMD frequency limits (MHz) | \|2*fx_low − 3*fy_high\| 8900 | \|2*fx_high − 3*fy_low\| 8750 | \|2*fy_low − 3*fx_high\| 4425 | \|2*fy_high − 3*fx_low\| 4550 |
| Two-tone 5th order IMD products IMD frequency limits (MHz) | \|2*fx_low + 3*fy_low\| 12100 | \|2*fx_high + 3*fy_high\| 12250 | \|2*fy_low + 3*fx_low\| 9450 | \|2*fy_high + 3*fx_high\| 9575 |

The $4^{th}$ IMD fall into the own Rx frequency of Band 19. But this impact already has covered in 2DL/2UL CA_19A-42A.

Hence, there was no harmonics/IMDs impact to the $3^{rd}$ own Rx frequency of Band 1.

I-8-4. MSD

When uplink CA configurations CA_1A-19A is paired with downlink CA configuration CA_1A-19A-42A there is no interference components from 2 uplink operation which would interfere the downlink of the Band 42.

When uplink CA configurations CA_1A-42A is paired with downlink CA configuration CA_1A-19A-42A there is no interference components from 2 uplink operation which would interfere the downlink of the Band 19.

When uplink CA configurations CA_19A-42A is paired with downlink CA configuration CA_1A-19A-42A there is no interference components from 2 uplink operation which would interfere the downlink of the Band 1.

I-9. LTE Advanced Carrier Aggregation: Band 1 and Band 21 and Band 42 with 2 ULs

TABLE 33

| E-UTRA CA Configuration | Uplink CA configurations | E-UTRA Bands | 1.4 MHz | 3 MHz | 5 MHz | 10 MHz | 15 MHz | 20 MHz | Maximum aggregated bandwidth [MHz] | Bandwidth combination set |
|---|---|---|---|---|---|---|---|---|---|---|
| CA_1A-21A-42A | CA_1A-21A or CA_1A-42A or CA_21A-42A | 1 21 42 | | | Yes Yes Yes | Yes Yes Yes | Yes Yes Yes | Yes Yes | 55 | 0 |

I-9-1. Co-Existence Studies for LTE-A UL CA_1A-21A and DL CA_1A-21A-42A

For 2UL/3DL own receiver desensitization study $2^{nd}$ and $3^{rd}$ order harmonics and $2^{nd}$, $3^{rd}$, $4^{th}$ and $5^{th}$ order intermodulation products were calculated and presented in below table.

TABLE 34

| UE UL carriers | fx_low | fx_high | fy_low | fy_high |
|---|---|---|---|---|
| UL frequency (MHz) | 1447.9 | 1462.9 | 1940 | 1960 |
| 2nd harmonics frequency limits | 2*fx_low | 2*fx_high | 2* fy_low | 2* fy_high |
| 2nd harmonics frequency limits (MHz) | 2895.8 | 2925.8 | 3880 | 3920 |
| 3rd harmonics frequency limits | 3*fx_low | 3*fx_high | 3* fy_low | 3* fy_high |
| 3rd harmonics frequency limits (MHz) | 4343.7 | 4388.7 | 5820 | 5880 |
| Two tone 2nd order IMD products IMD frequency limits (MHz) | \|fy_low − fx_high\| 477.1 | \|fy_high − fx_low\| 512.1 | \|fy_low + fx_low\| 3387.9 | \|fy_high + fx_high\| 3422.9 |

TABLE 34-continued

| UE UL carriers | fx_low | fx_high | fy_low | fy_high |
|---|---|---|---|---|
| Two-tone 3rd order IMD products IMD frequency limits (MHz) | \|2*fx_low − fy_high\| 935.8 | \|2*fx_high − fy_low\| 985.8 | \|2*fy_low − fx_high\| 2417.1 | \|2*fy_high − fx_low\| 2472.1 |
| Two-tone 3rd order IMD products IMD frequency limits (MHz) | \|2*fx_low + fy_low\| 4835.8 | \|2*fx_high + fy_high\| 4885.8 | \|2*fy_low + fx_low\| 5327.9 | \|2*fy_high + fx_high\| 5382.9 |
| Two-tone 4th order IMD products IMD frequency limits (MHz) | \|3*fx_low − fy_high\| 2383.7 | \|3*fx_high − fy_low\| 2448.7 | \|3*fy_low − fx_high\| 4357.1 | \|3*fy_high − fx_low\| 4432.1 |
| Two-tone 4th order IMD products IMD frequency limits (MHz) | \|3*fx_low + fy_low\| 6283.7 | \|3*fx_high + fy_high\| 6348.7 | \|3*fy_low + fx_low\| 7267.9 | \|3*fy_high + fx_high\| 7342.9 |
| Two-tone 4th order IMD products IMD frequency limits (MHz) | \|2*fx_low − 2*fy_high\| 1024.2 | \|2*fx_high − 2*fy_low\| 954.2 | \|2*fx_low + 2*fy_low\| 6775.8 | \|2*fx_high + 2*fy_high\| 6845.8 |
| Two-tone 5th order IMD products IMD frequency limits (MHz) | \|fx_low − 4*fy_high\| 6392.1 | \|fx_high − 4*fy_low\| 6297.1 | \|fy_low − 4*fx_high\| 3911.6 | \|fy_high − 4*fx_low\| 3831.6 |
| Two-tone 5th order IMD products IMD frequency limits (MHz) | \|fx_low + 4*fy_low\| 9207.9 | \|fx_high + 4*fy_high\| 9302.9 | \|fy_low + 4*fx_low\| 7731.6 | \|fy_high + 4*fx_high\| 7811.6 |
| Two-tone 5th order IMD products IMD frequency limits (MHz) | \|2*fx_low − 3*fy_high\| 2984.2 | \|2*fx_high − 3*fy_low\| 2894.2 | \|2*fy_low − 3*fx_high\| 508.7 | \|2*fy_high − 3*fx_low\| 423.7 |
| Two-tone 5th order IMD products IMD frequency limits (MHz) | \|2*fx_low + 3*fy_low\| 8715.8 | \|2*fx_high + 3*fy_high\| 8805.8 | \|2*fy_low + 3*fx_low\| 8223.7 | \|2*fy_high + 3*fx_high\| 8308.7 |

The $2^{nd}$ IMD fall into the $3^{rd}$ own Rx frequency of Band 42. However, RAN4 can consider specific holding frequency bands when study the IMD analysis for the related CA band combinations including Band 21. Then, there is no IMD problems to the $3^{rd}$ own Rx frequency of Band 42.

I-9-2. Co-Existence Studies for LTE-A UL CA_1A-42A and DL CA_1A-21A-42A

For 2UL/3DL own receiver desensitization study $2^{nd}$ and $3^{rd}$ order harmonics and $2^{nd}$, $3^{rd}$, $4^{th}$ and $5^{th}$ order intermodulation products were calculated and presented in below table.

Below table shows harmonic and IMD analysis.

TABLE 35

| UE UL carriers | fx_low | fx_high | fy_low | fy_high |
|---|---|---|---|---|
| UL frequency (MHz) | 1940 | 1960 | 3480 | 3520 |
| $2^{nd}$ harmonics frequency limits (MHz) | 2*fx_low | 2*fx_high | 2* fy_low | 2* fy_high |
| $2^{nd}$ harmonics frequency limits (MHz) | 3880 | 3920 | 6960 | 7040 |
| $3^{rd}$ harmonics frequency limits | 3*fx_low | 3*fx_high | 3* fy_low | 3* fy_high |
| $3^{rd}$ harmonics frequency limits (MHz) | 5820 | 5880 | 10440 | 10560 |
| Two tone $2^{nd}$ order IMD products IMD frequency limits (MHz) | \|fy_low − fx_high\| 1520 | \|fy_high − fx_low\| 1580 | \|fy_low + fx_low\| 5420 | \|fy_high + fx_high\| 5480 |
| Two-tone $3^{rd}$ order IMD products IMD frequency limits (MHz) | \|2*fx_low − fy_high\| 360 | \|2*fx_high − fy_low\| 440 | \|2*fy_low − fx_high\| 5000 | \|2*fy_high − fx_low\| 5100 |
| Two-tone $3^{rd}$ order IMD products IMD frequency limits (MHz) | \|2*fx_low + fy_low\| 7360 | \|2*fx_high + fy_high\| 7440 | \|2*fy_low + fx_low\| 8900 | \|2*fy_high + fx_high\| 9000 |

TABLE 35-continued

| UE UL carriers | fx_low | fx_high | fy_low | fy_high |
|---|---|---|---|---|
| Two-tone 4th order IMD products IMD frequency limits (MHz) | \|3*fx_low − fy_high\| 2300 | \|3*fx_high − fy_low\| 2400 | \|3*fy_low − fx_high\| 8480 | \|3*fy_high − fx_low\| 8620 |
| Two-tone 4th order IMD products IMD frequency limits (MHz) | \|3*fx_low + fy_low\| 9300 | \|3*fx_high + fy_high\| 9400 | \|3*fy_low + fx_low\| 12380 | \|3*fy_high + fx_high\| 12520 |
| Two-tone 4th order IMD products IMD frequency limits (MHz) | \|2*fx_low − 2*fy_high\| 3160 | \|2*fx_high − 2*fy_low\| 3040 | \|2*fx_low + 2*fy_low\| 10840 | \|2*fx_high + 2*fy_high\| 10960 |
| Two-tone 5th order IMD products IMD frequency limits (MHz) | \|fx_low − 4*fy_high\| 12140 | \|fx_high − 4*fy_low\| 11960 | \|fy_low − 4*fx_high\| 4360 | \|fy_high − 4*fx_low\| 4240 |
| Two-tone 5th order IMD products IMD frequency limits (MHz) | \|fx_low + 4*fy_low\| 15860 | \|fx_high + 4*fy_high\| 16040 | \|fy_low + 4*fx_low\| 11240 | \|fy_high + 4*fx_high\| 11360 |
| Two-tone 5th order IMD products IMD frequency limits (MHz) | \|2*fx_low − 3*fy_high\| 6680 | \|2*fx_high − 3*fy_low\| 6520 | \|2*fy_low − 3*fx_high\| 1080 | \|2*fy_high − 3*fx_low\| 1220 |
| Two-tone 5th order IMD products IMD frequency limits (MHz) | \|2*fx_low + 3*fy_low\| 14320 | \|2*fx_high + 3*fy_high\| 14480 | \|2*fy_low + 3*fx_low\| 12780 | \|2*fy_high + 3*fx_high\| 12920 |

The 4th IMD fall into the own Rx Band 1. But this impact already has covered in 2DL/2UL CA_1A-42A.

The 2nd IMD fall into the 3rd own Rx frequency of Band 21. However, RAN4 can consider specific holding frequency bands when study the IMD analysis for the related CA band combinations including Band 21. Then, there is no IMD problems to the 3rd own Rx frequency of Band 21.

I-9-2. Co-Existence Studies for LTE-A UL CA_21A-42A and DL CA_1A-21A-42A

For 2UL/3DL own receiver desensitization study 2nd and 3rd order harmonics and 2nd, 3rd, 4th and 5th order intermodulation products were calculated and presented in below table.

Below table shows harmonic and IMD analysis.

TABLE 36

| UE UL carriers | fx_low | fx_high | fy_low | fy_high |
|---|---|---|---|---|
| UL frequency (MHz) | 1447.9 | 1462.9 | 3480 | 3520 |
| 2nd harmonics frequency limits | 2*fx_low | 2*fx_high | 2*fy_low | 2*fy_high |
| 2nd harmonics frequency limits (MHz) | 2895.8 | 2925.8 | 6960 | 7040 |
| 3rd harmonics frequency limits | 3*fx_low | 3*fx_high | 3*fy_low | 3*fy_high |
| 3rd harmonics frequency limits (MHz) | 4343.7 | 4388.7 | 10440 | 10560 |
| Two tone 2nd order IMD products IMD frequency limits (MHz) | \|fy_low − fx_high\| 2017.1 | \|fy_high − fx_low\| 2072.1 | \|fy_low + fx_low\| 4927.9 | \|fy_high + fx_high\| 4982.9 |
| Two-tone 3rd order IMD products IMD frequency limits (MHz) | \|2*fx_low − fy_high\| 624.2 | \|2*fx_high − fy_low\| 554.2 | \|2*fy_low − fx_high\| 5497.1 | \|2*fy_high − fx_low\| 5592.1 |
| Two-tone 3rd order IMD products IMD frequency limits (MHz) | \|2*fx_low + fy_low\| 6375.8 | \|2*fx_high + fy_high\| 6445.8 | \|2*fy_low + fx_low\| 8407.9 | \|2*fy_high + fx_high\| 8502.9 |
| Two-tone 4th order IMD products IMD frequency limits (MHz) | \|3*fx_low − fy_high\| 823.7 | \|3*fx_high − fy_low\| 908.7 | \|3*fy_low − fx_high\| 8977.1 | \|3*fy_high − fx_low\| 9112.1 |

TABLE 36-continued

| UE UL carriers | fx_low | fx_high | fy_low | fy_high |
|---|---|---|---|---|
| Two-tone 4th order IMD products IMD frequency limits (MHz) | \|3*fx_low + fy_low\| 7823.7 | \|3*fx_high + fy_high\| 7908.7 | \|3*fy_low + fx_low\| 11887.9 | \|3*fy_high + fx_high\| 12022.9 |
| Two-tone 4th order IMD products IMD frequency limits (MHz) | \|2*fx_low − 2*fy_high\| 4144.2 | \|2*fx_high − 2*fy_low\| 4034.2 | \|2*fx_low + 2*fy_low\| 9855.8 | \|2*fx_high + 2*fy_high\| 9965.8 |
| Two-tone 5th order IMD products IMD frequency limits (MHz) | \|fx_low − 4*fy_high\| 12632.1 | \|fx_high − 4*fy_low\| 12457.1 | \|fy_low − 4*fx_high\| 2371.6 | \|fy_high − 4*fx_low\| 2271.6 |
| Two-tone 5th order IMD products IMD frequency limits (MHz) | \|fx_low + 4*fy_low\| 15367.9 | \|fx_high + 4*fy_high\| 15542.9 | \|fy_low + 4*fx_low\| 9271.6 | \|fy_high + 4*fx_high\| 9371.6 |
| Two-tone 5th order IMD products IMD frequency limits (MHz) | \|2*fx_low − 3*fy_high\| 7664.2 | \|2*fx_high − 3*fy_low\| 7514.2 | \|2*fy_low − 3*fx_high\| 2571.3 | \|2*fy_high − 3*fx_low\| 2696.3 |
| Two-tone 5th order IMD products IMD frequency limits (MHz) | \|2*fx_low + 3*fy_low\| 13335.8 | \|2*fx_high + 3*fy_high\| 13485.8 | \|2*fy_low + 3*fx_low\| 11303.7 | \|2*fy_high + 3*fx_high\| 11428.7 |

The $2^{nd}$ IMD fall into the $3^{rd}$ own Rx frequency of Band 1. However, RAN4 can consider specific holding frequency bands when study the IMD analysis for the related CA band combinations including Band 21. Then, there is no IMD problems to the $3^{rd}$ own Rx frequency of Band 1.

I-9-3. MSD

When uplink CA configurations CA_1A-21A is paired with downlink CA configuration CA_1A-21A-42A there is no interference components from 2 uplink operation which would interfere the downlink of the Band 42.

When uplink CA configurations CA_1A-42A is paired with downlink CA configuration CA_1A-21A-42A there is no interference components from 2 uplink operation which would interfere the downlink of the Band 21.

When uplink CA configurations CA_21A-42A is paired with downlink CA configuration CA_1A-21A-42A there is no interference components from 2 uplink operation which would interfere the downlink of the Band 1.

I-10. LTE Advanced Carrier Aggregation: Band 3 and Band 19 and Band 21 with 2 ULs

TABLE 37

| E-UTRA CA Configuration | Uplink CA configurations | E-UTRA Bands | 1.4 MHz | 3 MHz | 5 MHz | 10 MHz | 15 MHz | 20 MHz | Maximum aggregated bandwidth [MHz] | Bandwidth combination set |
|---|---|---|---|---|---|---|---|---|---|---|
| CA_3A-19A-21A | CA_3A-19A or CA_3A-21A or CA_19A-21A | 3 19 21 | | | Yes Yes Yes | Yes Yes Yes | Yes Yes Yes | Yes | 50 | 0 |

I-10-1 Co-Existence Studies for LTE-A UL CA_3A-19A and DL CA_3A-19A-21A

For 2UL/3DL own receiver desensitization study $2^{nd}$ and $3^{rd}$ order harmonics and $2^{nd}$, $3^{rd}$, $4^{th}$ and $5^{th}$ order intermodulation products were calculated and presented in below table.

Below table shows harmonic and IMD analysis.

TABLE 38

| UE UL carriers | fx_low | fx_high | fy_low | fy_high |
|---|---|---|---|---|
| UL frequency (MHz) | 830 | 845 | 1764.9 | 1784.9 |
| 2nd harmonics frequency limits | 2*fx_low | 2*fx_high | 2* fy_low | 2* fy_high |
| 2nd harmonics frequency limits (MHz) | 1660 | 1690 | 3529.8 | 3569.8 |
| 3rd harmonics frequency limits | 3*fx_low | 3*fx_high | 3* fy_low | 3* fy_high |

TABLE 38-continued

| UE UL carriers | fx_low | fx_high | fy_low | fy_high |
|---|---|---|---|---|
| 3rd harmonics frequency limits (MHz) | 2490 | 2535 | 5294.7 | 5354.7 |
| Two tone 2nd order IMD products | \|fy_low − fx_high\| | \|fy_high − fx_low\| | \|fy_low + fx_low\| | \|fy_high + fx_high\| |
| IMD frequency limits (MHz) | 919.9 | 954.9 | 2594.9 | 2629.9 |
| Two-tone 3rd order IMD products | \|2*fx_low − fx_high\| | \|2*fx_high − fy_low\| | \|2*fy_low − fx_high\| | \|2*fy_high − fx_low\| |
| IMD frequency limits (MHz) | 124.9 | 74.9 | 2684.8 | 2739.8 |
| Two-tone 3rd order IMD products | \|2*fx_low + fy_low\| | \|2*fx_high + fy_high\| | \|2*fy_low + fx_low\| | \|2*fy_high + fx_high\| |
| IMD frequency limits (MHz) | 3424.9 | 3474.9 | 4359.8 | 4414.8 |
| Two-tone 4th order IMD products | \|3*fx_low − fx_high\| | \|3*fx_high − fy_low\| | \|3*fy_low − fx_high\| | \|3*fy_high − fx_low\| |
| IMD frequency limits (MHz) | 705.1 | 770.1 | 4449.7 | 4524.7 |
| Two-tone 4th order IMD products | \|3*fx_low + fy_low\| | \|3*fx_high + fy_high\| | \|3*fy_low + fx_low\| | \|3*fy_high + fx_high\| |
| IMD frequency limits (MHz) | 4254.9 | 4319.9 | 6124.7 | 6199.7 |
| Two-tone 4th order IMD products | \|2*fx_low − 2*fy_high\| | \|2*fx_high − 2*fy_low\| | \|2*fx_low + 2*fy_low\| | \|2*fx_high + 2*fy_high\| |
| IMD frequency limits (MHz) | 1909.8 | 1839.8 | 5189.8 | 5259.8 |
| Two-tone 5th order IMD products | \|fx_low − 4*fy_high\| | \|fx_high − 4*fy_low\| | \|fy_low − 4*fx_high\| | \|fy_high − 4*fx_low\| |
| IMD frequency limits (MHz) | 6309.6 | 6214.6 | 1615.1 | 1535.1 |
| Two-tone 5th order IMD products | \|fx_low + 4*fy_low\| | \|fx_high + 4*fy_high\| | \|fy_low + 4*fx_low\| | \|fy_high + 4*fx_high\| |
| IMD frequency limits (MHz) | 7889.6 | 7984.6 | 5084.9 | 5164.9 |
| Two-tone 5th order IMD products | \|2*fx_low − 3*fy_high\| | \|2*fx_high − 3*fy_low\| | \|2*fy_low − 3*fx_high\| | \|2*fy_high − 3*fx_low\| |
| IMD frequency limits (MHz) | 3694.7 | 3604.7 | 994.8 | 1079.8 |
| Two-tone 5th order IMD products | \|2*fx_low + 3*fy_low\| | \|2*fx_high + 3*fy_high\| | \|2*fy_low + 3*fx_low\| | \|2*fy_high + 3*fx_high\| |
| IMD frequency limits (MHz) | 6954.7 | 7044.7 | 6019.8 | 6104.8 |

The $2^{nd}$ & $5^{th}$ IMDs fall into the own Rx frequency of Band 19. Also the $4^{th}$ IMD fall into the own Rx frequency of Band 3. But theses impacts already has covered in 2DL/2UL CA 3A-19A.

Hence, there was no harmonics/IMDs impact to the $3^{rd}$ own Rx frequency of Band 21.

I-10-2. Co-Existence Studies for LTE-A UL CA_3A-21A and DL CA_3A-19A-21A

For 2UL/3DL own receiver desensitization study $2^{nd}$ and $3^{rd}$ order harmonics and $2^{nd}$, $3^{rd}$, $4^{th}$ and $5^{th}$ order inter-modulation products were calculated and presented in below table.

Below table shows harmonic and IMD analysis.

TABLE 39

| UE UL carriers | fx_low | fx_high | fy_low | fy_high |
|---|---|---|---|---|
| UL frequency (MHz) | 1447.9 | 1462.9 | 1764.9 | 1784.9 |
| 2nd harmonics frequency limits | 2*fx_low | 2*fx_high | 2* fy_low | 2* fy_high |
| 2nd harmonics frequency limits (MHz) | 2895.8 | 2925.8 | 3529.8 | 3569.8 |

TABLE 39-continued

| UE UL carriers | fx_low | fx_high | fy_low | fy_high |
|---|---|---|---|---|
| 3rd harmonics frequency limits | 3*fx_low | 3*fx_high | 3* fy_low | 3* fy_high |
| 3rd harmonics frequency limits (MHz) | 4343.7 | 4388.7 | 5294.7 | 5354.7 |
| Two tone 2nd order IMD products IMD frequency limits (MHz) | \|fy_low − fx_high\|<br>302 | \|fy_high − fx_low\|<br>337 | \|fy_low + fx_low\|<br>3212.8 | \|fy_high + fx_high\|<br>3247.8 |
| Two-tone 3rd order IMD products IMD frequency limits (MHz) | \|2*fx_low − fy_high\|<br>1110.9 | \|2*fx_high − fy_low\|<br>1160.9 | \|2*fy_low − fx_high\|<br>2066.9 | \|2*fy_high − fx_low\|<br>2121.9 |
| Two-tone 3rd order IMD products IMD frequency limits (MHz) | \|2*fx_low + fy_low\|<br>4660.7 | \|2*fx_high + fy_high\|<br>4710.7 | \|2*fy_low + fx_low\|<br>4977.7 | \|2*fy_high + fx_high\|<br>5032.7 |
| Two-tone 4th order IMD products IMD frequency limits (MHz) | \|3*fx_low − fy_high\|<br>2558.8 | \|3*fx_high − fy_low\|<br>2623.8 | \|3*fy_low − fx_high\|<br>3831.8 | \|3*fy_high − fx_low\|<br>3906.8 |
| Two-tone 4th order IMD products IMD frequency limits (MHz) | \|3*fx_low + fy_low\|<br>6108.6 | \|3*fx_high + fy_high\|<br>6173.6 | \|3*fy_low + fx_low\|<br>6742.6 | \|3*fy_high + fx_high\|<br>6817.6 |
| Two-tone 4th order IMD products IMD frequency limits (MHz) | \|2*fx_low − 2*fy_high\|<br>674 | \|2*fx_high − 2*fy_low\|<br>604 | \|2*fx_low + 2*fy_low\|<br>6425.6 | \|2*fx_high + 2*fy_high\|<br>6495.6 |
| Two-tone 5th order IMD products IMD frequency limits (MHz) | \|fx_low − 4*fy_high\|<br>5691.7 | \|fx_high − 4*fy_low\|<br>5596.7 | \|fy_low − 4*fx_high\|<br>4086.7 | \|fy_high − 4*fx_low\|<br>4006.7 |
| Two-tone 5th order IMD products IMD frequency limits (MHz) | \|fx_low + 4*fy_low\|<br>8507.5 | \|fx_high + 4*fy_high\|<br>8602.5 | \|fy_low + 4*fx_low\|<br>7556.5 | \|fy_high + 4*fx_high\|<br>7636.5 |
| Two-tone 5th order IMD products IMD frequency limits (MHz) | \|2*fx_low − 3*fy_high\|<br>2458.9 | \|2*fx_high − 3*fy_low\|<br>2368.9 | \|2*fy_low − 3*fx_high\|<br>858.9 | \|2*fy_high − 3*fx_low\|<br>773.9 |
| Two-tone 5th order IMD products IMD frequency limits (MHz) | \|2*fx_low + 3*fy_low\|<br>8190.5 | \|2*fx_high + 3*fy_high\|<br>8280.5 | \|2*fy_low + 3*fx_low\|<br>7873.5 | \|2*fy_high + 3*fx_high\|<br>7958.5 |

The $5^{th}$ IMD fall into the $3^{rd}$ own Rx frequency of Band 19. However, RAN4 can consider specific holding frequency bands when study the IMD analysis for the related CA band combinations including Band 19 and Band 21. Then, there is no IMD problems to the $3^{rd}$ own Rx frequency of Band 19.

I-10-3. Co-Existence Studies for LTE-A UL CA_19A-21A and DL CA_3A-19A-21A

For 2UL/3DL own receiver desensitization study $2^{nd}$ and $3^{rd}$ order harmonics and $2^{nd}$, $3^{rd}$, $4^{th}$ and $5^{th}$ order intermodulation products were calculated and presented in below table.

Below table shows harmonic and IMD analysis.

TABLE 40

| UE UL carriers | fx_low | fx_high | fy_low | fy_high |
|---|---|---|---|---|
| UL frequency (MHz) | 830 | 845 | 1447.9 | 1462.9 |
| $2^{nd}$ harmonics frequency limits | 2*fx_low | 2*fx_high | 2* fy_low | 2* fy_high |
| $2^{nd}$ harmonics frequency limits (MHz) | 1660 | 1690 | 2895.8 | 2925.8 |
| $3^{rd}$ harmonics frequency limits | 3*fx_low | 3*fx_high | 3* fy_low | 3* fy_high |
| $3^{rd}$ harmonics frequency limits (MHz) | 2490 | 2535 | 4343.7 | 4388.7 |
| Two tone $2^{nd}$ order IMD products | \|fy_low − fx_high\| | \|fy_high − fx_low\| | \|fy_low + fx_low\| | \|fy_high + fx_high\| |

TABLE 40-continued

| UE UL carriers | fx_low | fx_high | fy_low | fy_high |
|---|---|---|---|---|
| IMD frequency limits (MHz) | 602.9 | 632.9 | 2277.9 | 2307.9 |
| Two-tone 3$^{rd}$ order IMD products | \|2*fx_low − fy_high\| | \|2*fx_high − fy_low\| | \|2*fy_low − fx_high\| | \|2*fy_high − fx_low\| |
| IMD frequency limits (MHz) | 197.1 | 242.1 | 2050.8 | 2095.8 |
| Two-tone 3$^{rd}$ order IMD products | \|2*fx_low + fy_low\| | \|2*fx_high + fy_high\| | \|2*fy_low + fx_low\| | \|2*fy_high + fx_high\| |
| IMD frequency limits (MHz) | 3107.9 | 3152.9 | 3725.8 | 3770.8 |
| Two-tone 4$^{th}$ order IMD products | \|3*fx_low − fy_high\| | \|3*fx_high − fy_low\| | \|3*fy_low − fx_high\| | \|3*fy_high − fx_low\| |
| IMD frequency limits (MHz) | 1027.1 | 1087.1 | 3498.7 | 3558.7 |
| Two-tone 4$^{th}$ order IMD products | \|3*fx_low + fy_low\| | \|3*fx_high + fy_high\| | \|3*fy_low + fx_low\| | \|3*fy_high + fx_high\| |
| IMD frequency limits (MHz) | 3937.9 | 3997.9 | 5173.7 | 5233.7 |
| Two-tone 4$^{th}$ order IMD products | \|2*fx_low − 2*fy_high\| | \|2*fx_high − 2*fy_low\| | \|2*fx_low + 2*fy_low\| | \|2*fx_high + 2*fy_high\| |
| IMD frequency limits (MHz) | 1265.8 | 1205.8 | 4555.8 | 4615.8 |
| Two-tone 5$^{th}$ order IMD products | \|fx_low − 4*fy_high\| | \|fx_high − 4*fy_low\| | \|fy_low − 4*fx_high\| | \|fy_high − 4*fx_low\| |
| IMD frequency limits (MHz) | 5021.6 | 4946.6 | 1932.1 | 1857.1 |
| Two-tone 5$^{th}$ order IMD products | \|fx_low + 4*fy_low\| | \|fx_high + 4*fy_high\| | \|fy_low + 4*fx_low\| | \|fy_high + 4*fx_high\| |
| IMD frequency limits (MHz) | 6621.6 | 6696.6 | 4767.9 | 4842.9 |
| Two-tone 5$^{th}$ order IMD products | \|2*fx_low − 3*fy_high\| | \|2*fx_high − 3*fy_low\| | \|2*fy_low − 3*fx_high\| | \|2*fy_high − 3*fx_low\| |
| IMD frequency limits (MHz) | 2728.7 | 2653.7 | 360.8 | 435.8 |
| Two-tone 5$^{th}$ order IMD products | \|2*fx_low + 3*fy_low\| | \|2*fx_high + 3*fy_high\| | \|2*fy_low + 3*fx_low\| | \|2*fy_high + 3*fx_high\| |
| IMD frequency limits (MHz) | 6003.7 | 6078.7 | 5385.8 | 5460.8 |

The 5$^{th}$ IMD fall into the 3$^{rd}$ own Rx frequency of Band 3. This issue have same impact when RAN4 consider specific holding frequency bands when study the IMD analysis for the related CA band combinations including Band 19 and Band 21. It will be analysed to solve the self-interference problem.

I-10-4. MSD

When uplink CA configurations CA_3A-19A is paired with downlink CA configuration CA_3A-19A-21A there is no interference components from 2 uplink operation which would interfere the downlink of the Band 21.

When uplink CA configurations CA_3A-21A is paired with downlink CA configuration CA_3A-19A-21A there is no interference components from 2 uplink operation which would interfere the downlink of the Band 19.

When uplink CA configurations CA_19A-21A is paired with downlink CA configuration CA_3A-19A-21A there is interference components from 2 uplink operation which would interfere the downlink of the Band 3.

I-11. LTE Advanced Carrier Aggregation: Band 3 and Band 19 and Band 42 with 2 ULs

TABLE 41

| E-UTRA CA Configuration | Uplink CA configurations | E-UTRA Bands | 1.4 MHz | 3 MHz | 5 MHz | 10 MHz | 15 MHz | 20 MHz | Maximum aggregated bandwidth [MHz] | Bandwidth combination set |
|---|---|---|---|---|---|---|---|---|---|---|
| CA_3A-19A-42A | CA_3A-19A or CA_3A-42A or CA_19A-42A | 3 19 42 | | | Yes Yes Yes | Yes Yes Yes | Yes Yes Yes | Yes Yes | 55 | 0 |

I-11-1. Co-existence studies for LTE-A UL CA_3A-19A and DL CA_3A-19A-42A

For 2UL/3DL own receiver desensitization study $2^{nd}$ and $3^{rd}$ order harmonics and $2^{nd}$, $3^{rd}$, $4^{th}$ and $5^{th}$ order intermodulation products were calculated and presented in below table.

Below table shows harmonic and IMD analysis.

TABLE 42

| UE UL carriers | fx_low | fx_high | fy_low | fy_high |
|---|---|---|---|---|
| UL frequency (MHz) | 830 | 845 | 1764.9 | 1784.9 |
| 2nd harmonics frequency limits | 2*fx_low | 2*fx_high | 2* fy_low | 2* fy_high |
| 2nd harmonics frequency limits (MHz) | 1660 | 1690 | 3529.8 | 3569.8 |
| 3rd harmonics frequency limits | 3*fx_low | 3*fx_high | 3* fy_low | 3* fy_high |
| 3rd harmonics frequency limits (MHz) | 2490 | 2535 | 5294.7 | 5354.7 |
| Two tone 2nd order IMD products IMD frequency limits (MHz) | \|fy_low − fx_high\|<br>919.9 | \|fy_high − fx_low\|<br>954.9 | \|fy_low + fx_low\|<br>2594.9 | \|fy_high + fx_high\|<br>2629.9 |
| Two-tone 3rd order IMD products IMD frequency limits (MHz) | \|2*fx_low − fy_high\|<br>124.9 | \|2*fx_high − fy_low\|<br>74.9 | \|2*fy_low − fx_high\|<br>2684.8 | \|2*fy_high − fx_low\|<br>2739.8 |
| Two-tone 3rd order IMD products IMD frequency limits (MHz) | \|2*fx_low + fy_low\|<br>3424.9 | \|2*fx_high + fy_high\|<br>3474.9 | \|2*fy_low + fx_low\|<br>4359.8 | \|2*fy_high + fx_high\|<br>4414.8 |
| Two-tone 4th order IMD products IMD frequency limits (MHz) | \|3*fx_low − fy_high\|<br>705.1 | \|3*fx_high − fy_low\|<br>770.1 | \|3*fy_low − fx_high\|<br>4449.7 | \|3*fy_high − fx_low\|<br>4524.7 |
| Two-tone 4th order IMD products IMD frequency limits (MHz) | \|3*fx_low + fy_low\|<br>4254.9 | \|3*fx_high + fy_high\|<br>4319.9 | \|3*fy_low + fx_low\|<br>6124.7 | \|3*fy_high + fx_high\|<br>6199.7 |
| Two-tone 4th order IMD products IMD frequency limits (MHz) | \|2*fx_low − 2*fy_high\|<br>1909.8 | \|2*fx_high − 2*fy_low\|<br>1839.8 | \|2*fx_low + 2*fy_low\|<br>5189.8 | \|2*fx_high + 2*fy_high\|<br>5259.8 |
| Two-tone 5th order IMD products IMD frequency limits (MHz) | \|fx_low − 4*fy_high\|<br>6309.6 | \|fx_high − 4*fy_low\|<br>6214.6 | \|fy_low − 4*fx_high\|<br>1615.1 | \|fy_high − 4*fx_low\|<br>1535.1 |
| Two-tone 5th order IMD products IMD frequency limits (MHz) | \|fx_low + 4*fy_low\|<br>7889.6 | \|fx_high + 4*fy_high\|<br>7984.6 | \|fy_low + 4*fx_low\|<br>5084.9 | \|fy_high + 4*fx_high\|<br>5164.9 |
| Two-tone 5th order IMD products IMD frequency limits (MHz) | \|2*fx_low − 3*fy_high\|<br>3694.7 | \|2*fx_high − 3*fy_low\|<br>3604.7 | \|2*fy_low − 3*fx_high\|<br>994.8 | \|2*fy_high − 3*fx_low\|<br>1079.8 |
| Two-tone 5th order IMD products IMD frequency limits (MHz) | \|2*fx_low + 3*fy_low\|<br>6954.7 | \|2*fx_high + 3*fy_high\|<br>7044.7 | \|2*fy_low + 3*fx_low\|<br>6019.8 | \|2*fy_high + 3*fx_high\|<br>6104.8 |

The $2^{nd}$ & $5^{th}$ IMDs fall into the own Rx frequency of Band 19. Also the $4^{th}$ IMD fall into the own Rx frequency of Band 3. But theses impacts already has covered in 2DL/2UL CA 3A-19A.

The $2^{nd}$ harmonics from Band 3 transmission will be interference to the Band 42. But this harmonics issue already has covered in 2DL/1UL CA_3A-42A.

The $3^{rd}$ & $5^{th}$ IMDs fall into the $3^{rd}$ own Rx frequency of Band 42. However, RAN4 consider specific holding frequency bands when study the IMD analysis for the related CA band combinations including Band 19 and Band 21.

Then, there was no harmonics/IMDs problem to the $3^{rd}$ own Rx frequency of Band 42.

I-11-2. Co-Existence Studies for LTE-A UL CA_3A-42A and DL CA_3A-19A-42A

For 2UL/3DL own receiver desensitization study $2^{nd}$ and $3^{rd}$ order harmonics and $2^{nd}$, $3^{rd}$, $4^{th}$ and $5^{th}$ order intermodulation products were calculated and presented in below table.

Below table shows harmonic and IMD analysis.

TABLE 43

| UE UL carriers | fx_low | fx_high | fy_low | fy_high |
|---|---|---|---|---|
| UL frequency (MHz) | 1764.9 | 1784.9 | 3480 | 3520 |
| 2nd harmonics frequency limits | 2*fx_low | 2*fx_high | 2* fy_low | 2* fy_high |
| 2nd harmonics frequency limits (MHz) | 3529.8 | 3569.8 | 6960 | 7040 |
| 3rd harmonics frequency limits | 3*fx_low | 3*fx_high | 3* fy_low | 3* fy_high |
| 3rd harmonics frequency limits (MHz) | 5294.7 | 5354.7 | 10440 | 10560 |
| Two tone 2nd order IMD products IMD frequency limits (MHz) | \|fy_low − fx_high\| 1695.1 | \|fy_high − fx_low\| 1755.1 | \|fy_low + fx_low\| 5244.9 | \|fy_high + fx_high\| 5304.9 |
| Two-tone 3rd order IMD products IMD frequency limits (MHz) | \|2*fx_low − fy_high\| 9.8 | \|2*fx_high − fy_low\| 89.8 | \|2*fy_low − fx_high\| 5175.1 | \|2*fy_high − fx_low\| 5275.1 |
| Two-tone 3rd order IMD products IMD frequency limits (MHz) | \|2*fx_low + fy_low\| 7009.8 | \|2*fx_high + fy_high\| 7089.8 | \|2*fy_low + fx_low\| 8724.9 | \|2*fy_high + fx_high\| 8824.9 |
| Two-tone 4th order IMD products IMD frequency limits (MHz) | \|3*fx_low − fy_high\| 1774.7 | \|3*fx_high − fy_low\| 1874.7 | \|3*fy_low − fx_high\| 8655.1 | \|3*fy_high − fx_low\| 8795.1 |
| Two-tone 4th order IMD products IMD frequency limits (MHz) | \|3*fx_low + fy_low\| 8774.7 | \|3*fx_high + fy_high\| 8874.7 | \|3*fy_low + fx_low\| 12204.9 | \|3*fy_high + fx_high\| 12344.9 |
| Two-tone 4th order IMD products IMD frequency limits (MHz) | \|2*fx_low − 2*fy_high\| 3510.2 | \|2*fx_high − 2*fy_low\| 3390.2 | \|2*fx_low + 2*fy_low\| 10489.8 | \|2*fx_high + 2*fy_high\| 10609.8 |
| Two-tone 5th order IMD products IMD frequency limits (MHz) | \|fx_low − 4*fy_high\| 12315.1 | \|fx_high − 4*fy_low\| 12135.1 | \|fy_low − 4*fx_high\| 3659.6 | \|fy_high − 4*fx_low\| 3539.6 |
| Two-tone 5th order IMD products IMD frequency limits (MHz) | \|fx_low + 4*fy_low\| 15684.9 | \|fx_high + 4*fy_high\| 15864.9 | \|fy_low + 4*fx_low\| 10539.6 | \|fy_high + 4*fx_high\| 10659.6 |
| Two-tone 5th order IMD products IMD frequency limits (MHz) | \|2*fx_low − 3*fy_high\| 7030.2 | \|2*fx_high − 3*fy_low\| 6870.2 | \|2*fy_low − 3*fx_high\| 1605.3 | \|2*fy_high − 3*fx_low\| 1745.3 |
| Two-tone 5th order IMD products IMD frequency limits (MHz) | \|2*fx_low + 3*fy_low\| 13969.8 | \|2*fx_high + 3*fy_high\| 14129.8 | \|2*fy_low + 3*fx_low\| 12254.7 | \|2*fy_high + 3*fx_high\| 12394.7 |

The $2^{nd}$, $4^{th}$ & $5^{th}$ IMDs fall into the own Rx frequency of Band 3. Also the 2nd harmonics from Band 3, $4^{th}$ & $5^{th}$ IMDs fall into the own Rx frequency of Band 42. But these impact already has covered in 2DL/2UL CA_3A-42A.

Hence, there was no harmonics/IMDs impact to the $3^{rd}$ own Rx frequency of Band 19.

I-11-3. Co-Existence Studies for LTE-A UL CA_19A-42A and DL CA_3A-19A-42A

For 2UL/3DL own receiver desensitization study $2^{nd}$ and $3^{rd}$ order harmonics and $2^{nd}$, $3^{rd}$, $4^{th}$ and $5^{th}$ order intermodulation products were calculated and presented in below table.

Below table shows harmonic and IMD analysis.

TABLE 44

| UE UL carriers | fx_low | fx_high | fy_low | fy_high |
|---|---|---|---|---|
| UL frequency (MHz) | 830 | 845 | 3480 | 3520 |
| 2nd harmonics frequency limits | 2*fx_low | 2*fx_high | 2* fy_low | 2* fy_high |
| 2nd harmonics frequency limits (MHz) | 1660 | 1690 | 6960 | 7040 |

TABLE 44-continued

| UE UL carriers | fx_low | fx_high | fy_low | fy_high |
| --- | --- | --- | --- | --- |
| 3rd harmonics frequency limits | 3*fx_low | 3*fx_high | 3*fy_low | 3*fy_high |
| 3rd harmonics frequency limits (MHz) | 2490 | 2535 | 10440 | 10560 |
| Two tone 2nd order IMD products | \|fy_low − fx_high\| | \|fy_high − fx_low\| | \|fy_low + fx_low\| | \|fy_high + fx_high\| |
| IMD frequency limits (MHz) | 2635 | 2690 | 4310 | 4365 |
| Two-tone 3rd order IMD products | \|2*fx_low − fy_high\| | \|2*fx_high − fy_low\| | \|2*fy_low − fx_high\| | \|2*fy_high − fx_low\| |
| IMD frequency limits (MHz) | 1860 | 1790 | 6115 | 6210 |
| Two-tone 3rd order IMD products | \|2*fx_low + fy_low\| | \|2*fx_high + fy_high\| | \|2*fy_low + fx_low\| | \|2*fy_high + fx_high\| |
| IMD frequency limits (MHz) | 5140 | 5210 | 7790 | 7885 |
| Two-tone 4th order IMD products | \|3*fx_low − fy_high\| | \|3*fx_high − fy_low\| | \|3*fy_low − fx_high\| | \|3*fy_high − fx_low\| |
| IMD frequency limits (MHz) | 1030 | 945 | 9595 | 9730 |
| Two-tone 4th order IMD products | \|3*fx_low + fy_low\| | \|3*fx_high + fy_high\| | \|3*fy_low + fx_low\| | \|3*fy_high + fx_high\| |
| IMD frequency limits (MHz) | 5970 | 6055 | 11270 | 11405 |
| Two-tone 4th order IMD products | \|2*fx_low − 2*fy_high\| | \|2*fx_high − 2*fy_low\| | \|2*fx_low + 2*fy_low\| | \|2*fx_high + 2*fy_high\| |
| IMD frequency limits (MHz) | 5380 | 5270 | 8620 | 8730 |
| Two-tone 5th order IMD products | \|fx_low − 4*fy_high\| | \|fx_high − 4*fy_low\| | \|fy_low − 4*fx_high\| | \|fy_high − 4*fx_low\| |
| IMD frequency limits (MHz) | 13250 | 13075 | 100 | 200 |
| Two-tone 5th order IMD products | \|fx_low + 4*fy_low\| | \|fx_high + 4*fy_high\| | \|fy_low + 4*fx_low\| | \|fy_high + 4*fx_high\| |
| IMD frequency limits (MHz) | 14750 | 14925 | 6800 | 6900 |
| Two-tone 5th order IMD products | \|2*fx_low − 3*fy_high\| | \|2*fx_high − 3*fy_low\| | \|2*fy_low − 3*fx_high\| | \|2*fy_high − 3*fx_low\| |
| IMD frequency limits (MHz) | 8900 | 8750 | 4425 | 4550 |
| Two-tone 5th order IMD products | \|2*fx_low + 3*fy_low\| | \|2*fx_high + 3*fy_high\| | \|2*fy_low + 3*fx_low\| | \|2*fy_high + 3*fx_high\| |
| IMD frequency limits (MHz) | 12100 | 12250 | 9450 | 9575 |

The $4^{th}$ IMD fall into the own Rx frequency of Band 19. But this impact already has covered in 2DL/2UL CA_19A-42A.

The $3^{rd}$ IMD fall into the $3^{rd}$ own Rx frequency of Band 3. The overlap range is 0.1 MHz that is no critical impact to the sensitivity of Band 3 when RAN4 consider operator specific frequency ranges.

I-11-4. MSD

When uplink CA configurations CA_3A-19A is paired with downlink CA configuration CA_3A-19A-42A there is no interference components from 2 uplink operation which would interfere the downlink of the Band 42.

When uplink CA configurations CA_3A-42A is paired with downlink CA configuration CA_3A-19A-42A there is no interference components from 2 uplink operation which would interfere the downlink of the Band 19.

When uplink CA configurations CA_19A-42A is paired with downlink CA configuration CA_3A-19A-42A there is no interference components from 2 uplink operation which would interfere the downlink of the Band 3.

I-12. LTE Advanced Carrier Aggregation: Band 3 and Band 21 and Band 42 with 2 ULs

TABLE 45

| E-UTRA CA Configuration | Uplink CA configurations | E-UTRA Bands | 1.4 MHz | 3 MHz | 5 MHz | 10 MHz | 15 MHz | 20 MHz | Maximum aggregated bandwidth [MHz] | Bandwidth combination set |
|---|---|---|---|---|---|---|---|---|---|---|
| CA_3A-21A-42A | CA_3A-21A or CA_3A-42A or CA_21A-42A | 3 21 42 | | | Yes Yes Yes | Yes Yes Yes | Yes Yes Yes | Yes Yes | 55 | 0 |

I-12-1. Co-Existence Studies for LTE-A UL CA_3A-21A and DL CA_3A-21A-42A

For 2UL/3DL own receiver desensitization study $2^{nd}$ and $3^{rd}$ order harmonics and $2^{nd}$, $3^{rd}$, $4^{th}$ and $5^{th}$ order intermodulation products were calculated and presented in below table. Below table shows harmonic and IMD analysis.

TABLE 46

| UE UL carriers | fx_low | fx_high | fy_low | fy_high |
|---|---|---|---|---|
| UL frequency (MHz) | 1447.9 | 1462.9 | 1764.9 | 1784.9 |
| 2nd harmonics frequency limits | 2*fx_low | 2*fx_high | 2* fy_low | 2* fy_high |
| 2nd harmonics frequency limits (MHz) | 2895.8 | 2925.8 | 3529.8 | 3569.8 |
| 3rd harmonics frequency limits | 3*fx_low | 3*fx_high | 3* fy_low | 3* fy_high |
| 3rd harmonics frequency limits (MHz) | 4343.7 | 4388.7 | 5294.7 | 5354.7 |
| Two tone 2nd order IMD products IMD frequency limits (MHz) | \|fy_low − fx_high\| 302 | \|fy_high − fx_low\| 337 | \|fy_low + fx_low\| 3212.8 | \|fy_high + fx_high\| 3247.8 |
| Two-tone 3rd order IMD products IMD frequency limits (MHz) | \|2*fx_low − fy_high\| 1110.9 | \|2*fx_high − fy_low\| 1160.9 | \|2*fy_low − fx_high\| 2066.9 | \|2*fy_high − fx_low\| 2121.9 |
| Two-tone 3rd order IMD products IMD frequency limits (MHz) | \|2*fx_low + fy_low\| 4660.7 | \|2*fx_high + fy_high\| 4710.7 | \|2*fy_low + fx_low\| 4977.7 | \|2*fy_high + fx_high\| 5032.7 |
| Two-tone 4th order IMD products IMD frequency limits (MHz) | \|3*fx_low − fy_high\| 2558.8 | \|3*fx_high − fy_low\| 2623.8 | \|3*fy_low − fx_high\| 3831.8 | \|3*fy_high − fx_low\| 3906.8 |
| Two-tone 4th order IMD products IMD frequency limits (MHz) | \|3*fx_low + fy_low\| 6108.6 | \|3*fx_high + fy_high\| 6173.6 | \|3*fy_low + fx_low\| 6742.6 | \|3*fy_high + fx_high\| 6817.6 |
| Two-tone 4th order IMD products IMD frequency limits (MHz) | \|2*fx_low − 2*fy_high\| 674 | \|2*fx_high − 2*fy_low\| 604 | \|2*fx_low + 2*fy_low\| 6425.6 | \|2*fx_high + 2*fy_high\| 6495.6 |

TABLE 46-continued

| UE UL carriers | fx_low | fx_high | fy_low | fy_high |
|---|---|---|---|---|
| Two-tone 5th order IMD products IMD frequency limits (MHz) | \|fx_low − 4*fy_high\| 5691.7 | \|fx_high − 4*fy_low\| 5596.7 | \|fy_low − 4*fx_high\| 4086.7 | \|fy_high − 4*fx_low\| 4006.7 |
| Two-tone 5th order IMD products IMD frequency limits (MHz) | \|fx_low + 4*fy_low\| 8507.5 | \|fx_high + 4*fy_high\| 8602.5 | \|fy_low + 4*fx_low\| 7556.5 | \|fy_high + 4*fx_high\| 7636.5 |
| Two-tone 5th order IMD products IMD frequency limits (MHz) | \|2*fx_low − 3*fy_high\| 2458.9 | \|2*fx_high − 3*fy_low\| 2368.9 | \|2*fy_low − 3*fx_high\| 858.9 | \|2*fy_high − 3*fx_low\| 773.9 |
| Two-tone 5th order IMD products IMD frequency limits (MHz) | \|2*fx_low + 3*fy_low\| 8190.5 | \|2*fx_high + 3*fy_high\| 8280.5 | \|2*fy_low + 3*fx_low\| 7873.5 | \|2*fy_high + 3*fx_high\| 7958.5 |

The $2^{nd}$ harmonics from Band 3 transmission will be interference to the Band 42. But this harmonics issue already has covered in 2DL/1UL CA_3A-42A.

Hence, there was no harmonics/IMDs impact to the $3^{rd}$ own Rx frequency of Band 42.

I-12-2. Co-Existence Studies for LTE-A UL CA_3A-42A and DL CA_3A-21A-42A

For 2UL/3DL own receiver desensitization study $2^{nd}$ and $3^{rd}$ order harmonics and $2^{nd}$, $3^{rd}$, $4^{th}$ and $5^{th}$ order intermodulation products were calculated and presented in below table.

Below table shows harmonic and IMD analysis

TABLE 47

| UE UL carriers | fx_low | fx_high | fy_low | fy_high |
|---|---|---|---|---|
| UL frequency (MHz) | 1764.9 | 1784.9 | 3480 | 3520 |
| 2nd harmonics frequency limits | 2*fx_low | 2*fx_high | 2* fy_low | 2* fy_high |
| 2nd harmonics frequency limits (MHz) | 3529.8 | 3569.8 | 6960 | 7040 |
| 3rd harmonics frequency limits | 3*fx_low | 3*fx_high | 3* fy_low | 3* fy_high |
| 3rd harmonics frequency limits (MHz) | 5294.7 | 5354.7 | 10440 | 10560 |
| Two tone 2nd order IMD products IMD frequency limits (MHz) | \|fy_low − fx_high\| 1695.1 | \|fy_high − fx_low\| 1755.1 | \|fy_low + fx_low\| 5244.9 | \|fy_high + fx_high\| 5304.9 |
| Two-tone 3rd order IMD products IMD frequency limits (MHz) | \|2*fx_low − fy_high\| 9.8 | \|2*fx_high − fy_low\| 89.8 | \|2*fy_low − fx_high\| 5175.1 | \|2*fy_high − fx_low\| 5275.1 |
| Two-tone 3rd order IMD products IMD frequency limits (MHz) | \|2*fx_low + fy_low\| 7009.8 | \|2*fx_high + fy_high\| 7089.8 | \|2*fy_low + fx_low\| 8724.9 | \|2*fy_high + fx_high\| 8824.9 |
| Two-tone 4th order IMD products IMD frequency limits (MHz) | \|3*fx_low − fy_high\| 1774.7 | \|3*fx_high − fy_low\| 1874.7 | \|3*fy_low − fx_high\| 8655.1 | \|3*fy_high − fx_low\| 8795.1 |
| Two-tone 4th order IMD products IMD frequency limits (MHz) | \|3*fx_low + fy_low\| 8774.7 | \|3*fx_high + fy_high\| 8874.7 | \|3*fy_low + fx_low\| 12204.9 | \|3*fy_high + fx_high\| 12344.9 |
| Two-tone 4th order IMD products IMD frequency limits (MHz) | \|2*fx_low − 2*fy_high\| 3510.2 | \|2*fx_high − 2*fy_low\| 3390.2 | \|2*fx_low + 2*fy_low\| 10489.8 | \|2*fx_high + 2*fy_high\| 10609.8 |

TABLE 47-continued

| UE UL carriers | fx_low | fx_high | fy_low | fy_high |
|---|---|---|---|---|
| Two-tone 5th order IMD products IMD frequency limits (MHz) | \|fx_low − 4*fy_high\| 12315.1 | \|fx_high − 4*fy_low\| 12135.1 | \|fy_low − 4*fx_high\| 3659.6 | \|fy_high − 4*fx_low\| 3539.6 |
| Two-tone 5th order IMD products IMD frequency limits (MHz) | \|fx_low + 4*fy_low\| 15684.9 | \|fx_high + 4*fy_high\| 15864.9 | \|fy_low + 4*fx_low\| 10539.6 | \|fy_high + 4*fx_high\| 10659.6 |
| Two-tone 5th order IMD products IMD frequency limits (MHz) | \|2*fx_low − 3*fy_high\| 7030.2 | \|2*fx_high − 3*fy_low\| 6870.2 | \|2*fy_low − 3*fx_high\| 1605.3 | \|2*fy_high − 3*fx_low\| 1745.3 |
| Two-tone 5th order IMD products IMD frequency limits (MHz) | \|2*fx_low + 3*fy_low\| 13969.8 | \|2*fx_high + 3*fy_high\| 14129.8 | \|2*fy_low + 3*fx_low\| 12254.7 | \|2*fy_high + 3*fx_high\| 12394.7 |

The $2^{nd}$ & $5^{th}$ IMDs fall into the own Rx frequency of Band 3. Also the 2nd harmonics from Band 3, $4^{th}$ & $5^{th}$ IMDs fall into the own Rx frequency of Band 42. But these impact already has covered in 2DL/2UL CA_3A-42A.

The $5^{th}$ IMD fall into the $3^{rd}$ own Rx frequency of Band 21. However, RAN4 consider specific holding frequency bands when study the IMD analysis for the related CA band combinations including Band 21.

Then, there was no harmonics/IMDs problem to the $3^{rd}$ own Rx frequency of Band 21.

I-12-3. Co-Existence Studies for LTE-A UL CA_21A-42A and DL CA_3A-21A-42A

For 2UL/3DL own receiver desensitization study $2^{nd}$ and $3^{rd}$ order harmonics and $2^{nd}$, $3^{rd}$, $4^{th}$ and $5^{th}$ order inter-modulation products were calculated and presented in below table.

Below table shows harmonic and IMD analysis.

TABLE 48

| UE UL carriers | fx_low | fx_high | fy_low | fy_high |
|---|---|---|---|---|
| UL frequency (MHz) | 1447.9 | 1462.9 | 3480 | 3520 |
| 2nd harmonics frequency limits | 2*fx_low | 2*fx_high | 2* fy_low | 2* fy_high |
| 2nd harmonics frequency limits (MHz) | 2895.8 | 2925.8 | 6960 | 7040 |
| 3rd harmonics frequency limits | 3*fx_low | 3*fx_high | 3* fy_low | 3* fy_high |
| 3rd harmonics frequency limits (MHz) | 4343.7 | 4388.7 | 10440 | 10560 |
| Two tone 2nd order IMD products IMD frequency limits (MHz) | \|fy_low − fx_high\| 2017.1 | \|fy_high − fx_low\| 2072.1 | \|fy_low + fx_low\| 4927.9 | \|fy_high + fx_high\| 4982.9 |
| Two-tone 3rd order IMD products IMD frequency limits (MHz) | \|2*fx_low − fy_high\| 624.2 | \|2*fx_high − fy_low\| 554.2 | \|2*fy_low − fx_high\| 5497.1 | \|2*fy_high − fx_low\| 5592.1 |
| Two-tone 3rd order IMD products IMD frequency limits (MHz) | \|2*fx_low + fy_low\| 6375.8 | \|2*fx_high + fy_high\| 6445.8 | \|2*fy_low + fx_low\| 8407.9 | \|2*fy_high + fx_high\| 8502.9 |
| Two-tone 4th order IMD products IMD frequency limits (MHz) | \|3*fx_low − fy_high\| 823.7 | \|3*fx_high − fy_low\| 908.7 | \|3*fy_low − fx_high\| 8977.1 | \|3*fy_high − fx_low\| 9112.1 |
| Two-tone 4th order IMD products IMD frequency limits (MHz) | \|3*fx_low + fy_low\| 7823.7 | \|3*fx_high + fy_high\| 7908.7 | \|3*fy_low + fx_low\| 11887.9 | \|3*fy_high + fx_high\| 12022.9 |
| Two-tone 4th order IMD products IMD frequency limits (MHz) | \|2*fx_low − 2*fy_high\| 4144.2 | \|2*fx_high − 2*fy_low\| 4034.2 | \|2*fx_low + 2*fy_low\| 9855.8 | \|2*fx_high + 2*fy_high\| 9965.8 |
| Two-tone 5th order IMD products IMD frequency limits (MHz) | \|fx_low − 4*fy_high\| 12632.1 | \|fx_high − 4*fy_low\| 12457.1 | \|fy_low − 4*fx_high\| 2371.6 | \|fy_high − 4*fx_low\| 2271.6 |
| Two-tone 5th order IMD products | \|fx_low + 4*fy_low\| | \|fx_high + 4*fy_high\| | \|fy_low + 4*fx_low\| | \|fy_high + 4*fx_high\| |

TABLE 48-continued

| UE UL carriers | fx_low | fx_high | fy_low | fy_high |
|---|---|---|---|---|
| IMD frequency limits (MHz) | 15367.9 | 15542.9 | 9271.6 | 9371.6 |
| Two-tone 5th order IMD products | \|2*fx_low − 3*fy_high\| | \|2*fx_high − 3*fy_low\| | \|2*fy_low − 3*fx_high\| | \|2*fy_high − 3*fx_low\| |
| IMD frequency limits (MHz) | 7664.2 | 7514.2 | 2571.3 | 2696.3 |
| Two-tone 5th order IMD products | \|2*fx_low + 3*fy_low\| | \|2*fx_high + 3*fy_high\| | \|2*fy_low + 3*fx_low\| | \|2*fy_high + 3*fx_high\| |
| IMD frequency limits (MHz) | 13335.8 | 13485.8 | 11303.7 | 11428.7 |

There was no harmonics/IMDs impact to the $3^{rd}$ own Rx frequency of Band 3.

I-12-4. MSD

When uplink CA configurations CA_3A-21A is paired with downlink CA configuration CA_3A-21A-42A there is no interference components from 2 uplink operation which would interfere the downlink of the Band 42.

When uplink CA configurations CA_3A-42A is paired with downlink CA configuration CA_3A-21A-42A there is no interference components from 2 uplink operation which would interfere the downlink of the Band 21.

When uplink CA configurations CA_21A-42A is paired with downlink CA configuration CA_3A-21A-42A there is no interference components from 2 uplink operation which would interfere the downlink of the Band 3.

I-13. LTE Advanced Carrier Aggregation: Band 19 and Band 21 and Band 42 with 2 ULs

TABLE 49

| E-UTRA CA Configuration | Uplink CA configurations | E-UTRA Bands | 1.4 MHz | 3 MHz | 5 MHz | 10 MHz | 15 MHz | 20 MHz | Maximum aggregated bandwidth [MHz] | Bandwidth combination set |
|---|---|---|---|---|---|---|---|---|---|---|
| CA_19A-21A-42A | CA_19A-21A or CA_19A-42A or CA_21A-42A | 19 21 42 | | | Yes Yes Yes | Yes Yes Yes | Yes Yes Yes | Yes | 50 | 0 |

I-13-1. Co-Existence Studies for LTE-A UL CA_19A-21A and DL CA_19A-21A-42A

For 2UL/3DL own receiver desensitization study $2^{nd}$ and $3^{rd}$ order harmonics and $2^{nd}$, $3^{rd}$, $4^{th}$ and $5^{th}$ order intermodulation products were calculated and presented in below table.

Below table shows harmonic and IMD analysis.

TABLE 50

| UE UL carriers | fx_low | fx_high | fy_low | fy_high |
|---|---|---|---|---|
| UL frequency (MHz) | 830 | 845 | 1447.9 | 1462.9 |
| 2nd harmonics frequency limits | 2 * fx_low | 2 * fx_high | 2 * fy_low | 2 * fy_high |
| 2nd harmonics frequency limits (MHz) | 1660 | 1690 | 2895.8 | 2925.8 |
| 3rd harmonics frequency limits | 3 * fx_low | 3 * fx_high | 3 * fy_low | 3 * fy_high |
| 3rd harmonics frequency limits (MHz) | 2490 | 2535 | 4343.7 | 4388.7 |
| Two tone 2nd order IMD products | \|fy_low − fx_high\| | \|fy_high − fx_low\| | \|fy_low + fx_low\| | \|fy_high + fx_high\| |
| IMD frequency limits (MHz) | 602.9 | 632.9 | 2277.9 | 2307.9 |
| Two-tone 3rd order IMD products | \|2 * fx_low − fy_high\| | \|2 * fx_high − fy_low\| | \|2 * fy_low − fx_high\| | \|2 * fy_high − fx_low\| |
| IMD frequency limits (MHz) | 197.1 | 242.1 | 2050.8 | 2095.8 |
| Two-tone 3rd order IMD products | \|2 * fx_low + fy_low\| | \|2 * fx_high + fy_high\| | \|2 * fy_low + fx_low\| | \|2 * fy_high + fx_high\| |
| IMD frequency limits (MHz) | 3107.9 | 3152.9 | 3725.8 | 3770.8 |

TABLE 50-continued

| UE UL carriers | fx_low | fx_high | fy_low | fy_high |
|---|---|---|---|---|
| Two-tone 4th order IMD products IMD frequency limits (MHz) | \|3 * fx_low − fy_high\| 1027.1 | \|3 * fx_high − fy_low\| 1087.1 | \|3 * fy_low − fx_high\| 3498.7 | \|3 * fy_high − fx_low\| 3558.7 |
| Two-tone 4th order IMD products IMD frequency limits (MHz) | \|3 * fx_low + fy_low\| 3937.9 | \|3 * fx_high + fy_high\| 3997.9 | \|3 * fy_low + fx_low\| 5173.7 | \|3 * fy_high + fx_high\| 5233.7 |
| Two-tone 4th order IMD products IMD frequency limits (MHz) | \|2 * fx_low − 2 * fy_high\| 1265.8 | \|2 * fx_high − 2 * fy_low\| 1205.8 | \|2 * fx_low + 2 * fy_low\| 4555.8 | \|2 * fx_high + 2 * fy_high\| 4615.8 |
| Two-tone 5th order IMD products IMD frequency limits (MHz) | \|fx_low − 4 * fy_high\| 5021.6 | \|fx_high − 4 * fy_low\| 4946.6 | \|fy_low − 4 * fx_high\| 1932.1 | \|fy_high − 4 * fx_low\| 1857.1 |
| Two-tone 5th order IMD products IMD frequency limits (MHz) | \|fx_low + 4 * fy_low\| 6621.6 | \|fx_high + 4 * fy_high\| 6696.6 | \|fy_low + 4 * fx_low\| 4767.9 | \|fy_high + 4 * fx_high\| 4842.9 |
| Two-tone 5th order IMD products IMD frequency limits (MHz) | \|2 * fx_low − 3 * fy_high\| 2728.7 | \|2 * fx_high − 3 * fy_low\| 2653.7 | \|2 * fy_low − 3 * fx_high\| 360.8 | \|2 * fy_high − 3 * fx_low\| 435.8 |
| Two-tone 5th order IMD products IMD frequency limits (MHz) | \|2 * fx_low + 3 * fy_low\| 6003.7 | \|2 * fx_high + 3 * fy_high\| 6078.7 | \|2 * fy_low + 3 * fx_low\| 5385.8 | \|2 * fy_high + 3 * fx_high\| 5460.8 |

The $4^{th}$ IMD fall into the $3^{rd}$ own Rx frequency of Band 42. It will be analysed to solve the self-interference problem.

I-13-2. Co-Existence Studies for LTE-A UL CA_19A-42A and DL CA_19A-21A-42A

For 2UL/3DL own receiver desensitization study $2^{nd}$ and $3^{rd}$ order harmonics and $2^{nd}$, $3^{rd}$, $4^{th}$ and $5^{th}$ order intermodulation products were calculated and presented in below table.

Below table shows harmonic and IMD analysis.

TABLE 51

| UE UL carriers | fx_low | fx_high | fy_low | fy_high |
|---|---|---|---|---|
| UL frequency (MHz) | 830 | 845 | 3480 | 3520 |
| 2nd harmonics frequency limits | 2 * fx_low | 2 * fx_high | 2 * fy_low | 2 * fy_high |
| 2nd harmonics frequency limits (MHz) | 1660 | 1690 | 6960 | 7040 |
| 3rd harmonics frequency limits | 3 * fx_low | 3 * fx_high | 3 * fy_low | 3 * fy_high |
| 3rd harmonics frequency limits (MHz) | 2490 | 2535 | 10440 | 10560 |
| Two tone 2nd order IMD products IMD frequency limits (MHz) | \|fy_low − fx_high\| 2635 | \|fy_high − fx_low\| 2690 | \|fy_low + fx_low\| 4310 | \|fy_high + fx_high\| 4365 |
| Two-tone 3rd order IMD products IMD frequency limits (MHz) | \|2 * fx_low − fy_high\| 1860 | \|2 * fx_high − fy_low\| 1790 | \|2 * fy_low − fx_high\| 6115 | \|2 * fy_high − fx_low\| 6210 |
| Two-tone 3rd order IMD products IMD frequency limits (MHz) | \|2 * fx_low + fy_low\| 5140 | \|2 * fx_high + fy_high\| 5210 | \|2 * fy_low + fx_low\| 7790 | \|2 * fy_high + fx_high\| 7885 |
| Two-tone 4th order IMD products IMD frequency limits (MHz) | \|3 * fx_low − fy_high\| 1030 | \|3 * fx_high − fy_low\| 945 | \|3 * fy_low − fx_high\| 9595 | \|3 * fy_high − fx_low\| 9730 |

TABLE 51-continued

| UE UL carriers | fx_low | fx_high | fy_low | fy_high |
|---|---|---|---|---|
| Two-tone 4th order IMD products IMD frequency limits (MHz) | \|3 * fx_low + fy_low\| 5970 | \|3 * fx_high + fy_high\| 6055 | \|3 * fy_low + fx_low\| 11270 | \|3 * fy_high + fx_high\| 11405 |
| Two-tone 4th order IMD products IMD frequency limits (MHz) | \|2 * fx_low − 2 * fy_high\| 5380 | \|2 * fx_high − 2 * fy_low\| 5270 | \|2 * fx_low + 2 * fy_low\| 8620 | \|2 * fx_high + 2 * fy_high\| 8730 |
| Two-tone 5th order IMD products IMD frequency limits (MHz) | \|fx_low − 4 * fy_high\| 13250 | \|fx_high − 4 * fy_low\| 13075 | \|fy_low − 4 * fx_high\| 100 | \|fy_high − 4 * fx_low\| 200 |
| Two-tone 5th order IMD products IMD frequency limits (MHz) | \|fx_low + 4 * fy_low\| 14750 | \|fx_high + 4 * fy_high\| 14925 | \|fy_low + 4 * fx_low\| 6800 | \|fy_high + 4 * fx_high\| 6900 |
| Two-tone 5th order IMD products IMD frequency limits (MHz) | \|2 * fx_low − 3 * fy_high\| 8900 | \|2 * fx_high − 3 * fy_low\| 8750 | \|2 * fy_low − 3 * fx_high\| 4425 | \|2 * fy_high − 3 * fx_low\| 4550 |
| Two-tone 5th order IMD products IMD frequency limits (MHz) | \|2 * fx_low + 3 * fy_low\| 12100 | \|2 * fx_high + 3 * fy_high\| 12250 | \|2 * fy_low + 3 * fx_low\| 9450 | \|2 * fy_high + 3 * fx_high\| 9575 |

The $4^{th}$ IMD fall into the own Rx frequency of Band 19. But this impact already has covered in 2DL/2UL CA_19A-42A.

Hence, there was no harmonics/IMDs impact to the $3^{rd}$ own Rx frequency of Band 21.

I-13-3. Co-Existence Studies for LTE-A UL CA_21A-42A and DL CA_19A-21A-42A

For 2UL/3DL own receiver desensitization study $2^{nd}$ and $3^{rd}$ order harmonics and $2^{nd}$, $3^{rd}$, $4^{th}$ and $5^{th}$ order intermodulation products were calculated and presented in below table.

Below table shows harmonic and IMD analysis.

TABLE 52

| UE UL carriers | fx_low | fx_high | fy_low | fy_high |
|---|---|---|---|---|
| UL frequency (MHz) | 1447.9 | 1462.9 | 3480 | 3520 |
| 2nd harmonics frequency limits | 2 * fx_low | 2 * fx_high | 2 * fy_low | 2 * fy_high |
| 2nd harmonics frequency limits (MHz) | 2895.8 | 2925.8 | 6960 | 7040 |
| 3rd harmonics frequency limits | 3 * fx_low | 3 * fx_high | 3 * fy_low | 3 * fy_high |
| 3rd harmonics frequency limits (MHz) | 4343.7 | 4388.7 | 10440 | 10560 |
| Two tone 2nd order IMD products IMD frequency limits (MHz) | \|fy_low − fx_high\| 2017.1 | \|fy_high − fx_low\| 2072.1 | \|fy_low + fx_low\| 4927.9 | \|fy_high + fx_high\| 4982.9 |
| Two-tone 3rd order IMD products IMD frequency limits (MHz) | \|2 * fx_low − fy_high\| 624.2 | \|2 * fx_high − fy_low\| 554.2 | \|2 * fy_low − fx_high\| 5497.1 | \|2 * fy_high − fx_low\| 5592.1 |
| Two-tone 3rd order IMD products IMD frequency limits (MHz) | \|2 * fx_low + fy_low\| 6375.8 | \|2 * fx_high + fy_high\| 6445.8 | \|2 * fy_low + fx_low\| 8407.9 | \|2 * fy_high + fx_high\| 8502.9 |

TABLE 52-continued

| UE UL carriers | fx_low | fx_high | fy_low | fy_high |
|---|---|---|---|---|
| Two-tone 4th order IMD products IMD frequency limits (MHz) | \|3 * fx_low − fy_high\| 823.7 | \|3 * fx_high − fy_low\| 908.7 | \|3 * fy_low − fx_high\| 8977.1 | \|3 * fy_high − fx_low\| 9112.1 |
| Two-tone 4th order IMD products IMD frequency limits (MHz) | \|3 * fx_low + fy_low\| 7823.7 | \|3 * fx_high + fy_high\| 7908.7 | \|3 * fy_low + fx_low\| 11887.9 | \|3 * fy_high + fx_high\| 12022.9 |
| Two-tone 4th order IMD products IMD frequency limits (MHz) | \|2 * fx_low − 2 * fy_high\| 4144.2 | \|2 * fx_high − 2 * fy_low\| 4034.2 | \|2 * fx_low + 2 * fy_low\| 9855.8 | \|2 * fx_high + 2 * fy_high\| 9965.8 |
| Two-tone 5th order IMD products IMD frequency limits (MHz) | \|fx_low − 4 * fy_high\| 12632.1 | \|fx_high − 4 * fy_low\| 12457.1 | \|fy_low − 4 * fx_high\| 2371.6 | \|fy_high − 4 * fx_low\| 2271.6 |
| Two-tone 5th order IMD products IMD frequency limits (MHz) | \|fx_low + 4 * fy_low\| 15367.9 | \|fx_high + 4 * fy_high\| 15542.9 | \|fy_low + 4 * fx_low\| 9271.6 | \|fy_high + 4 * fx_high\| 9371.6 |
| Two-tone 5th order IMD products IMD frequency limits (MHz) | \|2 * fx_low − 3 * fy_high\| 7664.2 | \|2 * fx_high − 3 * fy_low\| 7514.2 | \|2 * fy_low − 3 * fx_high\| 2571.3 | \|2 * fy_high − 3 * fx_low\| 2696.3 |
| Two-tone 5th order IMD products IMD frequency limits (MHz) | \|2 * fx_low + 3 * fy_low\| 13335.8 | \|2 * fx_high + 3 * fy_high\| 13485.8 | \|2 * fy_low + 3 * fx_low\| 11303.7 | \|2 * fy_high + 3 * fx_high\| 11428.7 |

The $4^{th}$ IMD fall into the $3^{rd}$ own Rx frequency of Band 19 when RAN4 consider operator specific frequency range in the related bands. It will be analysed to solve the self-interference problem.

I-13-4. MSD

When uplink CA configurations CA_19A-21A is paired with downlink CA configuration CA_19A-21A-42A there is interference components from 2 uplink operation which would interfere the downlink of the Band 42.

When uplink CA configurations CA_19A-42A is paired with downlink CA configuration CA_19A-21A-42A there is no interference components from 2 uplink operation which would interfere the downlink of the Band 21.

When uplink CA configurations CA_21A-42A is paired with downlink CA configuration CA_19A-21A-42A there is interference components from 2 uplink operation which would interfere the downlink of the Band 19.

I-14. LTE Advanced Carrier Aggregation: Band 1 and Band 3 and Band 3 with 2 ULs

Below table shows E-UTRA CA_3C configurations and bandwidth combination sets defined for intra-band CA

TABLE 54

| E-UTRA CA configuration/Bandwidth combination set | | | | |
|---|---|---|---|---|
| | Component carriers in order of increasing carrier frequency | | | |
| E-UTRA CA configuration | Allowed channel bandwidths for carrier [MHz] | Allowed channel bandwidths for carrier [MHz] | Maximum aggregated bandwidth [MHz] | Bandwidth combination set |
| CA_3C | 5, 10, 15 20 | 20 5, 10, 15, 20 | 40 | 0 |

I-14-1. Co-Existence Studies for LTE-A UL CA_1A-3A and DL CA_1A-3C

For 2UL/3DL own receiver desensitization study $2^{nd}$ and $3^{rd}$ order harmonics and $2^{nd}$, $3^{rd}$, $4^{th}$ and $5^{th}$ order intermodulation products were calculated and presented in below table.

TABLE 53

| E-UTRA CA Configuration | Uplink CA configurations | E-UTRA Bands | 1.4 MHz | 3 MHz | 5 MHz | 10 MHz | 15 MHz | 20 MHz | Maximum aggregated bandwidth [MHz] | Bandwidth combination set |
|---|---|---|---|---|---|---|---|---|---|---|
| CA_1A-3C | CA_1A-3A or CA_3C | 1 3 | | | Yes | Yes | Yes | Yes | 60 | 0 |

Below table shows harmonic and IMD analysis.

TABLE 55

| UE UL carriers | fx_low | fx_high | fy_low | fy_high |
|---|---|---|---|---|
| UL frequency (MHz) | 1710 | 1785 | 1920 | 1980 |
| 2nd harmonics frequency limits | 2 * fx_low | 2 * fx_high | 2 * fy_low | 2 * fy_high |
| 2nd harmonics frequency limits (MHz) | 3420 | 3570 | 3840 | 3960 |
| 3rd harmonics frequency limits | 3 * fx_low | 3 * fx_high | 3 * fy_low | 3 * fy_high |
| 3rd harmonics frequency limits (MHz) | 5130 | 5355 | 5760 | 5940 |
| Two tone 2nd order IMD products IMD frequency limits (MHz) | \|fy_low − fx_high\|  135 | \|fy_high − fx_low\|  270 | \|fy_low + fx_low\|  3630 | \|fy_high + fx_high\|  3765 |
| Two-tone 3rd order IMD products IMD frequency limits (MHz) | \|2 * fx_low − fy_high\|  1440 | \|2 * fx_high − fy_low\|  1650 | \|2 * fy_low − fx_high\|  2055 | \|2 * fy_high − fx_low\|  2250 |
| Two-tone 3rd order IMD products IMD frequency limits (MHz) | \|2 * fx_low + fy_low\|  5340 | \|2 * fx_high + fy_high\|  5550 | \|2 * fy_low + fx_low\|  5550 | \|2 * fy_high + fx_high\|  5745 |
| Two-tone 4th order IMD products IMD frequency limits (MHz) | \|3 * fx_low − fy_high\|  3150 | \|3 * fx_high − fy_low\|  3435 | \|3 * fy_low − fx_high\|  3975 | \|3 * fy_high − fx_low\|  4230 |
| Two-tone 4th order IMD products IMD frequency limits (MHz) | \|3 * fx_low + fy_low\|  7050 | \|3 * fx_high + fy_high\|  7335 | \|3 * fy_low + fx_low\|  7470 | \|3 * fy_high + fx_high\|  7725 |
| Two-tone 4th order IMD products IMD frequency limits (MHz) | \|2 * fx_low − 2 * fy_high\|  540 | \|2 * fx_high − 2 * fy_low\|  270 | \|2 * fx_low + 2 * fy_low\|  7260 | \|2 * fx_high + 2 * fy_high\|  7530 |
| Two-tone 5th order IMD products IMD frequency limits (MHz) | \|fx_low − 4 * fy_high\|  6210 | \|fx_high − 4 * fy_low\|  5895 | \|fy_low − 4 * fx_high\|  5220 | \|fy_high − 4 * fx_low\|  4860 |
| Two-tone 5th order IMD products IMD frequency limits (MHz) | \|fx_low + 4 * fy_low\|  9390 | \|fx_high + 4 * fy_high\|  9705 | \|fy_low + 4 * fx_low\|  8760 | \|fy_high + 4 * fx_high\|  9120 |
| Two-tone 5th order IMD products IMD frequency limits (MHz) | \|2 * fx_low − 3 * fy_high\|  2520 | \|2 * fx_high − 3 * fy_low\|  2190 | \|2 * fy_low − 3 * fx_high\|  1515 | \|2 * fy_high − 3 * fx_low\|  1170 |
| Two-tone 5th order IMD products IMD frequency limits (MHz) | \|2 * fx_low + 3 * fy_low\|  9180 | \|2 * fx_high + 3 * fy_high\|  9510 | \|2 * fy_low + 3 * fx_low\|  8970 | \|2 * fy_high + 3 * fx_high\|  9315 |

The $3^{rd}$ IMD fall into the own Rx frequency of Band 1. But this impact already has covered in 2DL/2UL CA_1A-3A.

Hence, there was no harmonics/IMDs impact to the $3^{rd}$ own Rx frequency of Band 3.

I-14-2. Co-Existence Studies for LTE-A UL CA_3C and DL CA_1A-3C

For 2UL/3DL own receiver desensitization study $2^{nd}$ and $3^{rd}$ order harmonics and $2^{nd}$, $3^{rd}$, $4^{th}$ and $5^{th}$ order intermodulation products were calculated and presented in below table.

Below table shows a harmonic analysis.

TABLE 56

| UE UL carriers | fx_low | fx_high |
|---|---|---|
| UL frequency (MHz) | 1710 | 1785 |
| 2nd harmonics frequency limits | 2 * fx_low | 2 * fx_high |
| 2nd harmonics frequency limits (MHz) | 3420 | 3570 |
| 3rd harmonics frequency limits | 3 * fx_low | 3 * fx_high |
| 3rd harmonics frequency limits (MHz) | 5130 | 5355 |

From the harmonic analysis table, there was no harmonics from Band 3 uplinks which would desensitize the $3^{rd}$ own Rx frequency of Band 1. Frequency separation of band 1 downlink and 3 uplink is 325 MHz therefore there is no impact from Band 3 uplink CA to Band 1 reception.

I-14-3. MSD

When uplink CA configurations CA_1A-3A is paired with downlink CA configuration CA_1A-3C there is no interference components from 2 uplink operation which would interfere the downlink of the Band 3.

When uplink CA configurations CA_3C is paired with downlink CA configuration CA_1A-3C there is no interference components from 2 uplink operation which would interfere the downlink of the Band 1.

I-15—LTE Advanced Carrier Aggregation: Band 3 and Band 3 and Band 8 with 2 ULs

TABLE 57

| E-UTRA CA Configuration | Uplink CA configurations | E-UTRA Bands | 1.4 MHz | 3 MHz | 5 MHz | 10 MHz | 15 MHz | 20 MHz | Maximum aggregated bandwidth [MHz] | Bandwidth combination set |
|---|---|---|---|---|---|---|---|---|---|---|
| CA_3C-8A | CA_3A-8A or CA_3C | 3 8 | | | Yes | Yes | Yes | | 50 | 0 |

Below table shows E-UTRA CA_3C configurations and bandwidth combination sets defined for intra-band CA.

TABLE 58

| E-UTRA CA configuration/Bandwidth combination set | | | | |
|---|---|---|---|---|
| | Component carriers in order of increasing carrier frequency | | | |
| E-UTRA CA configuration | Allowed channel bandwidths for carrier [MHz] | Allowed channel bandwidths for carrier [MHz] | Maximum aggregated bandwidth [MHz] | Bandwidth combination set |
| CA_3C | 5, 10, 15 20 | 20 5, 10, 15, 20 | 40 | 0 |

I-15-1. Co-Existence Studies for LTE-A UL CA_3A-8A and DL CA_3C-8A

For 2UL/3DL own receiver desensitization study $2^{nd}$ and $3^{rd}$ order harmonics and $2^{nd}$, $3^{rd}$, $4^{th}$ and $5^{th}$ order intermodulation products were calculated and presented in below table.

Below table shows harmonic and IMD analysis.

TABLE 59

| UE UL carriers | fx_low | fx_high | fy_low | fy_high |
|---|---|---|---|---|
| UL frequency (MHz) | 880 | 915 | 1710 | 1785 |
| 2nd harmonics frequency limits | 2 * fx_low | 2 * fx_high | 2 * fy_low | 2 * fy_high |
| 2nd harmonics frequency limits (MHz) | 1760 | 1830 | 3420 | 3570 |
| 3rd harmonics frequency limits | 3 * fx_low | 3 * fx_high | 3 * fy_low | 3 * fy_high |
| 3rd harmonics frequency limits (MHz) | 2640 | 2745 | 5130 | 5355 |
| Two tone 2nd order IMD products | \|fy_low − fx_high\| | \|fy_high − fx_low\| | \|fy_low + fx_low\| | \|fy_high + fx_high\| |
| IMD frequency limits (MHz) | 795 | 905 | 2590 | 2700 |
| Two-tone 3rd order IMD products | \|2 * fx_low − fy_high\| | \|2 * fx_high − fy_low\| | \|2 * fy_low − fx_high\| | \|2 * fy_high − fx_low\| |
| IMD frequency limits (MHz) | 25 | 120 | 2505 | 2690 |
| Two-tone 3rd order IMD products | \|2 * fx_low + fy_low\| | \|2 * fx_high + fy_high\| | \|2 * fy_low + fx_low\| | \|2 * fy_high + fx_high\| |
| IMD frequency limits (MHz) | 3470 | 3615 | 4300 | 4485 |
| Two-tone 4th order IMD products | \|3 * fx_low − fy_high\| | \|3 * fx_high − fy_low\| | \|3 * fy_low − fx_high\| | \|3 * fy_high − fx_low\| |
| IMD frequency limits (MHz) | 855 | 1035 | 4215 | 4475 |

TABLE 59-continued

| UE UL carriers | fx_low | fx_high | fy_low | fy_high |
|---|---|---|---|---|
| Two-tone 4th order IMD products IMD frequency limits (MHz) | \|3 * fx_low + fy_low\| 4350 | \|3 * fx_high + fy_high\| 4530 | \|3 * fy_low + fx_low\| 6010 | \|3 * fy_high + fx_high\| 6270 |
| Two-tone 4th order IMD products IMD frequency limits (MHz) | \|2 * fx_low − 2 * fy_high\| 1810 | \|2 * fx_high − 2 * fy_low\| 1590 | \|2 * fx_low + 2 * fy_low\| 5180 | \|2 * fx_high + 2 * fy_high\| 5400 |
| Two-tone 5th order IMD products IMD frequency limits (MHz) | \|fx_low − 4 * fy_high\| 6260 | \|fx_high − 4 * fy_low\| 5925 | \|fy_low − 4 * fx_high\| 1950 | \|fy_high − 4 * fx_low\| 1735 |
| Two-tone 5th order IMD products IMD frequency limits (MHz) | \|fx_low + 4 * fy_low\| 7720 | \|fx_high + 4 * fy_high\| 8055 | \|fy_low + 4 * fx_low\| 5230 | \|fy_high + 4 * fx_high\| 5445 |
| Two-tone 5th order IMD products IMD frequency limits (MHz) | \|2 * fx_low − 3 * fy_high\| 3595 | \|2 * fx_high − 3 * fy_low\| 3300 | \|2 * fy_low − 3 * fx_high\| 675 | \|2 * fy_high − 3 * fx_low\| 930 |
| Two-tone 5th order IMD products IMD frequency limits (MHz) | \|2 * fx_low + 3 * fy_low\| 6890 | \|2 * fx_high + 3 * fy_high\| 7185 | \|2 * fy_low + 3 * fx_low\| 6060 | \|2 * fy_high + 3 * fx_high\| 6315 |

The $2^{nd}$ harmonics from Band 8 and the $4^{th}$ & $5^{th}$ IMDs fall into the own Rx frequency of Band 3. Also the $4^{th}$ & $5^{th}$ IMDs fall into the own Rx frequency of Band 8. But these impacts already has covered in 2DL/2UL CA_3A-8A.

Hence, there was no harmonics/IMDs impact to the $3^{rd}$ own Rx frequency of Band 3.

I-15-2. Co-Existence Studies for LTE-A UL CA_3C and DL CA_3C-8A

For 2UL/3DL own receiver desensitization study $2^{nd}$ and $3^{rd}$ order harmonics and $2^{nd}$, $3^{rd}$, $4^{th}$ and $5^{th}$ order intermodulation products were calculated and presented in below table.

I-15-3. MSD

When uplink CA configurations CA_3A-8A is paired with downlink CA configuration CA_3C-8A there is no interference components from 2 uplink operation which would interfere the downlink of the Band 3.

When uplink CA configurations CA_3C is paired with downlink CA configuration CA_3C-8A there is no interference components from 2 uplink operation which would interfere the downlink of the Band 8.

I-16—LTE Advanced Carrier Aggregation: Band 41 and Band 42 and Band 42 with 2 ULs

TABLE 61

| E-UTRA CA Configuration | Uplink CA configurations | E-UTRA Bands | 1.4 MHz | 3 MHz | 5 MHz | 10 MHz | 15 MHz | 20 MHz | Maximum aggregated bandwidth [MHz] | Bandwidth combination set |
|---|---|---|---|---|---|---|---|---|---|---|
| CA_41A-42C | CA_41A-42A | 41 42 | | | | Yes See CA_42C BCS1 in below table. I-16-.1.1-2 | Yes | Yes | 60 | 0 |

Below table shows a harmonic analysis

TABLE 60

| UE UL carriers | fx_low | fx_high |
|---|---|---|
| UL frequency (MHz) | 1710 | 1785 |
| $2^{nd}$ harmonics frequency limits | 2 * fx_low | 2 * fx_high |
| $2^{nd}$ harmonics frequency limits (MHz) | 3420 | 3570 |
| $3^{rd}$ harmonics frequency limits | 3 * fx_low | 3 * fx_high |
| $3^{rd}$ harmonics frequency limits (MHz) | 5130 | 5355 |

From the harmonic analysis table, there was no harmonics from Band 3 uplinks which would desensitize the 3rd own Rx frequency of Band 1. Frequency separation of band 1 downlink and 3 uplink is 325 MHz therefore there is no impact from Band 3 uplink CA to Band 1 reception.

Below table shows E-UTRA CA_42C configurations and bandwidth combination sets defined for intra-band CA.

TABLE 62

| E-UTRA CA configuration/Bandwidth combination set | | | | |
|---|---|---|---|---|
| | Component carriers in order of increasing carrier frequency | | | |
| E-UTRA CA configuration | Allowed channel bandwidths for carrier [MHz] | Allowed channel bandwidths for carrier [MHz] | Maximum aggregated bandwidth [MHz] | Bandwidth combination set |
| CA_42C | 5, 10, 15, 20 20 | 20 5, 10, 15 | 40 | 0 |
| | 10, 15, 20 20 | 20 10, 15 | 40 | 1 |

I-16-1. Co-Existence Studies for LTE-A UL CA_41A-42A and DL CA_41A-42C

For 2UL/3DL own receiver desensitization study $2^{nd}$ and $3^{rd}$ order harmonics and $2^{nd}$, $3^{rd}$, $4^{th}$ and $5^{th}$ order intermodulation products were calculated and presented in below table.

Below table shows harmonic and IMD analysis.

TABLE 63

| UE UL carriers | fx_low | fx_high | fy_low | fy_high |
|---|---|---|---|---|
| UL frequency (MHz) | 2496 | 2690 | 3400 | 3600 |
| 2nd harmonics frequency limits | 2*fx_low | 2*fx_high | 2* fy_low | 2* fy_high |
| 2nd harmonics frequency limits (MHz) | 4992 | 5380 | 6800 | 7200 |
| 3rd harmonics frequency limits | 3*fx_low | 3*fx_high | 3* fy_low | 3* fy_high |
| 3rd harmonics frequency limits (MHz) | 7488 | 8070 | 10200 | 10800 |
| Two tone 2nd order IMD products | \|fy_low − fx_high\| | \|fy_high − fx_low\| | \|fy_low + fx_low\| | \|fy_high + fx_high\| |
| IMD frequency limits (MHz) | 710 | 1104 | 5896 | 6290 |
| Two-tone 3rd order IMD products | \|2*fx_low − fy_high\| | \|2*fx_high − fy_low\| | \|2*fy_low − fx_high\| | \|2*fy_high − fx_low\| |
| IMD frequency limits (MHz) | 1392 | 1980 | 4110 | 4704 |
| Two-tone 3rd order IMD products | \|2*fx_low + fy_low\| | \|2*fx_high + fy_high\| | \|2*fy_low + fx_low\| | \|2*fy_high + fx_high\| |
| IMD frequency limits (MHz) | 8392 | 8980 | 9296 | 9890 |
| Two-tone 4th order IMD products | \|3*fx_low − fy_high\| | \|3*fx_high − fy_low\| | \|3*fy_low − fx_high\| | \|3*fy_high − fx_low\| |
| IMD frequency limits (MHz) | 3888 | 4670 | 7510 | 8304 |
| Two-tone 4th order IMD products | \|3*fx_low + fy_low\| | \|3*fx_high + fy_high\| | \|3*fy_low + fx_low\| | \|3*fy_high + fx_high\| |
| IMD frequency limits (MHz) | 10888 | 11670 | 12696 | 13490 |
| Two-tone 4th order IMD products | \|2*fx_low − 2*fy_high\| | \|2*fx_high − 2*fy_low\| | \|2*fx_low + 2*fy_low\| | \|2*fx_high + 2*fy_high\| |
| IMD frequency limits (MHz) | 2208 | 1420 | 11792 | 12580 |
| Two-tone 5th order IMD products | \|fx_low − 4*fy_high\| | \|fx_high − 4*fy_low\| | \|fy_low − 4*fx_high\| | \|fy_high − 4*fx_low\| |
| IMD frequency limits (MHz) | 11904 | 10910 | 7360 | 6384 |
| Two-tone 5th order IMD products | \|fx_low + 4*fy_low\| | \|fx_high + 4*fy_high\| | \|fy_low + 4*fx_low\| | \|fy_high + 4*fx_high\| |
| IMD frequency limits (MHz) | 16096 | 17090 | 13384 | 14360 |
| Two-tone 5th order IMD products | \|2*fx_low − 3*fy_high\| | \|2*fx_high − 3*fy_low\| | \|2*fy_low − 3*fx_high\| | \|2*fy_high − 3*fx_low\| |
| IMD frequency limits (MHz) | 5808 | 4820 | 1270 | 288 |
| Two-tone 5th order IMD products | \|2*fx_low + 3*fy_low\| | \|2*fx_high + 3*fy_high\| | \|2*fy_low + 3*fx_low\| | \|2*fy_high + 3*fx_high\| |
| IMD frequency limits (MHz) | 15192 | 16180 | 14288 | 15270 |

From the harmonics/IMDs analysis table, there was no harmonics/IMDs impact to the $3^{rd}$ own Rx frequency of Band 42.

I-16-2. MSD

When uplink CA configurations CA_41A-42A is paired with downlink CA configuration CA_41A-42C there is no interference components from 2 uplink operation which would interfere the downlink of the Band 42.

I-17. LTE Advanced Carrier Aggregation: Band 41 and Band 41 and Band 42 with 2 ULs

TABLE 64

| E-UTRA CA Configuration | Uplink CA configurations | E-UTRA Bands | 1.4 MHz | 3 MHz | 5 MHz | 10 MHz | 15 MHz | 20 MHz | Maximum aggregated bandwidth [MHz] | Bandwidth combination set |
|---|---|---|---|---|---|---|---|---|---|---|
| CA_41C-42A | CA_41A-42A | 41 | | | See CA_41C BCS0 in below table. I-17-.1.1-2 | | | | 60 | 0 |
| | | 42 | | | | Yes | Yes | Yes | | |

Below table shows E-UTRA CA_41C configurations and bandwidth combination sets defined for intra-band CA.

TABLE 65

| | E-UTRA CA configuration/Bandwidth combination set | | | |
|---|---|---|---|---|
| | Component carriers in order of increasing carrier frequency | | Maximum | |
| E-UTRA CA configuration | Allowed channel bandwidths for carrier [MHz] | Allowed channel bandwidths for carrier [MHz] | aggregated bandwidth [MHz] | Bandwidth combination set |
| CA_41C | 10 | 20 | 40 | 0 |
| | 15 | 15, 20 | | |
| | 20 | 10, 15, 20 | | |

I-17-1. Co-Existence Studies for LTE-A UL CA_41A-42A and DL CA_41C-42A

For 2UL/3DL own receiver desensitization study $2^{nd}$ and $3^{rd}$ order harmonics and $2^{nd}$, $3^{rd}$, $4^{th}$ and $5^{th}$ order intermodulation products were calculated and presented in below table.

Below table shows harmonic and IMD analysis.

TABLE 66

| UE UL carriers | fx_low | fx_high | fy_low | fy_high |
|---|---|---|---|---|
| UL frequency (MHz) | 2496 | 2690 | 3400 | 3600 |
| 2nd harmonics frequency limits | 2*fx_low | 2*fx_high | 2* fy_low | 2* fy_high |
| 2nd harmonics frequency limits (MHz) | 4992 | 5380 | 6800 | 7200 |
| 3rd harmonics frequency limits | 3*fx_low | 3*fx_high | 3* fy_low | 3* fy_high |
| 3rd harmonics frequency limits (MHz) | 7488 | 8070 | 10200 | 10800 |
| Two tone 2nd order IMD products | \|fy_low − fx_high\| | \|fy_high − fx_low\| | \|fy_low + fx_low\| | \|fy_high + fx_high\| |
| IMD frequency limits (MHz) | 710 | 1104 | 5896 | 6290 |
| Two-tone 3rd order IMD products | \|2*fx_low − fy_high\| | \|2*fx_high − fy_low\| | \|2*fy_low − fx_high\| | \|2*fy_high − fx_low\| |
| IMD frequency limits (MHz) | 1392 | 1980 | 4110 | 4704 |

TABLE 66-continued

| UE UL carriers | fx_low | fx_high | fy_low | fy_high |
|---|---|---|---|---|
| Two-tone 3rd order IMD products IMD frequency limits (MHz) | \|2*fx_low + fy_low\| 8392 | \|2*fx_high + fy_high\| 8980 | \|2*fy_low + fx_low\| 9296 | \|2*fy_high + fx_high\| 9890 |
| Two-tone 4th order IMD products IMD frequency limits (MHz) | \|3*fx_low − fy_high\| 3888 | \|3*fx_high − fy_low\| 4670 | \|3*fy_low − fx_high\| 7510 | \|3*fy_high − fx_low\| 8304 |
| Two-tone 4th order IMD products IMD frequency limits (MHz) | \|3*fx_low + fy_low\| 10888 | \|3*fx_high + fy_high\| 11670 | \|3*fy_low + fx_low\| 12696 | \|3*fy_high + fx_high\| 13490 |
| Two-tone 4th order IMD products IMD frequency limits (MHz) | \|2*fx_low − 2*fy_high\| 2208 | \|2*fx_high − 2*fy_low\| 1420 | \|2*fx_low + 2*fy_low\| 11792 | \|2*fx_high + 2*fy_high\| 12580 |
| Two-tone 5th order IMD products IMD frequency limits (MHz) | \|fx_low − 4*fy_high\| 11904 | \|fx_high − 4*fy_low\| 10910 | \|fy_low − 4*fx_high\| 7360 | \|fy_high − 4*fx_low\| 6384 |
| Two-tone 5th order IMD products IMD frequency limits (MHz) | \|fx_low + 4*fy_low\| 16096 | \|fx_high + 4*fy_high\| 17090 | \|fy_low + 4*fx_low\| 13384 | \|fy_high + 4*fx_high\| 14360 |
| Two-tone 5th order IMD products IMD frequency limits (MHz) | \|2*fx_low − 3*fy_high\| 5808 | \|2*fx_high − 3*fy_low\| 4820 | \|2*fy_low − 3*fx_high\| 1270 | \|2*fy_high − 3*fx_low\| 288 |
| Two-tone 5th order IMD products IMD frequency limits (MHz) | \|2*fx_low + 3*fy_low\| 15192 | \|2*fx_high + 3*fy_high\| 16180 | \|2*fy_low + 3*fx_low\| 14288 | \|2*fy_high + 3*fx_high\| 15270 |

From the harmonics/IMDs analysis table, there was no harmonics/IMDs impact to the 3rd own Rx frequency of Band 41.

I-17-2. MSD

When uplink CA configurations CA_41A-42A is paired with downlink CA configuration CA_41C-42A there is no interference components from 2 uplink operation which would interfere the downlink of the Band 41.

I-18. LTE Advanced Carrier Aggregation: Band 2 and Band 4 and Band 7 with 2 ULs

TABLE 67

| E-UTRA CA Configuration | Uplink CA configurations | E-UTRA Bands | 1.4 MHz | 3 MHz | 5 MHz | 10 MHz | 15 MHz | 20 MHz | Maximum aggregated bandwidth [MHz] | Bandwidth combination set |
|---|---|---|---|---|---|---|---|---|---|---|
| CA_2A-4A-7A | CA_2A-4A | 2 | | | Yes | Yes | Yes | Yes | 60 | 0 |
| | | 4 | | | Yes | Yes | Yes | Yes | | |
| | | 7 | | | Yes | Yes | Yes | Yes | | |

I-18-1. Co-Existence Studies for LTE-A UL CA_2A-4A and DL CA_2A-4A-7A

For 2UL/3DL own receiver desensitization study $2^{nd}$ and $3^{rd}$ order harmonics and $2^{nd}$, $3^{rd}$, $4^{th}$ and $5^{th}$ order intermodulation products were calculated and presented in below table.

Below table shows harmonic and IMD analysis.

TABLE 68

| UE UL carriers | fx_low | fx_high | fy_low | fy_high |
|---|---|---|---|---|
| UL frequency (MHz) | 1710 | 1785 | 1850 | 1910 |
| 2nd harmonics frequency limits | 2*fx_low | 2*fx_high | 2*fy_low | 2*fy_high |

TABLE 68-continued

| UE UL carriers | fx_low | fx_high | fy_low | fy_high |
|---|---|---|---|---|
| 2nd harmonics frequency limits (MHz) | 3420 | 3570 | 3700 | 3820 |
| 3rd harmonics frequency limits | 3*fx_low | 3*fx_high | 3* fy_low | 3* fy_high |
| 3rd harmonics frequency limits (MHz) | 5130 | 5355 | 5550 | 5730 |
| Two tone 2nd order IMD products IMD frequency limits (MHz) | \|fy_low − fx_high\| 65 | \|fy_high − fx_low\| 200 | \|fy_low + fx_low\| 3560 | \|fy_high + fx_high\| 3695 |
| Two-tone 3rd order IMD products IMD frequency limits (MHz) | \|2*fx_low − fy_high\| 1510 | \|2*fx_high − fy_low\| 1720 | \|2*fy_low − fx_high\| 1915 | \|2*fy_high − fx_low\| 2110 |
| Two-tone 3rd order IMD products IMD frequency limits (MHz) | \|2*fx_low + fy_low\| 5270 | \|2*fx_high + fy_high\| 5480 | \|2*fy_low + fx_low\| 5410 | \|2*fy_high + fx_high\| 5605 |
| Two-tone 4th order IMD products IMD frequency limits (MHz) | \|3*fx_low − fy_high\| 3220 | \|3*fx_high − fy_low\| 3505 | \|3*fy_low − fx_high\| 3765 | \|3*fy_high − fx_low\| 4020 |
| Two-tone 4th order IMD products IMD frequency limits (MHz) | \|3*fx_low + fy_low\| 6980 | \|3*fx_high + fy_high\| 7265 | \|3*fy_low + fx_low\| 7260 | \|3*fy_high + fx_high\| 7515 |
| Two-tone 4th order IMD products IMD frequency limits (MHz) | \|2*fx_low − 2*fy_high\| 400 | \|2*fx_high − 2*fy_low\| 130 | \|2*fx_low + 2*fy_low\| 7120 | \|2*fx_high + 2*fy_high\| 7390 |
| Two-tone 5th order IMD products IMD frequency limits (MHz) | \|fx_low − 4*fy_high\| 5930 | \|fx_high − 4*fy_low\| 5615 | \|fy_low − 4*fx_high\| 5290 | \|fy_high − 4*fx_low\| 4930 |
| Two-tone 5th order IMD products IMD frequency limits (MHz) | \|fx_low + 4*fy_low\| 9110 | \|fx_high + 4*fy_high\| 9425 | \|fy_low + 4*fx_low\| 8690 | \|fy_high + 4*fx_high\| 9050 |
| Two-tone 5th order IMD products IMD frequency limits (MHz) | \|2*fx_low − 3*fy_high\| 2310 | \|2*fx_high − 3*fy_low\| 1980 | \|2*fy_low − 3*fx_high\| 1655 | \|2*fy_high − 3*fx_low\| 1310 |
| Two-tone 5th order IMD products IMD frequency limits (MHz) | \|2*fx_low + 3*fy_low\| 8970 | \|2*fx_high + 3*fy_high\| 9300 | \|2*fy_low + 3*fx_low\| 8830 | \|2*fy_high + 3*fx_high\| 9175 |

The $3^{rd}$ & $5^{th}$ IMDs fall into the own Rx frequency of Band 2 and Band 4. But these impacts already covered in 2UL/2DL CA_2A-4A in Rel-12.

Hence, there was no harmonic or IMD products from Band 2 and Band 4 uplinks which would desensitize Band 7 downlink.

I-18-2. MSD

When uplink CA configurations CA_2A-4A is paired with downlink CA configuration CA_2A-4A-7A there is no interference components from 2 uplink operation which would interfere the downlink of the Band 7.

II. Summary of Interference Studies

Based on the self-defense analysis, the present disclosure suggests to define the MSD requirements for only 3DL/2UL CA band combinations since there was no different self-defense problems between 3DL/2UL CA and other xDL/2UL CA.

Below table summarizes the CA band combinations with self-interference problems for CA_3DL/2UL CA.

TABLE 69

| downlink CA configuration | uplink CA Configuration | Harmonic relation to 3rd band without uplink | intermodulation to 3rd band without uplink | interference due to small frequency separation | MSD |
|---|---|---|---|---|---|
| CA_1A-3A-40A | CA_1A-3A | — | 5th order | Yes | 8.0 |
| CA_1A-5A-40A | CA_1A-5A | — | 4th order | — | 9.0 |
| CA_1A-3A-7A | CA_1A-3A | — | — | Yes | N/A |
|  | CA_1A-7A | — | — |  |  |
|  | CA_3A-7A | — | — |  |  |

TABLE 69-continued

| downlink CA configuration | uplink CA Configuration | Harmonic relation to 3rd band without uplink | intermodulation to 3rd band without uplink | interference due to small frequency separation | MSD |
|---|---|---|---|---|---|
| CA_1A-7A-8A | CA_1A-7A | — | 5th order | — | The IMD5 is fairly small and the overlapped region is quite small portion |
|  | CA_1A-8A | B8 3rd harmonic |  | — |  |
| CA_1A-8A-40A | CA_1A-8A | — | — | — | N/A |
| CA_1A-42C | CA_1A-42A | — | 4th order | — | No impact when consider a fixed Tx-Rx separation of 190 MHz in Band 1 own Rx band. |
| CA_2A-4A-5A | CA_2A-4A | — | — | — | N/A |
| CA_2A-4A-29A | CA_2A-4A | — | — | — | N/A |
| CA_2A-12B | CA_2A-12A | — | — | — | N/A |
| CA_2A-12A-30A | CA_2A-12A | — | 4th order | — | 12.0 |
| CA_3A-5A-40A | CA_3A-5A | — | — | — | N/A |
| CA_3A-7A-8A | CA_3A-7A | — | 3rd order | — | TBD |
|  | CA_3A-8A | B8 3rd harmonic | 2nd & 3rd order | — | TBD |
| CA_3A-8A-40A | CA_3A-8A | — | — | — | N/A |
| CA_3A-42C | CA_3A-42A | — | — | — |  |
| CA_4A-12B | CA_4A-12A | — | — | — | N/A |
| CA_4A-12A-30A | CA_4A-12A | — | — | — | N/A |
| CA_7C-28A | CA_7C | — | — | — | N/A |
|  | CA_7A-28A | — | — | — | N/A |
| CA_19A-42C | CA_19A-42A | — | 4th order | — | Consider specific spectrum of the operator |
|  |  |  |  |  | N/A |
| CA_21A-42C | CA_21A-42A | — | — | — | N/A |
| CA_1A-5A-46A | CA_1A-5A | B1 3rd harmonic B5 7th harmonics | 4th & 5th order | — | [0.44] |
| CA_1A-7A-46A | CA_1A-7A | B1 3rd harmonic | 4th & 5th order | — | [4.75] |
| CA_5A-7A-46A | CA_5A-7A | B5 7th harmonics | 3rd & 5th order | — | [11.12] |
| CA_1A-3A-21A | CA_1A-3A | — | 3rd & 5th order | Yes | No MSD due to IMD to be specified according to actual spectrum holdings. |
|  | CA_1A-21A | — | — | — | N/A |
|  | CA_3A-21A | — | 3rd order | — | No MSD due to IMD to be specified according to actual spectrum holdings. |
| CA_1A-3A-42A | CA_1A-3A | B3 2nd harmonics | 4th order | Yes | [11.0] |
|  | CA_1A-42A | — | — | — | N/A |
|  | CA_3A-42A | — | — | — | N/A |
| CA_1A-19A-42A | CA_1A-19A | — | 3rd order | — | No MSD due to IMD to be specified according to actual spectrum holdings. |

TABLE 69-continued

| downlink CA configuration | uplink CA Configuration | Harmonic relation to 3rd band without uplink | intermodulation to 3rd band without uplink | interference due to small frequency separation | MSD |
|---|---|---|---|---|---|
| | CA_1A-42A | — | 5th order | — | No MSD due to IMD to be specified according to actural spectrum holdings. |
| CA_1A-21A-42A | CA_19A-42A | — | — | — | N/A |
| | CA_1A-21A | — | 2nd order | — | No MSD due to IMD to be specified according to actural spectrum holdings. |
| | CA_1A-42A | — | 2nd order | — | No MSD due to IMD to be specified according to actural spectrum holdings. |
| | CA_21A-42A | — | 2nd order | — | No MSD due to IMD to be specified according to actural spectrum holdings. |
| CA_3A-5A-7A | CA_3A-5A | — | 2nd & 3rd order | — | [30.0] for 2nd IMD [18.0] for 3rd IMD |
| | CA_3A-7A | — | 3rd order | — | [19.0] |
| | CA_5A-7A | — | — | — | N/A |
| CA_3A-19A-21A | CA_3A-19A | — | — | — | N/A |
| | CA_3A-21A | — | 5th order | — | No MSD due to IMD to be specified according to actural spectrum holdings. |
| | CA_19A-21A | — | 5th order | — | [4.0] |
| CA_3A-19A-42A | CA_3A-19A | B3 2nd harmonics | 3rd & 5th order | — | No MSD due to IMD to be specified according to actural spectrum holdings. |
| | CA_3A-42A | — | — | — | N/A |
| | CA_19A-42A | — | 3rd order | — | No MSD since the overlapped region (0.1 MHz) is quite small portion. |
| CA_3A-21A-42A | CA_3A-21A | B3 2nd harmonics | — | — | |
| | CA_3A-42A | — | 5th order | — | No MSD due to IMD to be specified according to actural spectrum holdings. |
| | CA_21A-42A | — | — | — | N/A |

TABLE 69-continued

| downlink CA configuration | uplink CA Configuration | Harmonic relation to 3rd band without uplink | intermodulation to 3rd band without uplink | interference due to small frequency separation | MSD |
|---|---|---|---|---|---|
| CA_19A-21A-42A | CA_19A-21A | — | 4th order | — | [11.0] |
|  | CA_19A-42A | — | — | — | N/A |
|  | CA_21A-42A | — | 4th order | — | [13.0] |
| CA_1A-3C | CA_1A-3A | — | — | Yes |  |
|  | CA_3C | — | — | — | N/A |
| CA_3C-8A | CA_3C | — | — | — | N/A |
|  | CA_3A-8A | B8 2nd harmonics | 4th & 5th order | — |  |
| CA_2A-4A-7A | CA_2A-4A | — | — | — | N/A |
| CA_41A-42C | CA_41A-42A | — | — | — | N/A |
| CA_41C-42A | CA_41A-42A | — | — | — | N/A |
| CA_1A-3A-28A | CA_1A-3A | — | — | Yes |  |
|  | CA_1A-28A | — | 5th order | — | TBD |
|  | CA_3A-28A | B28 3rd harmonics | 4th order | — |  |
| CA_1A-21A-28A | CA_1A-21A | — | — | — | N/A |
|  | CA_1A-28A | B28 2nd harmonics | — | — | No MSD due to harmonics by considering of actural spectrum holdings. |
|  | CA_21A-28A | B28 3rd harmonics | 2nd & 3rd order | — |  |
| CA_1A-28A-42A | CA_1A-28A | — | 3rd order | — | TBD |
|  | CA_1A-42A | — | — | — | N/A |
|  | CA_28A-42A | B28 3rd harmonics | 3rd order | — |  |
| CA_3A-21A-28A | CA_3A-21A | — | 5th order | — | TBD |
|  | CA_3A-28A | B28 2nd harmonics | — | — | No MSD due to harmonics by considering of actural spectrum holdings. |
|  | CA_21A-28A | — | — | — | N/A |
| CA_3A-28A-42A | CA_3A-28A | B3 2nd harmonics | — | — |  |
|  | CA_3A-42A | — | — | — | N/A |
|  | CA_28A-42A | — | — | — | N/A |
| CA_21A-28A-42A | CA_21A-28A | — | 3rd & 4th order | — | No MSD due to IMD by considering of actural spectrum holdings. |
|  | CA_21A-42A | — | 4th order | — | No MSD due to IMD by considering of actural spectrum holdings. |
|  | CA_28A-42A | B28 2nd harmonics | — | — | No MSD due to harmonics by considering of actural spectrum holdings. |
| CA_28A-42C | CA_28A-42A | — | — | — | N/A |
| CA_1A-7A-7A | CA_1A-7A | — | — | — | N/A |
| CA_3A-7A-7A | CA_3A-7A | — | 4th order | — | 4th IMD was covered in 2DL/2UL CA_3A-7A |
| CA_5A-7A-7A | CA_5A-7A | — | 5th order | — | 5th IMD was covered in 2DL/2UL CA_5A-7A |

Below table summarizes the CA__ band combinations with self-interference problems for CA_4DL/2UL CA.

TABLE 70

| downlink CA configuration | uplink CA Configuration | Harmonic relation to 3rd and 4th band without uplink | intermodulation to 3rd and 4th band without uplink | interference due to small frequency separation | MSD |
|---|---|---|---|---|---|
| CA_1A-3A-8A-40A | CA_1A-3A | — | 5th order into B40 | Yes | No need (already covered 3DL CA_1A-3A-40A with 2UL CA_1A-3A) |
| | CA_1A-8A | 2nd harmonic into B3 | — | | |
| | CA_3A-8A | — | — | | N/A |
| CA_1A-3A-5A-40A | CA_1A-3A | — | 5th order into B40 | Yes | No need (already covered 3DL CA_1A-3A-40A with 2UL CA_1A-3A) |
| | CA_1A-5A | — | 4th order into B40 | | No need (already covered 3DL CA_1A-5A-40A with 2UL CA_1A-5A) |
| | CA_3A-5A | — | — | | |
| CA_1A-3A-7A-8A | CA_1A-3A | — | — | Yes | N/A |
| | CA_1A-7A | — | 5th order into B8 | | No need (already covered 3DL CA_1A-7A-8A with 2UL CA_1A-7A) |
| | CA_1A-8A | 2nd harmonic into B3 & 3rd harmonic into B7 | — | | |
| | CA_3A-7A | | 3rd order into B8 | | No need (already covered 3DL CA_3A-7A-8A with 2UL CA_3A-7A) |
| | CA_3A-8A | 3rd harmonic into B7 | 2nd & 3rd order into B7 | | No need (already covered 3DL CA_3A-7A-8A with 2UL CA_3A-8A) |
| CA_2A-4A-5A-29A | CA_2A-4A | — | — | — | N/A |
| CA_3A-7C-28A | CA_3A-7A | — | 2nd order into B28 | — | No need (already covered 3DL CA_3A-7A-28A with 2UL CA_3A-7A) |
| | CA_7A-28A | — | 2nd order into B3 | — | No need (already covered 3DL CA_3A-7A-28A with 2UL CA_7A-28A) |
| | CA_7C | — | — | — | N/A |
| CA_1A-5A-7A-46A | CA_1A-5A | B1 3rd harmonic B5 7th harmonics | 4th & 5th order into B46 | — | No need for IMD (it will covered 3DL CA_1A-5A-46A with 2UL CA_1A-5A) |

TABLE 70-continued

| downlink CA configuration | uplink CA Configuration | Harmonic relation to 3rd and 4th band without uplink | intermodulation to 3rd and 4th band without uplink | interference due to small frequency separation | MSD |
|---|---|---|---|---|---|
| | CA_1A-7A | B1 3rd harmonic | 4th & 5th order into B46 5th order into B5 | — | No need for IMD (it will covered 3DL CA_1A-7A-46A with 2UL CA_1A-7A) No need for IMD (it was already covered 3DL CA_1A-5A-7A with 2UL_CA_1A-7A |
| | CA_5A-7A | B5 7th harmonics | 3rd & 5th order into B46 | — | |
| CA_1A-3A-5A-7A | CA_1A-3A | — | — | — | N/A |
| | CA_1A-5A | — | — | — | N/A |
| | CA_1A-7A | — | 5th order into B5 | — | No need for IMD (it was already covered 3DL CA_1A-5A-7A with 2UL CA_1A-7A) |
| | CA_3A-5A | — | 2nd & 3rd order into B7 | — | No need for IMD (it will covered 3DL CA_3A-5A-7A with 2UL CA_3A-5A) |
| | CA_3A-7A | — | 3rd order into B5 | — | No need for IMD (it will covered 3DL CA_3A-5A-7A with 2UL CA_3A-7A) |
| | CA_5A-7A | — | — | — | N/A |
| CA_1A-5A-46C | CA_1A-5A | B1 3rd harmonic B5 7th harmonics | 4th & 5th order | — | |
| CA_1A-7A-46C | CA_1A-7A | B1 3rd harmonic | 4th & 5th order | — | |
| CA_5A-7A-46C | CA_5A-7A | B5 7th harmonics | 3rd & 5th order | — | No need for IMD (it will covered 3DL CA_5A-7A-46A with 2UL CA_5A-7A) |
| CA_1A-19A-21A-42A | CA_1A-19A | — | 3rd order into B42 | — | No MSD due to IMD to be specified according to actual spectrum holdings. |
| | CA_1A-21A | — | 2nd order into B42 | — | No MSD due to IMD to be specified according to actual spectrum holdings. |
| | CA_1A-42A | — | 2nd order into B21 5th order into B19 | — | No MSD due to IMD to be specified according to actual spectrum holdings. |
| | CA_19A-21A | — | 4th order into B42 | — | No need for IMD (it will covered 3DL CA_19A-21A-42A with 2UL CA_19A-21A) |

TABLE 70-continued

| downlink CA configuration | uplink CA Configuration | Harmonic relation to 3rd and 4th band without uplink | intermodulation to 3rd and 4th band without uplink | interference due to small frequency separation | MSD |
|---|---|---|---|---|---|
| | CA_19A-42A | — | — | — | N/A |
| | CA_21A-42A | — | 2nd order into B1<br>4th order into B19 | — | No need for IMD (it will covered 3DL CA_19A-21A-42A with 2UL CA_21A-42A) |
| CA_1A-3A-19A-42A | CA_1A-3A | B3 2nd harmonics into B42 | 4th order into B42 | Yes | No need for IMD (it will covered 3DL CA_1A-3A-42A with 2UL CA_1A-3A) |
| | CA_1A-19A | — | 3rd order into B42 | — | No MSD due to IMD to be specified according to actural spectrum holdings. |
| | CA_1A-42A | — | 5th order into B19 | — | No MSD due to IMD to be specified according to actural spectrum holdings. |
| | CA_3A-19A | B3 2nd harmonics into B42 | 3rd & 5th order into B42 | — | No MSD due to IMD to be specified according to actural spectrum holdings. |
| | CA_3A-42A | — | — | — | N/A |
| | CA_19A-42A | — | 3rd order into B3 | — | No need for IMD (it will covered 3DL CA_3A-19A-42A with 2UL CA_19A-42A) |
| CA_1A-3C-8A | CA_1A-3A | — | — | Yes | |
| | CA_1A-8A | B8 2nd harmonics into B3 | — | — | |
| | CA_3A-8A | B8 2nd harmonics into B3 | 4th & 5th order into B3 | — | |
| | CA_3C | — | — | — | N/A |
| CA_1A-3A-42C | CA_1A-3A | B3 2nd harmonics into B42 | 4th order | Yes | No need for IMD (it will covered 3DL CA_1A-3A-42A with 2UL CA_1A-3A) |
| | CA_1A-42A | — | — | — | N/A |
| | CA_3A-42A | B3 2nd harmonics into B42 | 4th & 5th order into B42- | — | No need for IMD (it was already covered 2DL/2UL CA_3A-42A) |
| CA_1A-19A-42C | CA_1A-19A | — | 3rd order into B42 | — | No MSD due to IMD to be specified according to actural spectrum holdings. |
| | CA_1A-42A | — | 5th order into B19 | — | No MSD due to IMD to be specified according to actural spectrum holdings. |
| | CA_19A-42A | — | — | — | N/A |
| CA_1A-21A-42C | CA_1A-21A | — | 2nd order into B42 | — | No MSD due to IMD to be specified according to actural spectrum holdings. |

TABLE 70-continued

| downlink CA configuration | uplink CA Configuration | Harmonic relation to 3rd and 4th band without uplink | intermodulation to 3rd and 4th band without uplink | interference due to small frequency separation | MSD |
|---|---|---|---|---|---|
| | CA_1A-42A | — | 2nd order into B21 | — | No MSD due to IMD to be specified according to actual spectrum holdings. |
| | CA_21A-42A | — | 2nd order into B1 | — | No MSD due to IMD to be specified according to actual spectrum holdings. |
| CA_3A-19A-42C | CA_3A-19A | B3 2nd harmonic into B42 | 3rd & 5th order into B42 | — | No MSD due to IMD to be specified according to actual spectrum holdings. |
| | CA_3A-42A | B3 2nd harmonic into B42 | 4th & 5th order into B42 | — | No MSD due to IMD to be specified according to actual spectrum holdings. |
| | CA_19A-42A | — | 3rd order into B3 | — | No MSD due to IMD to be specified according to actual spectrum holdings. |
| CA_19A-21A-42C | CA_19A-21A | — | 4th order into B42 | — | No need for IMD (it will covered 3DL CA_19A-21A-42A with 2UL CA_19A-21A) |
| | CA_19A-42A | — | — | — | N/A |
| | CA_21A-42A | — | 4th order into B19 | — | No need for IMD (it will covered 3DL CA_19A-21A-42A with 2UL CA_21A-42A) |
| CA_2A-4A-7A-7A | CA_2A-4A | — | — | — | N/A |
| CA_41C-42C | CA_41A-42A | — | — | — | N/A |
| CA_1A-3A-19A-21A | CA_1A-3A | — | 3rd & 5th order into B21 | Yes | No MSD due to IMD to be specified according to actual spectrum holdings. |
| | CA_1A-19A | — | — | | N/A |
| | CA_1A-21A | — | — | | N/A |
| | CA_3A-19A | — | — | | N/A |
| | CA_3A-21A | — | 3rd order into B1, 5th order into B19 | | No MSD due to IMD to be specified according to actual spectrum holdings. |
| | CA_19A-21A | — | 5th order into B3 | | No need for IMD (it covered 3DL CA_3A-19A-21A with 2UL CA_19A-21A) |
| CA_1A-3A-21A-28A | CA_1A-3A | — | 3rd & 5th order into B21 | Yes | No MSD due to IMD to be specified according to actual spectrum holdings. |

TABLE 70-continued

| downlink CA configuration | uplink CA Configuration | Harmonic relation to 3rd and 4th band without uplink | intermodulation to 3rd and 4th band without uplink | interference due to small frequency separation | MSD |
|---|---|---|---|---|---|
| | CA_1A-21A | — | — | | N/A |
| | CA_1A-28A | B28 2nd harmonics into B21 | 5th order into B3 | | No MSD due to harmonics to be specified according to actual spectrum holdings. No need for IMD (it covered 3DL CA_1A-3A-28A with 2UL CA_1A-28A) |
| | CA_3A-21A | | 3rd order into B1, 5th order into B28 | | No MSD due to IMD to be specified according to actual spectrum holdings. No need for IMD (it covered 3DL CA_3A-21A-28A with 2UL CA_3A-21A) |
| | CA_3A-28A | B28 2nd harmonics into B21 B28 3rd harmonics into B1 | 4th order into B1 | | No MSD due to harmonics to be specified according to actual spectrum holdings. No need for IMD (it covered 3DL CA_1A-3A-28A with 2UL CA_3A-28A) |
| | CA_21A-28A | B28 3rd harmonics into B1 | 2nd & 3rd order into B1 | | No MSD due to IMD problems by considering of actual spectrum holdings. |
| CA_1A-3A-21A-42A | CA_1A-3A | B3 2nd harmonics into B42 | 3rd & 5th order into B21, 4th order into B42 | Yes | No MSD due to IMD to be specified according to actual spectrum holdings. |
| | CA_1A-21A | — | 2nd order into B42 | | No MSD due to IMD to be specified according to actual spectrum holdings. |
| | CA_1A-42A | — | 2nd order into B21 | | No MSD due to IMD to be specified according to actual spectrum holdings. |
| | CA_3A-21A | B3 2nd harmonics into B42 | 3rd order into B1, | | No MSD due to IMD to be specified according to actual spectrum holdings. |
| | CA_3A-42A | — | 5th order into B21 | | No MSD due to IMD to be specified according to actual spectrum holdings. |

TABLE 70-continued

| downlink CA configuration | uplink CA Configuration | Harmonic relation to 3rd and 4th band without uplink | intermodulation to 3rd and 4th band without uplink | interference due to small frequency separation | MSD |
|---|---|---|---|---|---|
| | CA_21A-42A | — | 2nd order into B1 | | No MSD due to IMD to be specified according to actual spectrum holdings. |
| CA_1A-3A-28A-42A | CA_1A-3A | B3 2nd harmonics into B42 | 4th order into B42 | Yes | No need for IMD (it covered 3DL CA_1A-3A-42A with 2UL CA_1A-3A) |
| | CA_1A-28A | — | 5th order into B3, 3rd order into B42 | | No need for IMD (it covered 3DL CA_1A-3A-28A with 2UL CA_1A-28A) No need for IMD (it covered 3DL CA_1A-28A-42A with 2UL CA_1A-28A) |
| | CA_1A-42A | — | — | | N/A |
| | CA_3A-28A | B28 3rd harmonics into B1 B3 2nd harmonics into B42 | 4th order into B1 | | No need for IMD (it covered 3DL CA_1A-3A-28A with 2UL CA_3A-28A) |
| | CA_3A-42A | — | — | | N/A |
| | CA_28A-42A | B28 3rd harmonics into B1 | 3rd order into B1 | | No need for IMD (it covered 3DL CA_1A-28A-42A with 2UL CA_28A-42A) |
| CA_1A-21A-28A-42A | CA_1A-21A | — | 2nd order into B42 | — | No MSD due to IMD to be specified according to actual spectrum holdings. |
| | CA_1A-28A | B28 2nd harmonics | 3rd order into B42 | — | No MSD due to harmonics to be specified according to actual spectrum holdings. No need for IMD (it covered 3DL CA_1A-28A-42A with 2UL CA_1A-28A) |
| | CA_1A-42A | — | 2nd order into B21 | — | No MSD due to IMD to be specified according to actual spectrum holdings. |
| | CA_21A-28A | B28 3rd harmonics into B1 | 2nd & 3rd order into B1 3rd & 4th order into B42 | — | No MSD due to harmonics/IMD to be specified according to actual spectrum holdings. |
| | CA_21A-42A | — | 2nd order into B1, 4th order into B28 | — | No MSD due to IMD to be specified according to actual spectrum holdings. |

TABLE 70-continued

| downlink CA configuration | uplink CA Configuration | Harmonic relation to 3rd and 4th band without uplink | intermodulation to 3rd and 4th band without uplink | interference due to small frequency separation | MSD |
|---|---|---|---|---|---|
| | CA_28A-42A | B28 3rd harmonics into B1 B28 2nd harmonics into B21 | 3rd order into B1 | — | No need for IMD (it covered 3DL CA_1A-28A-42A with 2UL CA_28A-42A) |
| CA_1A-28A-42C | CA_1A-28A | — | 3rd order into B42 | — | No need for IMD (it covered 3DL CA_1A-28A-42A with 2UL CA_1A-28A) |
| | CA_1A-42A | — | — | — | N/A |
| | CA_28A-42A | B28 3rd harmonics into B1 | 3rd order into B1 | — | No need for IMD (it covered 3DL CA_1A-28A-42A with 2UL CA_28A-42A) |
| CA_3A-21A-42C | CA_3A-21A | B3 2nd harmonics into B42 | — | — | |
| | CA_3A-42A | — | 5th order into B21 | — | No MSD due to IMD to be specified according to actual spectrum holdings. |
| | CA_21A-42A | — | — | — | N/A |
| CA_3A-28A-42C | CA_3A-28A | B3 2nd harmonics into B42 | — | — | |
| | CA_3A-42A | B3 2nd harmonics into B42 | 4th & 5th order into B42 | — | |
| | CA_28A-42A | — | — | — | N/A |
| CA_21A-28A-42C | CA_21A-28A | — | 3rd & 4th order into B42 | — | No MSD due to IMD by considering of actual spectrum holdings. |
| | CA_21A-42A | — | 4th order into B28 | — | No MSD due to IMD by considering of actual spectrum holdings. |
| | CA_28A-42A | B28 2nd harmonics | — | — | No MSD due to harmonics by considering of actual spectrum holdings. |
| CA_1A-3A-7A-7A | CA_1A-3A | — | — | — | N/A |
| | CA_1A-7A | — | — | Yes | |
| | CA_3A-7A | — | 4th order into B7 | — | |
| CA_1A-5A-7A-7A | CA_1A-5A | — | — | — | N/A |
| | CA_1A-7A | — | 5th order into B5 | — | No need for IMD (it covered 3DL CA_1A-5A-7A with 2UL CA_1A-7A) |
| | CA_5A-7A | — | 5th order into B7 | — | No need for IMD (it already completed in 2DL/2UL CA_5A-7A |
| CA_3A-5A-7A-7A | CA_3A-5A | — | 2nd & 3rd order into B7 | — | No need for IMD (it covered 3DL CA_3A-5A-7A with 2UL CA_3A-5A) |

TABLE 70-continued

| downlink CA configuration | uplink CA Configuration | Harmonic relation to 3rd and 4th band without uplink | intermodulation to 3rd and 4th band without uplink | interference due to small frequency separation | MSD |
|---|---|---|---|---|---|
| | CA_3A-7A | — | 3rd order into B5, 4th order into B7 | — | No need for IMD (it covered 3DL CA_3A-5A-7A with 2UL CA_3A-7A) No need for IMD (it already completed in 2DL/2UL CA_3A-7A |
| | CA_5A-7A | — | 5th order into B7 | — | No need for IMD (it already completed in 2DL/2UL CA_5A-7A |

Below table summarizes the CA__ band combinations with self-interference problems for CA_5DL/2UL CA.

TABLE 71

| downlink CA configuration | uplink CA Configuration | Harmonic relation to 3rd, 4th and 5th band without uplink | intermodulation to 3rd, 4th and 5th band without uplink | interference due to small frequency separation | MSD |
|---|---|---|---|---|---|
| CA_1A-19A-21A-42C | CA_1A-19A | — | 3rd order into B42 | — | No MSD due to IMD to be specified according to actual spectrum holdings. |
| | CA_1A-21A | — | 2nd order into B42 | — | No MSD due to IMD to be specified according to actual spectrum holdings. |
| | CA_1A-42A | — | 2nd order into B21 5th order into B19 | — | No MSD due to IMD to be specified according to actual spectrum holdings. |
| | CA_19A-21A | — | 4th order into B42 | — | No need for IMD (it will covered 3DL CA_19A-21A-42A with 2UL CA_19A-21A) |
| | CA_19A-42A | — | — | — | N/A |
| | CA_21A-42A | — | 2nd order into B1 4th order into B19 | — | No MSD due to IMD to be specified according to actual spectrum holdings. No need for IMD (it will covered 3DL CA_19A-21A-42A with 2UL CA_21A-42A) |

TABLE 71-continued

| downlink CA configuration | uplink CA Configuration | Harmonic relation to 3rd, 4th and 5th band without uplink | intermodulation to 3rd, 4th and 5th band without uplink | interference due to small frequency separation | MSD |
|---|---|---|---|---|---|
| CA_1A-3A-19A-42C | CA_1A-3A | B3 2nd harmonics into B42 | 4th order into B42 | Yes | No MSD due to IMD to be specified according to actual spectrum holdings. No need for IMD (it will covered 3DL CA_1A-3A-42A with 2UL CA_1A-3A) |
| | CA_1A-19A | — | 3rd order into B42 | | No MSD due to IMD to be specified according to actual spectrum holdings. |
| | CA_1A-42A | — | 5th order into B19 | | No MSD due to IMD to be specified according to actual spectrum holdings. |
| | CA_3A-19A | B3 2nd harmonics into B42 | 3rd & 5th order into B42 | | No MSD due to IMD to be specified according to actual spectrum holdings. |
| | CA_3A-42A | B3 2nd harmonics into B42 | 4th & 5th order into B42 | | No MSD due to IMD to be specified according to actual spectrum holdings. No need for IMD (it was already covered 2DL/2UL CA_3A-42A |
| | CA_19A-42A | — | 3rd order into B3 | | No MSD due to IMD to be specified according to actual spectrum holdings. |
| CA_1A-3A-21A-42C | CA_1A-3A | B3 2nd harmonics into B42 | 3rd & 5th order into B21, 4th order into B42 | Yes | No MSD due to IMD to be specified according to actual spectrum holdings. |
| | CA_1A-21A | — | 2nd order into B42 | | No MSD due to IMD to be specified according to actual spectrum holdings. |
| | CA_1A-42A | — | 2nd order into B21 | | No MSD due to IMD to be specified according to actual spectrum holdings. |
| | CA_3A-21A | B3 2nd harmonics into B42 | 3rd order into B1, | | No MSD due to IMD to be specified according to actual spectrum holdings. |

TABLE 71-continued

| downlink CA configuration | uplink CA Configuration | Harmonic relation to 3rd, 4th and 5th band without uplink | intermodulation to 3rd, 4th and 5th band without uplink | interference due to small frequency separation | MSD |
|---|---|---|---|---|---|
| | CA_3A-42A | B3 2nd harmonics into B42 | 4th order into B42 5th order into B21 | | No MSD due to IMD to be specified according to actual spectrum holdings. |
| | CA_21A-42A | — | 2nd order into B1 | | No MSD due to IMD to be specified according to actual spectrum holdings. |
| CA_1A-3A-28A-42C | CA_1A-3A | B3 2nd harmonics into B42 | 4th order into B42 | Yes | No need for IMD (it covered 3DL CA_1A-3A-42A with 2UL CA_1A-3A) |
| | CA_1A-28A | — | 5th order into B3, 3rd order into B42 | | No need for IMD (it covered 3DL CA_1A-3A-28A with 2UL CA_1A-28A) No need for IMD (it covered 3DL CA_1A-28A-42A with 2UL CA_1A-28A) |
| | CA_1A-42A | — | — | | N/A |
| | CA_3A-28A | B28 3rd harmonics into B1 B3 2nd harmonics into B42 | 4th order into B1 | | No need for IMD (it covered 3DL CA_1A-3A-28A with 2UL CA_3A-28A) |
| | CA_3A-42A | B3 2nd harmonics into B42 | 4th order into B42 | | |
| | CA_28A-42A | B28 3rd harmonics into B1 | 3rd order into B1 | | No need for IMD (it covered 3DL CA_1A-28A-42A with 2UL CA_28A-42A) |
| CA_1A-21A-28A-42C | CA_1A-21A | — | 2nd order into B42 | — | No MSD due to IMD to be specified according to actual spectrum holdings. |
| | CA_1A-28A | B28 2nd harmonics into B21 | 3rd order into B42 | — | No MSD due to harmonics to be specified according to actual spectrum holdings. No need for IMD (it covered 3DL CA_1A-28A-42A with 2UL CA_1A-28A) |

TABLE 71-continued

| downlink CA configuration | uplink CA Configuration | Harmonic relation to 3rd, 4th and 5th band without uplink | intermodulation to 3rd, 4th and 5th band without uplink | interference due to small frequency separation | MSD |
|---|---|---|---|---|---|
| | CA_1A-42A | — | 2nd order into B21 | — | No MSD due to IMD to be specified according to actual spectrum holdings. |
| | CA_21A-28A | B28 3rd harmonics into B1 | 2nd & 3rd order into B1 3rd & 4th order into B42 | — | No MSD due to harmonics/IMD to be specified according to actual spectrum holdings. |
| | CA_21A-42A | — | 2nd order into B1, 4th order into B28 | — | No MSD due to IMD to be specified according to actual spectrum holdings. |
| | CA_28A-42A | B28 3rd harmonics into B1 B28 2nd harmonics into B21 | 3rd order into B1 | — | No need for IMD (it covered 3DL CA_1A-28A-42A with 2UL CA_28A-42A) |
| CA_1A-3A-5A-7A-7A | CA_1A-3A | — | — | — | N/A |
| | CA_1A-5A | — | — | — | N/A |
| | CA_1A-7A | — | 5th order into B5 | — | No need for IMD (it was already covered 3DL CA_1A-5A-7A with 2UL CA_1A-7A) |
| | CA_3A-5A | — | 2nd & 3rd order into B7 | — | No need for IMD (it will covered 3DL CA_3A-5A-7A with 2UL CA_3A-5A) |
| | CA_3A-7A | — | 3rd order into B5, 4th order into B7 | — | No need for IMD (it covered 3DL CA_3A-5A-7A with 2UL CA_3A-7A) No need for IMD (it already completed in 2DL/2UL CA_3A-7A |
| | CA_5A-7A | — | 5th order into B7 | — | No need for IMD (it already completed in 2DL/2UL CA_5A-7A |

Based on the MSD test configuration as summarized in above tables, it is proposed to define the following REFSENS exceptions and test configurations in the core specifications for 3DL/2UL inter-band CA with IMD problem.

The above described embodiments of the present invention may be implemented through various means. For example, the embodiments of the present invention may be implemented in hardware, firmware, software, and a combination thereof, which are described in detail with reference to the drawings.

Figure 11:
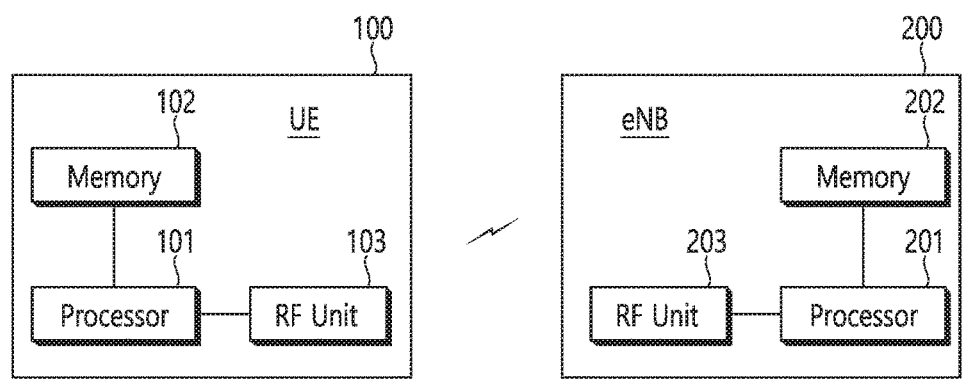
FIG. 11 is a block diagram of a wireless communication system in which the disclosure of the present specification is implemented.

FIG. 11 is a Block Diagram of a Wireless Communication System in which the Disclosure of the Present Specification is Implemented.

An eNB 200 includes a processor 201, a memory 202, and an RF unit 203. A memory 202 is connected to a processor 201 and saves various information for operating the processor 201. The RF unit 203 is connected to the processor 201 and transmits and/or receives a wireless signal. The processor 201 implements the suggested function, process, and/or method. In the above described embodiments, the operation of the eNB may be implemented by the processor 201.

A UE includes a processor, a memory 102, and an RF unit 103. The memory 102 is connected to the processor 101 and saves various information for operating the processor 101. The RF unit is connected to the processor 101 and transmits and/or receives a wireless signal. The processor 101 implements the suggested function, process, and/or method.

The processor may includes an application-specific integrated circuit (ASIC), another chipset, a logical circuit and/or a data processing device. The memory may include a read-only memory (ROM), a random access memory (RAM), a flash memory, a memory card, a storage medium, and/or another storage device. The RF unit may include a baseband circuit for processing a wireless signal. When embodiments are implemented in software, the above described scheme may be implemented as a module for performing the above described function (process, function, etc.). The module is stored in the memory and may be executed by the processor. The memory may exit inside or outside the processor and may be connected to the processor in various known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for transmitting/receiving a signal in carrier aggregation, the method comprising:
    transmitting an uplink signal by using two uplink carriers when three downlink carriers and two uplink carriers are configured to be aggregated,
    wherein the three downlink carriers include three operating bands among evolved universal terrestrial radio access (E-UTRA) operating bands 1, 2, 3, 5, 12, 30 and 40, and
    wherein the two uplink carrier includes two operating bands among the E-UTRA operating bands 1, 2, 3, 5, 12, 30 and 40; and
    receiving a downlink signal through all of three downlink carriers,
    wherein a predetermined maximum sensitivity degradation (MSD) value is applied to a receiving reference sensitivity of the downlink signal to enable successful receipt of the signals in all of the three downlink carriers and performing dual transmissions via the two uplink carriers.

2. The method of claim 1, wherein when the three downlink carriers include operating bands 1, 3 and 40 and when two uplink carriers include operating band 1 and 3, the MSD value is 8.0 dB for the downlink carrier of the operating band 40.

3. The method of claim 1, wherein when the three downlink carriers include operating band 1, 5 and 40 and when two uplink carriers include operating band 1 and 5, the MSD value is 9.0 dB for the downlink carrier of the operating band 40.

4. The method of claim 1, wherein when the three downlink carriers include operating band 2, 12 and 30 and when two uplink carriers include operating band 2 and 12, the MSD value is 12.0 dB for the downlink carrier of the operating band 30.

5. The method of claim 1, wherein the MSD value is predetermined in consideration of an intermodulation distortion (IMD) for the two uplink carrier.

6. A wireless device for transmitting/receiving a signal in carrier aggregation, the wireless device comprising:
    a transmitter configured to transmit an uplink signal by using two uplink carriers when three downlink carriers and two uplink carriers are configured to be aggregated,
    wherein the three downlink carriers include three operating bands among evolved universal terrestrial radio access (E-UTRA) operating bands 1, 2, 3, 5, 12, 30 and 40, and
    wherein the two uplink carrier includes two operating bands among the E-UTRA operating bands 1, 2, 3, 5, 12, 30 and 40; and
    a receiver configured to receive a downlink signal through all of three downlink carriers,
    wherein a predetermined maximum sensitivity degradation (MSD) value is applied to a receiving reference sensitivity of the downlink signal to enable successful receipt of the signals in all of the three downlink carriers and performing dual transmissions via the two uplink carriers.

7. The wireless device of claim 6, wherein when the three downlink carriers include operating bands 1, 3 and 40 and when two uplink carriers include operating band 1 and 3, the MSD value is 8.0 dB for the downlink carrier of the operating band 40.

8. The wireless device of claim 6, wherein when the three downlink carriers include operating band 1, 5 and 40 and when two uplink carriers include operating band 1 and 5, the MSD value is 9.0 dB for the downlink carrier of the operating band 40.

9. The wireless device of claim 6, wherein when the three downlink carriers include operating band 2, 12 and 30 and when two uplink carriers include operating band 2 and 12, the MSD value is 12.0 dB for the downlink carrier of the operating band 30.

10. The wireless device of claim 6, wherein the MSD value is predetermined in consideration of an intermodulation distortion (IMD) for the two uplink carrier.

* * * * *